US006539548B1

(12) United States Patent
Hendricks et al.

(10) Patent No.: US 6,539,548 B1
(45) Date of Patent: Mar. 25, 2003

(54) OPERATIONS CENTER FOR A TELEVISION PROGRAM PACKAGING AND DELIVERY SYSTEM

(75) Inventors: John S. Hendricks, Potomac, MD (US); Alfred E. Bonner, Bethesda, MD (US)

(73) Assignee: Discovery Communications, Inc., Bethesda, MD (US)

( * ) Notice: Subject to any disclaimer, the term of this patent is extended or adjusted under 35 U.S.C. 154(b) by 0 days.

(21) Appl. No.: 08/912,934

(22) Filed: Aug. 15, 1997

Related U.S. Application Data

(63) Continuation of application No. 08/160,282, filed on Dec. 2, 1993, now Pat. No. 5,659,350, which is a continuation-in-part of application No. 07/991,074, filed on Dec. 9, 1992.

(51) Int. Cl.[7] .............................................. H04N 7/173
(52) U.S. Cl. ............................ 725/109; 725/37; 725/91
(58) Field of Search .............................. 725/37, 39, 87, 725/91, 92, 93, 94, 95, 96, 97, 114, 115, 116, 117, 138, 143, 144, 145, 146, 147, 86, 109, 68, 67; 348/906, 569, 570, 722

(56) References Cited

U.S. PATENT DOCUMENTS

| | | | |
|---|---|---|---|
| 3,891,792 A | 6/1975 | Kimura | |
| 3,978,470 A | 8/1976 | McGuire | |
| 4,197,590 A | 4/1980 | Sukonick et al. | |
| 4,361,848 A | 11/1982 | Poignet et al. | |
| 4,381,522 A | 4/1983 | Lambert | 725/93 |
| 4,398,216 A | 8/1983 | Field et al. | |
| 4,484,217 A | 11/1984 | Block et al. | |
| 4,488,179 A | 12/1984 | Kruger et al. | |
| 4,517,598 A | 5/1985 | Van Valkenburg et al. | |
| 4,528,589 A | 7/1985 | Block et al. | |
| 4,528,643 A | 7/1985 | Freeny, Jr. | |

(List continued on next page.)

FOREIGN PATENT DOCUMENTS

| | | |
|---|---|---|
| CA | 2044574 | 12/1992 |
| DE | 3423846 | 1/1986 |
| DE | 3935294 | 4/1991 |
| DE | 42 14 184 | 11/1992 |
| EP | 103438 | 3/1984 |
| EP | 145063 | 6/1985 |
| EP | 149536 | 7/1985 |
| EP | 158548 | 10/1985 |
| EP | 0 158 767 | 10/1985 |

(List continued on next page.)

OTHER PUBLICATIONS

Sorce et al., *Human Factors In Telecommunications*, Sep. 10–14, 1990.

Sorce, et al., *Human Factors In Telecommunications*, Oct. 29, 1996.

(List continued on next page.)

*Primary Examiner*—Chris Grant
(74) *Attorney, Agent, or Firm*—Dorsey & Whitney LLP

(57) ABSTRACT

An Operations Center for television entertainment systems that provide television programming to consumer homes is disclosed. The Operations Center organizes and packages television programming and program information for delivery to and from consumer homes. The Operations Center includes a computerized packaging system for creating a program control information signal.

72 Claims, 86 Drawing Sheets

U.S. PATENT DOCUMENTS

| Patent | | Date | Inventor | Ref |
|---|---|---|---|---|
| 4,587,520 | A | 5/1986 | Astle | |
| 4,605,964 | A | 8/1986 | Chard | |
| 4,621,282 | A | 11/1986 | Ahern | |
| 4,633,462 | A | 12/1986 | Stifle et al. | |
| 4,639,225 | A | 1/1987 | Washizuka | |
| 4,688,218 | A | 8/1987 | Blineau et al. | |
| 4,688,246 | A | 8/1987 | Eilers et al. | |
| 4,694,490 | A | 9/1987 | Harvey et al. | |
| 4,695,880 | A | 9/1987 | Johnson et al. | |
| 4,697,209 | A | 9/1987 | Kiewit et al. | |
| 4,706,121 | A | 11/1987 | Young | |
| 4,712,105 | A | 12/1987 | Kohler | |
| 4,712,130 | A | 12/1987 | Casey | |
| 4,724,491 | A | 2/1988 | Lambert | |
| 4,792,972 | A | 12/1988 | Cook, Jr. | |
| 4,802,008 | A * | 1/1989 | Walling | 358/141 |
| 4,805,014 | A | 2/1989 | Sahara et al. | |
| 4,816,901 | A | 3/1989 | Music et al. | |
| D301,037 | S | 5/1989 | Matsuda | |
| 4,829,372 | A | 5/1989 | McCalley et al. | |
| 4,829,558 | A | 5/1989 | Welsh | |
| 4,829,569 | A | 5/1989 | Seth-Smith et al. | |
| 4,860,379 | A | 8/1989 | Schoenberger et al. | 725/24 |
| 4,876,736 | A | 10/1989 | Kiewit | |
| 4,885,803 | A | 12/1989 | Hermann et al. | |
| 4,920,432 | A | 4/1990 | Eggers et al. | |
| 4,928,168 | A | 5/1990 | Iwashita | |
| 4,947,429 | A | 8/1990 | Bestler et al. | |
| 4,949,187 | A | 8/1990 | Cohen | |
| 4,959,810 | A | 9/1990 | Darbee et al. | |
| 4,961,109 | A | 10/1990 | Tanaka | |
| 4,965,825 | A | 10/1990 | Harvey et al. | |
| 4,975,951 | A | 12/1990 | Bennett | |
| 4,977,455 | A | 12/1990 | Young | |
| D314,383 | S | 2/1991 | Hafner | |
| 4,995,078 | A | 2/1991 | Monslow et al. | |
| 4,996,597 | A | 2/1991 | Duffield | |
| 5,001,554 | A | 3/1991 | Johnson et al. | |
| 5,014,125 | A | 5/1991 | Pocock et al. | |
| 5,015,829 | A | 5/1991 | Eilert et al. | |
| 5,020,129 | A | 5/1991 | Martin et al. | |
| 5,027,400 | A | 6/1991 | Baji et al. | 725/116 |
| 5,036,394 | A | 7/1991 | Morii et al. | |
| 5,036,537 | A | 7/1991 | Jeffers et al. | |
| 5,038,402 | A | 8/1991 | Robbins | |
| 5,046,093 | A | 9/1991 | Wachob | |
| 5,047,867 | A | 9/1991 | Strubbe et al. | |
| 5,049,990 | A | 9/1991 | Kondo et al. | |
| 5,056,138 | A | 10/1991 | Tyson, Sr. | |
| 5,057,917 | A | 10/1991 | Shalkauser et al. | |
| 5,073,930 | A | 12/1991 | Green et al. | |
| 5,075,771 | A | 12/1991 | Hashimoto | 725/46 |
| 5,077,607 | A | 12/1991 | Johnson et al. | |
| 5,078,019 | A | 1/1992 | Aoki | |
| 5,091,782 | A | 2/1992 | Krause et al. | |
| 5,093,718 | A | 3/1992 | Hoarty et al. | |
| D325,581 | S | 4/1992 | Schwartz | |
| 5,103,314 | A | 4/1992 | Keenan | |
| 5,105,269 | A | 4/1992 | Yamanouchi et al. | |
| 5,130,792 | A | 7/1992 | Tindell et al. | |
| 5,132,789 | A | 7/1992 | Ammon et al. | |
| 5,132,992 | A | 7/1992 | Yurt et al. | |
| 5,133,079 | A | 7/1992 | Ballantyne et al. | |
| D329,238 | S | 9/1992 | Grasso et al. | |
| 5,144,663 | A | 9/1992 | Kudelski et al. | |
| 5,150,118 | A | 9/1992 | Finkle et al. | |
| 5,151,782 | A | 9/1992 | Ferraro | |
| 5,151,789 | A | 9/1992 | Young | |
| 5,152,011 | A | 9/1992 | Schwob | |
| 5,155,591 | A | 10/1992 | Wachob | |
| 5,166,886 | A | 11/1992 | Molnar et al. | |
| D331,760 | S | 12/1992 | Renk, Jr. | |
| 5,172,413 | A | 12/1992 | Bradley et al. | |
| 5,182,639 | A | 1/1993 | Jutamulia et al. | |
| 5,185,667 | A | 2/1993 | Zimmermann et al. | |
| 5,202,817 | A | 4/1993 | Koenck et al. | |
| 5,206,722 | A | 4/1993 | Kwan | |
| 5,206,929 | A * | 4/1993 | Langford et al. | 395/159 |
| 5,206,954 | A | 4/1993 | Inoue et al. | |
| 5,216,515 | A | 6/1993 | Steele et al. | |
| 5,221,962 | A | 6/1993 | Backus et al. | |
| 5,223,924 | A | 6/1993 | Strubbe | |
| 5,235,419 | A | 8/1993 | Krause | |
| 5,237,311 | A | 8/1993 | Mailey et al. | |
| 5,237,610 | A | 8/1993 | Gammie et al. | |
| 5,247,347 | A | 9/1993 | Litteral et al. | |
| 5,253,066 | A | 10/1993 | Vogel | |
| 5,253,275 | A | 10/1993 | Yurt et al. | |
| 5,253,341 | A | 10/1993 | Rozmanith et al. | |
| 5,260,778 | A | 11/1993 | Kauffman et al. | |
| 5,282,028 | A | 1/1994 | Johnson et al. | |
| 5,283,639 | A | 2/1994 | Esch | 725/32 |
| 5,285,272 | A | 2/1994 | Bradley et al. | |
| 5,289,271 | A | 2/1994 | Watson | |
| 5,293,540 | A | 3/1994 | Trani et al. | |
| 5,293,633 | A | 3/1994 | Robbins | |
| 5,319,455 | A | 6/1994 | Hoarty et al. | |
| 5,319,707 | A | 6/1994 | Wasilewski et al. | |
| 5,323,240 | A | 6/1994 | Amano et al. | |
| 5,327,554 | A | 7/1994 | Palazzi, III et al. | |
| 5,339,315 | A | 8/1994 | Maeda et al. | |
| 5,341,166 | A | 8/1994 | Garr et al. | |
| 5,341,474 | A | 8/1994 | Gelman et al. | |
| 5,343,239 | A | 8/1994 | Lappington et al. | |
| 5,343,516 | A | 8/1994 | Callele et al. | |
| 5,345,594 | A | 9/1994 | Tsuda | |
| 5,349,638 | A | 9/1994 | Pitroda et al. | |
| 5,351,075 | A | 9/1994 | Herz et al. | |
| 5,353,121 | A | 10/1994 | Young et al. | |
| 5,355,162 | A | 10/1994 | Yazolino et al. | |
| 5,357,276 | A | 10/1994 | Banker et al. | |
| 5,365,265 | A | 11/1994 | Shibata et al. | |
| 5,367,330 | A * | 11/1994 | Haave et al. | 348/7 |
| 5,367,571 | A | 11/1994 | Bowen et al. | |
| 5,375,068 | A | 12/1994 | Palmer et al. | |
| 5,390,348 | A | 2/1995 | Magin et al. | |
| 5,396,546 | A | 3/1995 | Remillard | |
| 5,400,401 | A | 3/1995 | Wasilewski et al. | |
| 5,404,393 | A | 4/1995 | Remillard | |
| 5,404,505 | A | 4/1995 | Levinson | |
| 5,410,326 | A | 4/1995 | Goldstein | |
| 5,410,344 | A | 4/1995 | Graves et al. | 725/46 |
| 5,412,416 | A | 5/1995 | Nemirofsky | |
| 5,414,426 | A | 5/1995 | O'Donnell et al. | |
| 5,416,508 | A | 5/1995 | Sakuma et al. | 725/139 |
| 5,424,770 | A | 6/1995 | Schmelzer et al. | |
| 5,432,542 | A | 7/1995 | Thibadeau et al. | |
| 5,440,632 | A | 8/1995 | Bacon et al. | 380/242 |
| 5,442,626 | A | 8/1995 | Wei | |
| 5,446,919 | A | 8/1995 | Wilkins | |
| 5,461,667 | A | 10/1995 | Remillard | |
| 5,469,206 | A | 11/1995 | Strubbe et al. | |
| 5,473,362 | A | 12/1995 | Fitzgerald et al. | |
| 5,477,262 | A * | 12/1995 | Banker et al. | 348/7 |
| 5,477,263 | A | 12/1995 | O'Callaghan et al. | |
| 5,479,268 | A | 12/1995 | Young et al. | |
| 5,481,294 | A | 1/1996 | Thomas et al. | |
| 5,481,296 | A | 1/1996 | Cargun et al. | |
| 5,481,542 | A | 1/1996 | Logston et al. | |
| 5,483,278 | A | 1/1996 | Strubbe et al. | |
| 5,500,794 | A | 3/1996 | Fujita et al. | |

| | | |
|---|---|---|
| 5,515,098 A | 5/1996 | Carles |
| 5,561,708 A | 10/1996 | Remillard |
| 5,561,709 A | 10/1996 | Remillard |
| 5,570,126 A | 10/1996 | Blahut et al. |
| 5,600,364 A | 2/1997 | Hendricks et al. ............ 725/9 |
| 5,600,573 A | 2/1997 | Hendricks et al. .......... 725/109 |
| 5,644,354 A | 7/1997 | Thompson et al. |
| 5,661,516 A | 8/1997 | Carles |
| 5,663,757 A | 9/1997 | Morales et al. |
| 5,689,663 A | 11/1997 | Williams |
| 5,696,906 A | 12/1997 | Peters et al. |
| 5,724,091 A | 3/1998 | Freeman et al. |
| 5,764,276 A | 6/1998 | Martin et al. |
| 5,793,414 A | 8/1998 | Shaffer |
| 5,877,801 A | 3/1999 | Martin et al. |
| 5,903,319 A | 5/1999 | Busko et al. |
| 5,990,927 A | 11/1999 | Hendricks et al. .......... 725/132 |
| 6,101,324 A * | 8/2000 | Connell et al. ........ 395/500.38 |
| 6,163,316 A | 12/2000 | Killian ...................... 345/721 |

FOREIGN PATENT DOCUMENTS

| | | |
|---|---|---|
| EP | 167237 | 1/1986 |
| EP | 0 187 961 | 7/1986 |
| EP | 243312 | 10/1987 |
| EP | 0 277 014 | 8/1988 |
| EP | 281 293 | 9/1988 |
| EP | 0 299 830 | 1/1989 |
| EP | 0 314 572 | 5/1989 |
| EP | 328 440 | 8/1989 |
| EP | 0 340 643 | 11/1989 |
| EP | 0355697 | 2/1990 |
| EP | 0 355 697 | 2/1990 |
| EP | 0 377 334 | 7/1990 |
| EP | 0 396 186 | 10/1990 |
| EP | 399200 | 11/1990 |
| EP | 0 402 809 | 12/1990 |
| EP | 0 420 123 | 4/1991 |
| EP | 0 424 648 | 5/1991 |
| EP | 0 425 834 | 5/1991 |
| EP | 450841 | 10/1991 |
| EP | 0 472 070 | 2/1992 |
| EP | 0 506 435 | 9/1992 |
| EP | 513553 | 11/1992 |
| EP | 0 513 763 | 11/1992 |
| EP | 0 539 106 | 4/1993 |
| EP | 570 785 | 11/1993 |
| EP | 0 620 689 | 10/1994 |
| GB | 1204190 | 9/1970 |
| GB | 2168227 | 6/1986 |
| GB | 2177873 A | 1/1987 |
| JP | 61060150 | 3/1986 |
| JP | 62-24777 | 2/1987 |
| JP | 62-140134 | 6/1987 |
| JP | 01-20454 | 1/1989 |
| JP | 62-245167 | 3/1989 |
| JP | 1-130683 | 5/1989 |
| JP | 01-142918 | 6/1989 |
| JP | 3-114375 | 5/1991 |
| JP | 3- 198 119 | 8/1991 |
| JP | 5250106 | 9/1993 |
| JP | 07-230466 | 8/1995 |
| TW | 238461 | 4/1992 |
| TW | 234223 | 11/1994 |
| TW | 235358 | 12/1994 |
| TW | 235359 | 12/1994 |
| TW | 236065 | 12/1994 |
| TW | 236744 | 12/1994 |
| WO | 80/00209 | 2/1980 |
| WO | 86/01962 | 3/1986 |
| WO | 88/01463 | 2/1988 |
| WO | 89/09528 | 10/1989 |
| WO | 89/12370 | 12/1989 |
| WO | 90/10988 | 9/1990 |
| WO | 91/00670 | 1/1991 |
| WO | 91/03112 | 3/1991 |
| WO | 92/10040 | 6/1992 |
| WO | 92/11713 | 7/1992 |
| WO | 92/12599 | 7/1992 |
| WO | 92/17027 | 10/1992 |
| WO | 92/21206 | 11/1992 |
| WO | 93/22877 | 11/1993 |
| WO | WO 94/13107 | 6/1994 |
| WO | WO 94/14282 | 6/1994 |
| WO | 94/14282 | 6/1994 |
| WO | 94/16527 | 7/1994 |
| WO | 96/08109 | 3/1996 |
| WO | 96/25006 | 8/1996 |
| WO | 97/13368 | 4/1997 |
| WO | WO 97/13368 | 4/1997 |

OTHER PUBLICATIONS

Reimer, "*Memories In My Pocket*", Feb. 1991.
Olshanasky et al., "*Subscriber Distribution Networks Using Compressed Digital Video*", Nov., 1992.
Dinaro et al., "*Markets and Products Overview*", 1991.
Advertisement, "*Hong Kong Enterprise*", Nov. 1988.
Advertisement, "*Great Presentations*", 1987.
Advertisement, "*Consumer Dist.*", Fall/Winter 1992.
van den Boom, "*Interactive Videotex . . .* ", Nov.–Dec. 1986.
Moloney, "*Digital Compression in Todays . . .* ", Jun. 6, 1993.
Bestler, "*Flexible Data Structures . . .* ", Jun. 6, 1993.
Gelman et al., "*A Store–and–Forward . . .* ", Jun. 21, 1991.
Sharpless, "*Subscription teletext for value added services*", Aug. 1985.
Hewlett Packard Co., "*HP–41C Operating Manual*", Dec. 1982.

\* cited by examiner

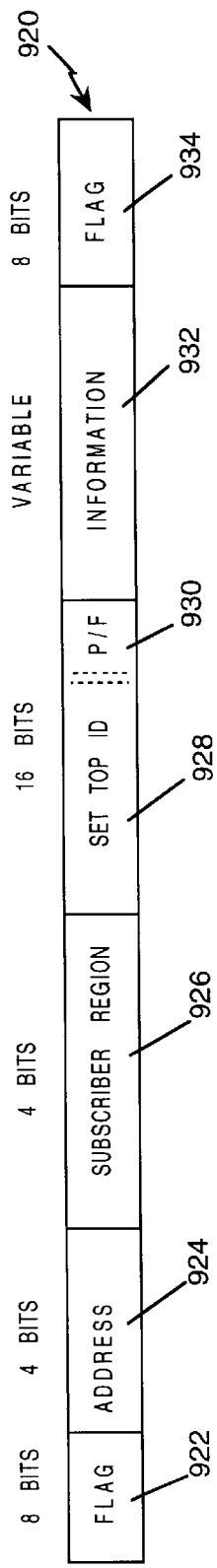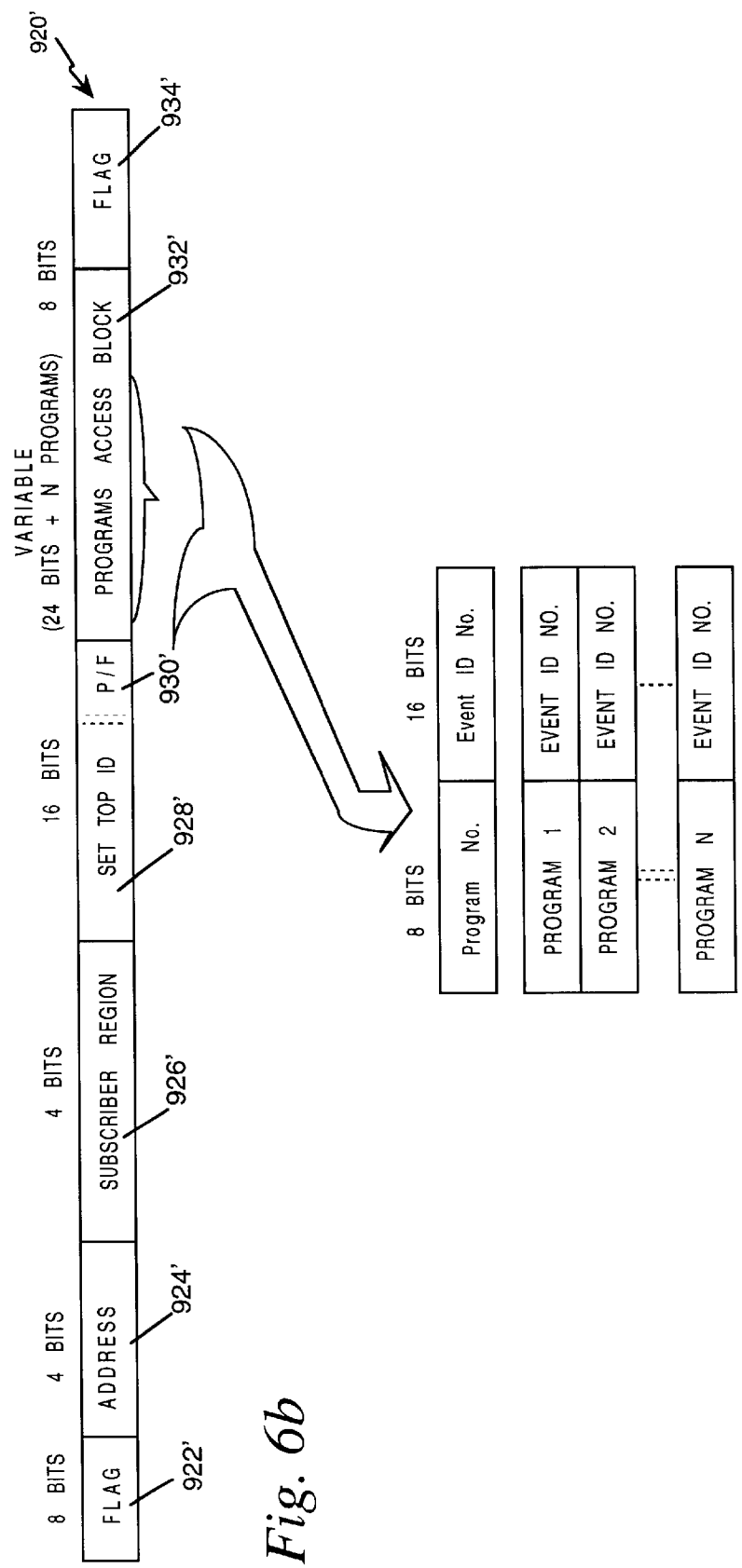
Fig. 6a
Fig. 6b

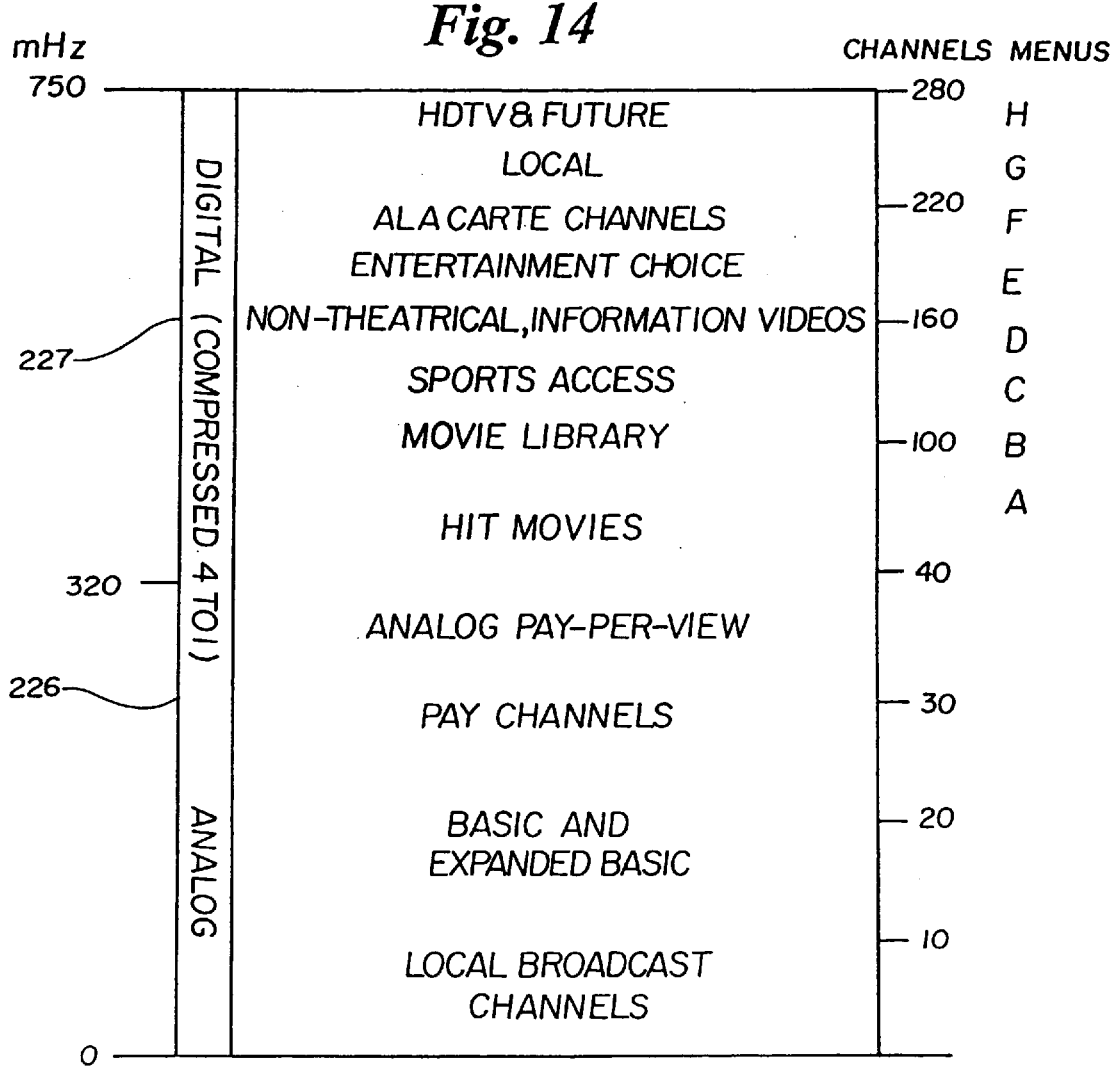

Fig. 16

SATELLITE MOVIE OPTIONS

| VCTV COMBO | COMP. RATIO | AVAILABLE MENUS (1, 2 & 3) | PRIORITY ONE MENUS | PRIORITY ONE PLUS TWO MENUS |
|---|---|---|---|---|
| 1 | 8:1 | HIT MOVIES 8 MOVIE SELECTIONS WITH START TIMES EVERY 15 MINUTES | HIT MOVIES 6 MOVIE SELECTIONS WITH START TIMES EVERY 30 MINUTES | HIT MOVIES 6 MOVIE SELECTIONS WITH START TIMES EVERY 15 MINUTES |
| 2 | 8:1 | | | |
| 3 | 8:1 | | | |
| 4 | 8:1 | | | |
| 5 | 8:1 | | | |
| 6 | 8:1 | | | |
| 7 | 8:1 | | | |
| 8 | 8:1 | | | |
| 9 | 4:1 | SPORTS 8 SELECTIONS | SPORTS 2 SELECTIONS | SPORTS 4 SELECTIONS |
| 10 | 4:1 | | | |
| 11 | 8:1 | CHILDRENS 8 SELECTIONS | CHILDRENS 2 SELECTIONS | CHILDRENS 4 SELECTIONS |
| 12 | 8:1 | DOCS/NEWS 8 SELECTIONS | DOCS/NEWS 2 SELECTIONS | DOCS/NEWS 4 SELECTIONS |
| 13 | 8:1 | ENTERTAINMENT 8 SELECTIONS | ENTERTAINMENT 4 SELECTIONS | ENTERTAINMENT 6 SELECTIONS |
| 14 | 8:1 | SPECIAL-INTEREST CHANNELS 16 SELECTIONS | SPECIAL-INTEREST CHANNELS 4 SELECTIONS | SPECIAL-INTEREST CHANNELS 8 SELECTIONS |
| 15 | 8:1 | | | |
| 16 | 8:1 | PROMOS (1/6 SCREEN) 48 | PROMOS (1/6 SCREEN) 6 | PROMOS (1/6 SCREEN) 48 |
| 17 | 8:1 or max | DATA STREAM | DATA STREAM | DATA STREAM |
| 18 | 8:1 or max | MUSIC 32 DIGITED STATIONS | MUSIC 4 DIGITED STATIONS | MUSIC 32 DIGITED STATIONS |

| THURSDAY, FEBRUARY 26, 1994 | | 7:42PM |
|---|---|---|
| | 13 WJZ/ABC | 27 LEARNING |
| | 14 HEADLINE | 28 DISNEY |
| | 15 C-SPAN | 29 HBO |
| 2 WMAR/NBC | 16 C-SPAN II | 30 CINEMAX |
| 3 LOCAL WEATHER | 17 WWOR | 31 SHOWTIME |
| 4 WRC/NBC | 18 ESPN | 32 LOCAL GOVT. |
| 5 WTTG/FOX | 19 NICKELODEON | 33 A&E |
| 6 CNN | 20 WDCA/IND. | 34 HTS |
| 7 WJLA/ABC | 21 FAMILY | 35 WERU/IND. |
| 8 DISCOVERY | 22 WMPT/PBS | 36 WTBS |
| 9 WUSA/CBS | 23 LIFETIME | 37 NASHVILLE |
| 10 TNT | 24 INTERFAITH | 38 VH-1 |
| 11 WBAL/CBS | 25 BET | 39 MTV |
| 12 USA | 26 WETA/PBS | 40 CHANNEL LINEUP |
| MOVE YELLOW CURSOR TO SELECT CHANNELS AND PRESS GO | | |

1010

1420

1422

1426

1428

1130

Fig. 30b
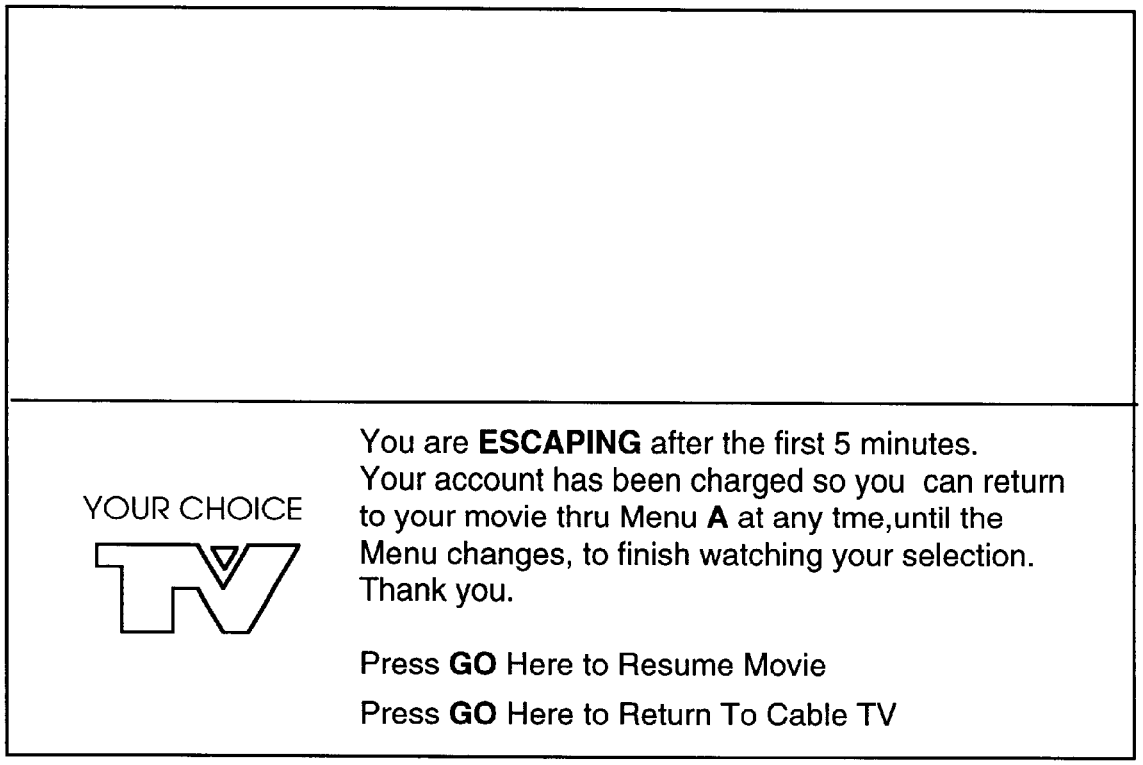
YOUR CHOICE TV
You are ESCAPING after the first 5 minutes. Your account has been charged so you can return to your movie thru Menu A at any tme,until the Menu changes, to finish watching your selection. Thank you.
Press GO Here to Resume Movie
Press GO Here to Return To Cable TV
1133

1032

Fig. 32b
1236

Thursday, October 26, 1994             7:59 PM

| HBO | PROGRAMMING SCHEDULES Next 7 Days |
|-----|-----------------------------------|
|     | TV Guide X*PRESS                  |

Press GO on Any Network for Schedule Info

| | |
|---|---|
| TODAY | October 26, 1994 |
| FRIDAY | October 27, 1994 |
| SATURDAY | October 28, 1994 |
| SUNDAY | October 29, 1994 |
| MONDAY | October 30, 1994 |
| TUESDAY | October 31, 1994 |
| WEDNESDAY | November 1, 1994 |

YOUR CHOICE TV

Press GO Here for NETWORK SCHEDULES
Press GO Here to Return to Menu G - GUIDE
Press GO Here to Return to Cable TV

1238

Fig. 32d
1242

1244

1248

1046

MOOD QUESTION MENUS

LENGTH OF PROGRAM DESIRED

| SHORT | 30 minutes or less |
| MEDIUM | 30 to 60 minutes |
| LONG | 60 minutes or more |

TYPE OF PROGRAM DESIRED

SERIOUS

THOUGHTFUL

LIGHT

DO YOU WISH AN ACTIVE OR PASSIVE PROGRAM?

ACTIVE

PASSIVE

THURSDAY, OCTOBER 26,1994          8:00PM

INTERACTIVE SERVICES
LEVEL A

THERE ARE THREE LEVELS OF INTERACTIVITY POSSIBLE WITH YOUR CABLE TELEVISION DIGITAL CONVERTER.

LEVEL A IS LIVE INTERACTIVITY WITH SPECIALLY ENCODED CABLE AND BROADCAST PROGRAMS... AVAILABLE WHENEVER YOU SEE THIS SYMBOL...

THIS SERVICE OFFERS ENLIGHTENING INFORMATION ABOUT PROGRAMS, FUN QUIZZES FOR THE FAMILY, GEOGRAPHICAL FACTS, CONTESTS, AND MUCH MORE!

PRESS GO HERE TO ORDER LEVEL A INTERACTIVITY FOR JUST $4.95 PER MONTH AND ENJOY INTERACTIVITY IMMEDIATELY
PRESS GO HERE FOR MORE INFORMATION
PRESS GO HERE TO RETURN TO CABLE TV

Thursday, October 26, 1994                                              7:59 PM

**AIRLINE INFORMATION
AND RESERVATIONS (Continued)**

Press GO on the ARIZONA airport you will DEPART:

| PHOENIX | FLAGSTAFF | TUCSON |
| PRESCOTT | YUMA | Minor Airport List |

Press GO on the DC airport you will ARRIVE:

NATIONAL          DULLES          BWI
Check Flights to all Three D.C. Airports

Press GO on your preferred departure time:

Morning    Mid-day    Late aft.    eve/night    anyhtime

Press GO on your preferred arrival time:

Morning    Mid-day    Late aft.    eve/night    anyhtime

YOUR CHOICE   Press GO Here to Continue
Press GO Here to Erase Above and Repeat
Press GO Here to Return to Cable TV

Thursday, October 26, 1994                                    8:04 PM

AIRLINE INFORMATION
AND RESERVATIONS (continued)

Here are your airline flight options for a morning departure from Phoenix to Dulles.
Press GO on Any Flight to Check Availability and Fare

| Depart Time | Arrive Time | Airline | Flight No. | Stops | Connecting Through |
|---|---|---|---|---|---|
| 6:15 AM | 1:30 PM | AMERICAN | 32 | 0 | |
| 7:30 AM | 2:45 PM | AMERICAN | 212 | 0 | |
| 8:00 AM | 3:07 PM | DELTA | 49 | 0 | |
| 10:30 AM | 7:15 PM | US AIR | 285 | 1 | Chicago |
| 11:25 AM | 6:10 PM | UNITED | 10 | 0 | |
| 11:45 AM | 8:40 PM | UNITED | 77 | 1 | Dallas |

Press GO Here to Return to Airline Main Menu
Press GO Here to Return to Menu I
Press GO Here to Return to Cable TV

Thursday, October 26, 1994              7:59 PM

✈ AIRLINE INFORMATION
AND RESERVATIONS (Continued)

DELTA FLIGHT # 49 from Phoenix to Dulles direct
departs 8:00 AM and arrives 3:07 PM To check availabiity, enter month, day and year
with your remote - example  03    21    94

Month:    11            Day:  25         Year:         9

Press GO Here to Erase Above Entries and Repeat
Press GO Here if Above Entreis are Correct YOUR CHOICE   Press GO Here to Return to Airline Main Menu
TV   Press GO Here to Return to Menu I
Press GO Here to Return to Cable TV

THURSDAY, OCTOBER 26,1994            8:06PM

AIRLINE INFORMATION AND RESERVATIONS (CONTINUED)

YOU HAVE SELECTED SEATS: 23A,23B
DELTA FLIGHT #49 FROM PHEONIX TO WASH. DULLES

DATE: 11/25/94 DEPARTS 8:00AM AND ARRIVES 3:07PM

ONE WAY FARE: $295.00 23A     ROUND TRIP FARE: $419.00 23A
                 $295.00 23B                 $419.00 23B
    TOTAL    $590.00        TOTAL    $838.00

PRESS GO HERE TO SELECT ONE WAY OR ROUND TRIP

TO CONFIRM YOUR RESERVATION:

YOUR CHOICE TV

PRESS GO HERE TO CHARGE TO YOUR CREDIT CARD
PRESS GO HERE AND AN AGENT WILL CALL YOU
PRESS GO HERE TO EXIT WITHOUT RESERVATION

1346

Thursday, October 26, 1994             8:09 PM

DMX Demonstration

Here are the menu options you'll enjoy:

Press GO On the station you want

| Top 5 | Hard Rock | Easy Listening | New Age | Country Top 40 | Rythm and Blues | Classical |
|---|---|---|---|---|---|---|
| Top 10 | Heavy Metal | Instru-mentals | Favorite Light Rock | New Country | Blues Legends | Classical Piano |
| Top 40 | Rock Classics | Easy List. Favorites | Beatles Only | Country Classics | Soul | Classical Strings |
| Rock | Rap | Jazz | Rock Legends | Bluegrass | Soul Classics | Classical Guitar |
| '30s | '40s | '50s | '60s | '70s | '80s | '90s |
| Waltz | Latin | Disco | Polka | Reggae | Dance Fever | Teen Dance |

You are listening to:
PIANO CONCERTO by Rachmaninoff No. 3 op, 30 1909

More Information on Current Artist/Song      Screen ON/OFF
All this for just $4.95 per month. Less than 1/2 the cost of one CD!
ORDER NOW.

YOUR CHOICE

Press GO Here to Order DMX
Press GO Here to Return to Cable TV

Thursday, October 26, 1994          8:09 PM

DMX Demonstration

Here are the menu options you'll enjoy:

Press GO On the station you want

| Top 5 | Hard Rock | Easy Listening | New Age | Country Top 40 | Rythm and Blues | Classical |
|---|---|---|---|---|---|---|
| Top 10 | Heavy Metal | Instru-mentals | Favorite Light Rock | New Country | Blues Legends | Classical Piano |
| Top 40 | Rock Classics | Easy List. Favorites | Beatles Only | Country Classics | Soul | Classical Strings |
| Rock | Rap | Jazz | Rock Legends | Bluegrass | Soul Classics | Classical Guitar |
| '30s | '40s | '50s | '60s | '70s | '80s | '90s |
| Waltz | Latin | Disco | Polka | Reggae | Dance Fever | Teen Dance |

Seirgei Rachmaninoff was born in Onega, Russia on April 9, 1873. He was a pianist, composer and a conductor. Rachmaninoff composed the Third More Information on Current Artist/Song      Screen ON/OFF
All this for just $4.95 per month. Less than 1/2 the cost of one CD! ORDER NOW.

YOUR CHOICE TV

Press GO Here to Order DMX
Press GO Here to Return to Cable TV

| | | |
|---|---|---|
| Thursday, October 26, 1994 | | 8:30 PM |

MONTHLY ACCOUNT REVIEW

Press GO on MENUS for Details

As of this date for:
Mr. James Smith
114 Green St.
San Diego, CA

| | |
|---|---|
| MENU A | $18.40 |
| MENU B | 4.00 |
| MENU C | 2.65 |
| MENU D | 3.85 |
| MENU E | 2.15 |
| MENU F | 3.00 |
| MENU G | 2.95 |
| MENU H | N/A |
| MENU I | 4.95 |
| MENU J | 4.95 |

Your orders over $20.00 are discounted 20%

THANK YOU FOR ORDERING     TOTAL: $46.90

YOUR CHOICE TV

Press GO Here to Continue
Press GO Here to Erase Above and Repeat
Press GO Here to Return to Cable TV

Thursday, October 26, 1994               8:30 PM

MONTHLY ACCOUNT REVIEW
Menu A - HIt Movies

| | | |
|---|---|---|
| 10-01-94 | Four Score | 2.25 |
| 10-04-94 | Home Alone | 2.25 |
| 10-09-94 | You and Me | 2.25 |
| 10-13-94 | Godfather 5 (premiere) | 7.50 |
| 10-13-94 | Detective Smith | 2.25 |
| 10-26-94 | Terminator 4 - 20% | 1.80 |
| | TOTAL | 18.30 |

Note: Menu A changes on 11/01/94
    YOUR 20% DISCOUNT NOW IN EFFECT

YOUR CHOICE
TV    Press GO Here for Account Review
      Press GO Here to Return to Cable TV

1614

OPERATIONS CENTER FOR A TELEVISION PROGRAM PACKAGING AND DELIVERY SYSTEM

RELATED APPLICATIONS

This application is a continuation of Ser. No. 08/160,282 filed Dec. 2, 1993 which is a continuation-in-part of application Ser. No. 07/991,074, filed Dec. 9, 1992, entitled TELEVISION PROGRAM PACKAGING AND DELIVERY SYSTEM WITH MENU DRIVEN SUBSCRIBER ACCESS. The following other continuation-in-part applications, also based on the above-referenced patent application, are incorporated herein by reference:

Ser. No. 08/160,281, filed Dec. 2, 1993, entitled REPROGRAMMABLE TERMINAL FOR SUGGESTING PROGRAMS OFFERED ON A TELEVISION PROGRAM DELIVERY SYSTEM Ser. No. 08/160,280, filed Dec. 2, 1993, entitled NETWORK CONTROLLER FOR CABLE TELEVISION DELIVERY SYSTEMS Ser. No. 08/160,193, filed Dec. 2, 1993, entitled SET-TOP TERMINAL FOR CABLE TELEVISION DELIVERY SYSTEMS Ser. No. 08/160,194, filed Dec. 2, 1993, entitled ADVANCED SET-TOP TERMINAL FOR CABLE TELEVISION DELIVERY SYSTEMS Ser. No. 08/160,283, filed Dec. 2, 1993, entitled DIGITAL CABLE HEADEND FOR CABLE TELEVISION DELIVERY SYSTEM

TECHNICAL FIELD

The invention relates to television entertainment delivery systems that provide television programming to consumer homes. More particularly, the invention relates to an Operations Center that organizes and packages cable television programming for delivery to consumer homes.

BACKGROUND OF THE INVENTION

Advances in television entertainment have been primarily driven by breakthroughs in technology. In 1939, advances on Vladmir Zworykin's picture tube provided the stimulus for NBC to begin its first regular broadcasts. In 1975, advances in satellite technology provided consumers with increased programming to homes.

Many of these technology breakthroughs have produced inconvenient systems for consumers. One example is the ubiquitous three remote control home, having a separate and unique remote control for the TV, cable box and VCR. More recently, technology has provided cable users with 100 channels of programming. This increased program capacity is beyond the ability of many consumers to use effectively. No method of managing the program choices has been provided to consumers.

Consumers are demanding that future advances in television entertainment, particularly programs and program choices, be presented to the consumer in a user friendly manner. Consumer preferences, instead of technological breakthroughs, will drive the television entertainment market for at least the next 20 years. As computer vendors have experienced a switch from marketing new technology in computer hardware to marketing better useability, interfaces and service, the television entertainment industry will also experience a switch from new technology driving the market to consumer useability driving the market.

In order for new television entertainment products to be successful, the products must satisfy consumer demands. TV consumers wish to go from limited viewing choices to a variety of choices, from no control of programming to complete control. Consumers do not wish to pay for one hundred channels when due to lack of programming information, they seldom, if ever, watch programming on many of these channels.

The concepts of interactive television, high definition television and 300–500 channel cable systems in consumer homes will not sell if they are not packaged, delivered and presented in a useable fashion to consumers. The problem is that TV programming is not being managed, packaged, delivered, and presented to consumers in a user friendly manner.

Consumers are already being bombarded with programming options, numerous "free" cable channels, subscription cable channels and pay-per-view choices. Any further increase in TV entertainment choices will likely bewilder viewers with a mind-numbing array of choices.

The TV industry has traditionally marketed and sold its programs to consumers in bulk, such as continuous feed broadcast and long-term subscriptions to movie channels. The TV industry is unable to sell its programming in large quantities on a per unit basis, such as the ordering of one program.

In today's television world networks manage the program lineup for individual channels. Each network analyzes ratings for television shows and determines the appropriate schedule or program lineup to gain market share and revenue from advertising. Since each channel is in competition with every other channel, there is no coordinated effort to organize television programming in a manner that primarily suits the viewers.

Additionally, viewership fragmentation, which has already begun to decrease a channel's or program's market share, will increase. Programming not presented in a user friendly manner will suffer with a decrease in viewership and revenue.

And finally, with the imminent introduction of digital television technology, current television delivery systems do not have the capabilities or features necessary to operate in the digital environment.

What is needed is a method of organizing programming to be offered to viewers.

What is needed is a television program delivery system that can be operated in a distributive fashion and controlled from one or more national centers.

What is needed is an Operations Center for a system which can gather television programming in a variety of formats, package the programs, deliver the programs, and present the programs through a user friendly interface which allows the consumer to easily select from among the many program choices.

What is needed is an Operations Center that is capable of handling hundreds of programs in different formats.

What is needed is an Operations Center that is expandable for future types of programming.

What is needed is needed is an Operations Center that can control certain features and software of a television delivery system.

What is needed is an Operations Center that operates in the digital audio/video environment.

What is needed is an Operations Center that formulates program menus for viewer use.

What is needed is a computer assisted program packaging system.

What is needed is an Operations Center that includes a method for billing consumers.

What is needed is an Operations Center that analyzes data on programs watched by viewers.

The present invention is addressed to fulfillment of these needs.

SUMMARY OF INVENTION

This invention is a center for controlling the operations of a digital television program delivery system. Specifically, the present invention is an Operations Center that allows for the organizing and packaging of television programs for transmission in a television delivery system.

The Operations Center is the nerve center of the television program delivery system. It receives data on viewership behavior and utilizes the data to assist in packaging programs for future viewing. The Operations Center is a particularly useful invention for television delivery systems which will provide users with the ability to select programs from on-screen menus.

The Operations Center's primary component is a computer assisted packaging system (CAP), which makes use of the necessary hardware and software to control and transmit programming signals over a television delivery system. This computer assisted packaging system creates the program lineup or packaging of programs and the packaging of menu and control information for later transmission and use in the cable television systems. The CAP can be specially designed to generate graphical menu displays for user selection of programs. The hardware and software for controlling and transmitting programming signals over the television delivery system is particularly useful in large television delivery systems which include satellite transmissions to cable headends.

The software of the CAP performs the functions of gathering analog (and/or digital) program signals from a variety of sources such as broadcast television, premium channels, and video disk. The software also packages the programs efficiently for the available bandwidth and for subscriber viewing through computer assisted creation of program line-up and allocating of bandwidth. The line-ups are created to effectively group programming for display in menus by categories. The television programs are packaged with the program control information (such as cost for viewing certain program) and menu information.

The Operations Center of the present invention provides a method for remote management and control of local cable and CATV programs available and on-screen menu displays shown to subscribers. The Operations Center's computer software programs and hardware provide "real-time" control over cable and CATV systems. By transmitting appropriate control information the Operations Center has the ability to change allocation of programs across physical channels, update menu information (from the Operations Center location), reprogram menu formats and menu flow, and change or augment a packaged program signal sent to a particular region of the country. The Operations Center is able to control remotely certain features and software of the set top terminals and if necessary reprogram menu display software stored at the set top terminals.

In order to properly manage program lineups, the Operations Center acquires viewer information on programs watched. Such viewer information includes information about the buy rates of specific shows, viewer preferences for programming, and the like, gathered by recording viewer transactions. A compilation of viewer information data is needed in order to make decisions on future individualized program lineup and program packaging. In addition, allocation of menu space and construction of menus is aided by the use of viewer information data. This information is received from the set top terminals using a feedback loop, usually through the cable headends.

The present invention is not only able to operate in the digital environment but introduces many new features to television program delivery.

It is an object of this invention to provide a system for efficiently organizing television programs to be offered to viewers.

It is an object of this invention to provide an Operations Center for a television program delivery system.

It is an object of this invention to provide an Operations Center for a television program delivery system which can gather television programming in a variety of formats, package the programs, and deliver the packaged programs.

It is an object of this invention to provide an Operations Center for a program delivery system which presents programming viewing options to the consumer through a user friendly interface which allows the consumer to easily select from among the many program choices.

It is an object of this invention to provide an Operations Center that is capable of handling video/audio programming in different formats.

It is an object of this invention to provide an Operations Center capable of offering interactive television, high definition television (HDTV) and/or other advanced television features.

It is an object of this invention to provide an Operations Center that can control software and program features at the cable headend.

It is an object of this invention to provide an Operations Center that can control and if necessary reprogram set top terminals.

It is an object of this invention to provide an Operations Center for a digital program delivery system.

It is an object of this invention to provide an Operations Center that designs program menus.

It is an object of this invention to provide an Operations Center that uses data on programs viewed to create or aid in the selection of program line-ups.

It is an object of this invention to provide a computer assisted program packaging system for a television program delivery system.

These and other objects and advantages of the invention will become obvious to those skilled in the art upon review of the following description, the attached drawings and appended claims.

DESCRIPTION OF THE DRAWINGS

FIG. 6a is a chart of the program control information carried by the program control information signal.

FIG. 6b shows a bit-wise data format for program control information.

FIG. 14 is a diagram of the bandwidth allocation for a 750 Mhz system.

FIG. 15 is a diagram/chart of the compressed channel allocation for the system.

FIG. 16 is a diagram showing how three cable television systems each with a different bandwidth may use the program delivery system and operations center of the present invention simultaneously.

FIG. 23b is a drawing of the basic menus used in the present invention, in addition to FIG. 23a.

FIG. 26 is a drawing of an alternative of a home menu.

FIG. 30b is a drawing of a hit movie during program hidden menu.

FIGS. 32a, 32b, 32c, 32d, 32e and 32f are drawings of menus related to program guide services.

FIGS. 32i, 32j and 32k are drawings of mood question menus.

FIGS. 33a, 33b, and 33c are drawings of interactive television promotional menus, for Levels A–C.

FIGS. 34a, 34b, 34c, 34d, 34e, 34f, 34g, 34h, 34i, 34j, 34k and 34l are drawings of interactive services, Level B, particularly related to on-screen airline reservations.

FIGS. 35a, 35b, 35c, 35d and 35e are drawings of menus for digital audio services.

FIGS. 36a, 36b, 37a and 37b are drawings of monthly account menus.

DETAILED DESCRIPTION OF THE PREFERRED EMBODIMENT

A. Television Program Delivery System Description

1. Introduction

Figure 1:
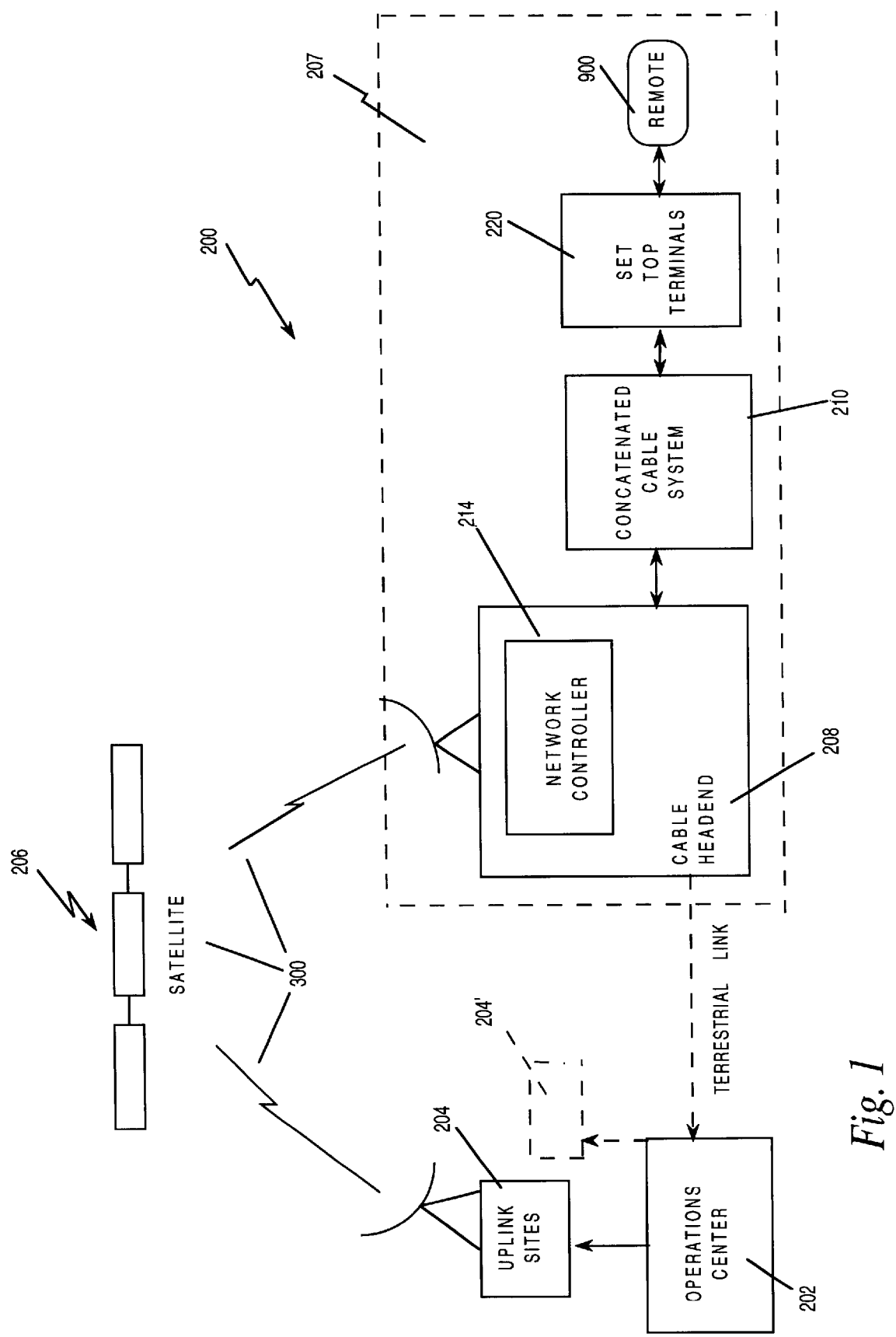
FIG. 1 is a diagram of the primary components of the television delivery system.

FIG. 1 shows the present invention as part of an expanded cable television program delivery system 200 that dramatically increases programming capacity using compressed transmission of television program signals. Developments in digital bandwidth compression technology now allow much greater throughput of television program signals over existing or slightly modified transmission media. The program delivery system 200 shown provides subscribers with a user friendly interface to operate and exploit a six-fold or more increase in current program delivery capability.

Subscribers are able to access an expanded television program package and view selected programs through a menu-driven access scheme that allows each subscriber to select individual programs by sequencing a series of menus. The menus are sequenced by the subscriber using simple alpha-numeric and iconic character access or moving a cursor or highlight bar on the TV screen to access desired programs by simply pressing a single button, rather than recalling from memory and pressing the actual two or more digit numeric number assigned to a selection. Thus, with the press of a single button, the subscriber can advance from one menu to the next. In this fashion, the subscriber can sequence the menus and select a program from any given menu. The programs are grouped by category so that similar program offerings are found on the same menu.

2. Major System Components

In its most basic form, the system uses a program delivery system 200 in conjunction with a conventional concatenated cable television system 210. The program delivery system 200 generally includes (i) at least one operations center 202, where program packaging and control information are created and then assembled in the form of digital data, (ii) a digital compression system, where the digital data is compressed, combined/multiplexed, encoded, and mapped into digital signals for satellite transmission to the cable headend 208, and (iii) a set of in-home decompressors. The program delivery system 200 transports the digital signals to the cable headend 208 where the signals are transmitted through a concatenated cable television system 210. Within the cable headend 208, the received signals may be decoded, demultiplexed, managed by a local central distribution and switching mechanism, combined and then transmitted to the set top terminal 220 located in each subscriber's home over the cable system 210. Although concatenated cable systems 210 are the most prevalent transmission media to the home, telephone lines, cellular networks, fiberoptics, Personal Communication Networks and similar technology for transmitting to the home can be used interchangeably with this program delivery system 200.

The delivery system 200 has a reception region 207 with an in-home decompression capability. This capability is performed by a decompressor housed within a set top terminal 220 in each subscriber's home. The decompressor remains transparent from the subscriber's point of view and allows any of the compressed signals to be demultiplexed and individually extracted from the composite data stream and then individually decompressed upon selection by the subscriber. The decompressed video signals are converted into analog signals for television display. Such analog signals include NTSC formatted signals for use by a standard television. Control signals are likewise extracted and decompressed and then either executed immediately or placed in local storage such as a RAM. Multiple sets of decompression hardware may be used to decompress video and control signals. The set top terminal 220 may then overlay or combine different signals to form the desired display on the subscriber's television. Graphics on video or picture-on-picture are examples of such a display.

Although a single digital compression standard (e.g., MPEG) may be used for both the program delivery system 200 and the concatenated cable system 210, the compression technique used may differ between the two systems. When the compression standards differ between the two media, the signals received by the cable headend 208 must be decompressed before transmission from the headend 208 to the set top terminals 220. Subsequently, the cable headend 208 must recompress and transmit the signals to the set top terminal 220, which would then decompress the signals using a specific decompression algorithm.

The video signals and program control signals received by the set top terminal 220 correspond to specific television programs and menu selections that each subscriber may access through a subscriber interface. The subscriber interface is a device with buttons located on the set top terminal 220 or on a portable remote control 900. In the preferred system embodiment, the subscriber interface is a combined alpha-character, numeric and iconic remote control device 900, which provides direct or menu-driven program access. The preferred subscriber interface also contains cursor movement and go buttons as well as alpha, numeric and iconic buttons. This subscriber interface and menu arrangement enables the subscriber to sequence through menus by choosing from among several menu options that are displayed on the television screen. In addition, a user may bypass several menu screens and immediately choose a program by selecting the appropriate alpha-character, numeric or iconic combinations on the subscriber interface. In the preferred embodiment, the set top terminal 220 generates the menus that are displayed on the television by creating arrays of particular menu templates, and the set top terminal 220 displays a specific menu or submenu option for each available video signal.

3. Operations Center and Digital Compression System

Figure 2:
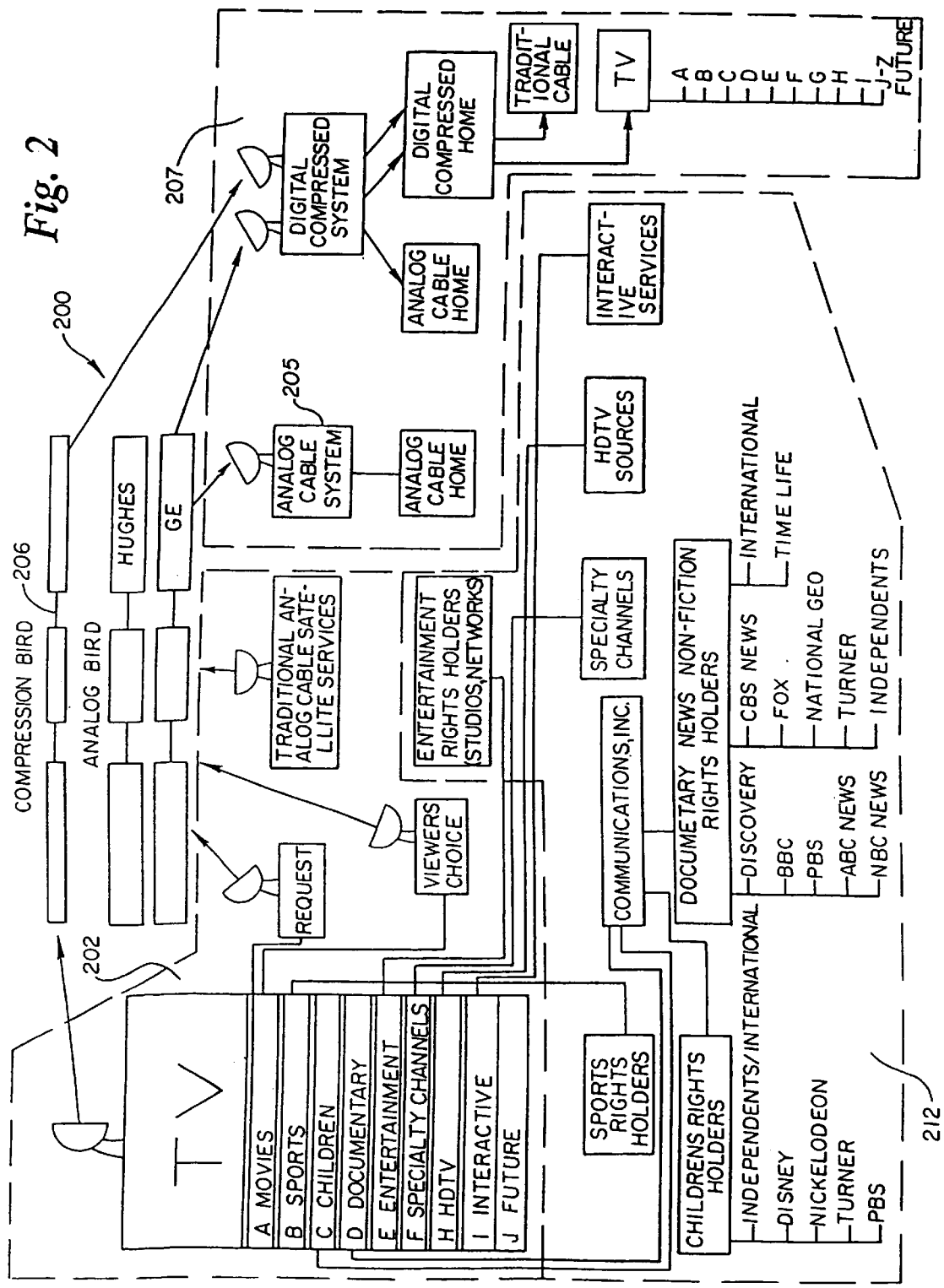
FIG. 2 is an overview of the television delivery system operations.

The operations center 202 performs two primary services, packaging television programs and generating the program control information signal. At the operations center 202, television programs are received from external program sources in both analog and digital form. FIG. 2 shows an embodiment of the operations center receiving signals from various external sources 212. Examples of the external program sources are sporting events, children's programs, specialty channels, news or any other program source that can provide audio or visual signals. Once the programs are received from the external program sources, the operations center 202 digitizes (and preferably compresses) any program signals received in analog form. The operations center 202 may also maintain an internal storage of programs. The internally stored programs may be in analog or digital form and stored on permanent or volatile memory sources, including magnetic tape or RAM. Subsequent to receiving programming, the operations center 202 packages the programs into the groups and categories which provide the optimal marketing of the programs to subscribers. For example, the operations center 202 may package the same programs into different categories and menus for weekday, prime-time viewing and Saturday afternoon viewing. Also, the operations center 202 packages the television programs in a manner that enables both the various menus to easily represent the programs and the subscribers to easily access the programs through the menus.

The packaging of the digital signals is typically performed at the operations center 202 by computer assisted packaging equipment (CAP). The CAP system normally includes at least one computer monitor, keyboard, mouse, and standard video editing equipment. A programmer packages the signals by entering certain information into the CAP. This information includes the date, time slot, and program category of the various programs. The programmer and the CAP utilize demographic data and ratings in performing the packaging tasks. After the programmer selects the various programs from a pool of available programs and inputs the requisite information, the programmer, with assistance from the CAP, can select the price and allocate transponder space for the various programs. After the process is complete, the CAP displays draft menus or program schedules that correspond to the entries of the programmer. The CAP may also graphically display allocation of transponder space. The programmer may edit the menus and transponder allocation several times until satisfied with the programming schedule. During the editing, the programmer may direct the exact location of any program name on a menu with simple commands to the CAP.

The packaging process also accounts for any groupings by satellite transponder which are necessary. The operations center 202 may send different groups of programs to different cable headends 208 and/or set top terminals 220. One way the operations center 202 may accomplish this task is to send different program packages to each transponder. Each transponder, or set of transponders, then relays a specific program package to specific cable headends 208 and/or set top terminals 220. The allocation of transponder space is an important task performed by the operations center 202.

The operations center 202 may also "insert" directions for filling local available program time in the packaged signal to enable local cable and television companies to fill the program time with local advertising and/or local programming. Consequently, the local cable headends 208 are not constrained to show only programs transmitted from the operations center 202. New set top converters will incorporate both digital and analog channels. Therefore, the cable headend 208 may combine analog signals with the digital signals prior to transmitting the program signals to the set top terminals 220.

After the CAP packages the programs, it creates a program control information signal to be delivered with the program package to the cable headend 208 and/or set top terminal 220. The program control information signal contains a description of the contents of the program package, commands to be sent to the cable headend 208 and/or set top terminal 220, and other information relevant to the signal transmission.

In addition to packaging the signal, the operations center 202 employs digital compression techniques to increase existing satellite transponder capacity by at least a 4:1 ratio, resulting in a four-fold increase in program delivery capability. A number of digital compression algorithms currently exist which can achieve the resultant increase in capacity and improved signal quality desired for the system. The algorithms generally use one or more of three basic digital compression techniques: (1) within-frame (intraframe) compression, (2) frame-to-frame (interframe) compression, and (3) within carrier compression. Specifically, in the preferred embodiment, the MPEG 2 compression method is used. After digital compression, the signals are combined (multiplexed) and encoded. The combined signal is subsequently transmitted to various uplink sites 204.

There may be a single uplink site 204 or multiple uplink sites (represented by 204', shown in phantom in FIG. 1) for each operation center 202. The uplink sites 204 may either be located in the same geographical place or may be located remotely from the operations center 202. Once the composite signal is transmitted to the uplink sites 204, the signal may be multiplexed with other signals, modulated, upconverted and amplified for transmission over satellite. Multiple cable headends 208 may receive such transmissions.

In addition to multiple uplinks, the delivery system 200 may also contain multiple operations centers. The preferred method for using multiple operations centers is to designate one of the operations centers as a master operations center and to designate the remaining operations centers as slave operations centers. In this configuration, the master operations center coordinates various functions among the slave operations centers such as synchronization of simultaneous transmissions and distributes the operations workload efficiently.

4. Cable Headend

After the operations center 202 has compressed and encoded the program signals and transmitted the signals to the satellite, the cable headend 208 receives and further processes the signals before they are relayed to each set top terminal 220. Each cable headend site is generally equipped with multiple satellite receiver dishes. Each dish is capable of handling multiple transponder signals from a single satellite and sometimes from multiple satellites.

Figure 3:
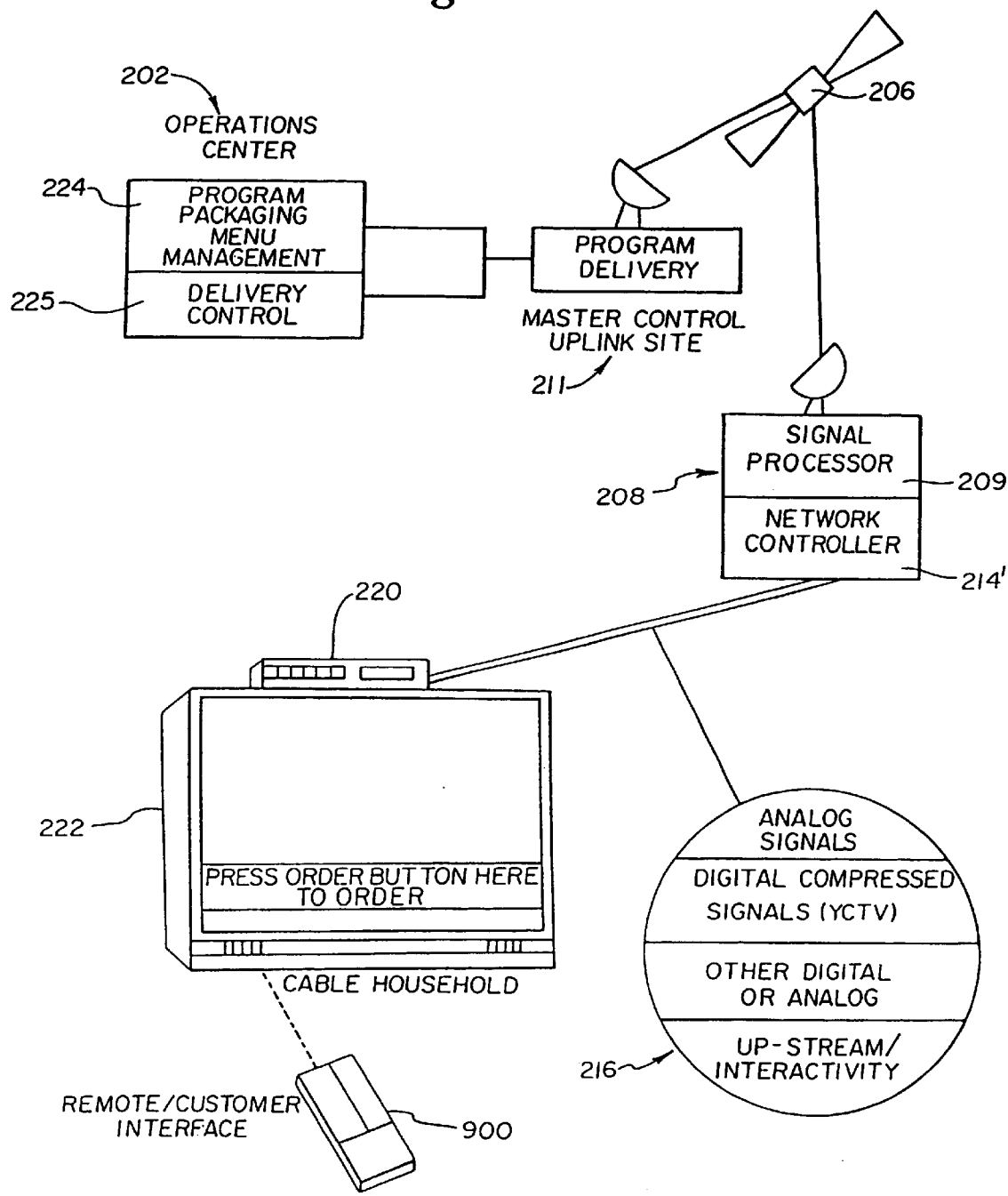
FIG. 3 is a schematic of the operation of the primary components of the system.

With reference to FIG. 3, as an intermediary between the set top terminals 220 and the operations center 202 and master control uplink site 211 (or other remote site), the cable headend 208 performs two primary functions. First, the cable headend 208 acts as a distribution center, or signal processor, by relaying the program signal to the set top terminal 220 in each subscriber's home. In addition, the cable headend 208 acts as a network controller 214 by receiving information from each set top terminal 220 and passing such information on to an information gathering site such as the operations center 202.

FIG. 3 shows an embodiment where the cable headend 208 and the subscriber's home are linked by certain communications media 216. In this particular embodiment, analog signals, digitally compressed signals, other digital signals and up-stream/interactivity signals are sent and received over the media 216. The cable headend 208 provides such signaling capabilities in its dual roles as a signal processor 209 and network controller 214.

As a signal processor 209, the cable headend 208 prepares the program signals that are received by the cable headend 208 for transmission to each set top terminal 220. In the preferred system, the signal processor 209 re-routes or demultiplexes and recombines the signals and digital information received from the operations center 202 and allocates different portions of the signal to different frequency ranges. Cable headends 208 which offer different subscribers different program offerings may allocate the program signals from the operations center 202 in various manners to accommodate different viewers. The signal processor 209 may also incorporate local programming and/or local advertisements into the program signal and forward the revised signal to the set top terminals 220. To accommodate this local programming availability, the signal processor 209 must combine the local signal in digital or analog form with the operations center program signals. If the local cable system uses a compression standard that is different than the one used by the operations center 202, the signal processor 209 must also decompress and recompress incoming signals so they may be properly formatted for transmission to the set top terminals 220. This process becomes less important as standards develop (i.e., MPEG 2). In addition, the signal processor 209 performs any necessary signal decryption and/or encryption.

As a network controller 214, the cable headend 208 performs the system control functions for the system. The primary function of the network controller 214 is to manage the configuration of the set top terminals 220 and process signals received from the set top terminals 220. In the preferred embodiment, the network controller 214 monitors, among other things, automatic poll-back responses from the set top terminals 220 remotely located at each subscribers' home. The polling and automatic report-back cycle occurs frequently enough to allow the network controller 214 to maintain accurate account and billing information as well as monitor authorized channel access. In the simplest embodiment, information to be sent to the network controller 214 will be stored in RAM within each subscriber's set top terminal 220 and will be retrieved only upon polling by the network controller 214. Retrieval may, for example, occur on a daily, weekly or monthly basis. The network controller 214 allows the system to maintain complete information on all programs watched using a particular set top terminal 220.

The network controller 214 is also able to respond to the immediate needs of a set top terminal 220 by modifying a program control information signal received from the operations center 202. Therefore, the network controller 214 enables the delivery system to adapt to the specific requirements of individual set top terminals 220 when the requirements cannot be provided to the operations center 202 in advance. In other words, the network controller 214 is able to perform "on the fly programming" changes. With this capability, the network controller 214 can handle sophisticated local programming needs such as, for example, interactive television services, split screen video, and selection of different foreign languages for the same video. In addition, the network controller 214 controls and monitors all compressors and decompressors in the system.

The delivery system 200 and digital compression of the preferred embodiment provides a one-way path from the operations center 202 to the cable headend 208. Status and billing information is sent from the set top terminal 220 to the network controller 214 at the cable headend 208 and not directly to the operations center 202. Thus, program monitoring and selection control will take place only at the cable headend 208 by the local cable company and its decentralized network controllers 214 (i.e., decentralized relative to the operations center 202, which is central to the program delivery system 200). The local cable company will in turn be in communication with the operations center 202 or a regional control center (not shown) which accumulates return data from the set top terminal 220 for statistical or billing purposes. In alternative system embodiments, the operations center 202 and the statistical and billing sites are collocated. Further, telephone lines with modems are used to transfer information from the set top terminal 220 to the statistical and billing sites.

5. Set Top Terminal

The set top terminal 220 is the portion of the delivery system 200 that resides in the home of a subscriber. The set top terminal 220 is usually located above or below the subscriber's television, but it may be placed anywhere in or near the subscriber's home as long as it is within the range of the subscriber's remote control device 900. In some aspects, the set top terminal 220 may resemble converter boxes already used by many cable systems. For instance, each set top terminal 220 may include a variety of error detection, decryption, and coding techniques such as anti-taping encoding. However, it will become apparent from the discussion below that the set top terminal 220 is able to perform many functions that an ordinary converter box cannot perform.

The set top terminal 220 has a plurality of input and output ports to enable it to communicate with other local and remote devices. The set top terminal 220 has an input port that receives information from the cable headend 208. In addition, the unit has at least two output ports which provide communications from the set top terminal 220 to a television and a VCR Certain menu selections may cause the set top terminal 220 to send control signals directly to the VCR to automatically program or operate the VCR. Also, the set top terminal 220 contains a phone Jack which can be used for maintenance, trouble shooting, reprogramming and additional customer features. The set top terminal 220 may also contain stereo/audio output terminals and a satellite dish input port.

Functionally, the set top terminal 220 is the last component in the delivery system chain. The set top terminal 220 receives compressed program and control signals from the cable headend 208 (or, in some cases, directly from the operations center 202). After the set top terminal 220 receives the individually compressed program and control signals, the signals are demultiplexed, decompressed, converted to analog signals (if necessary) and either placed in local storage (from which the menu template may be created), executed immediately, or sent directly to the television screen.

After processing certain signals received from the cable headend 208, the set top terminal 220 is able to store menu templates for creating menus that are displayed on a subscriber's television by using an array of menu templates. Before a menu can be constructed, menu templates must be created and sent to the set top terminal 220 for storage. A microprocessor uses the control signals received from the operations center 202 or cable headend 208 to generate the menu templates for storage. Each menu template may be stored in volatile memory in the set top terminal 220. When the set top terminal receives template information it demultiplexes the program control signals received from the cable headend 208 into four primary parts: video, graphics, program logic and text. Each menu template represents a different portion of a whole menu, such as a menu background, television logo, cursor highlight overlay, or other miscellaneous components needed to build a menu. The menu templates may be deleted or altered using control signals received from the operations center 202 or cable headend 208.

Once the menu templates have been stored in memory, the set top terminal 220 can generate the appropriate menus. In the preferred embodiment, the basic menu format information is stored in memory located within the set top terminal 220 so that the microprocessor may locally access the information from the set top terminal instead of from an incoming signal. The microprocessor next generates the appropriate menus from the menu templates and the other menu information stored in memory. The set top terminal 220 then displays specific menus on the subscriber's television screen that correspond to the inputs the subscriber selects.

If the subscriber selects a specific program from a menu, the set top terminal 220 determines on which channel the program is being shown, demultiplexes and extracts the single channel transmitted from the cable headend 208. The set top terminal 220 then decompresses the channel and, if necessary, converts the program signal to an analog NTSC signal to enable the subscriber to view the selected program. The set top terminal 220 can be equipped to decompress more than one program signal, but this would unnecessarily add to the cost of the unit since a subscriber will generally only view one program at a time. However, two or three decompressors may be desirable to provide picture-on-picture capability, control signal decompression, enhanced channel switching or like features.

In addition to menu information, the set top terminal 220 may also store text transmitted from the cable headend 208 or the operations center 202. The text may inform the subscriber about upcoming events, billing and account status, new subscriptions, or other relevant information. The text will be stored in an appropriate memory location depending on the frequency and the duration of the use of the textual message.

Also, optional upgrades are available to enhance the performance of a subscriber's set top terminal 220. These upgrades may consist of a cartridge or computer card (not shown) that is inserted into an expansion slot in the set top terminal 220 or may consist of a feature offered by the cable headend 208 or operations center 202 to which the user may subscribe. Available upgrades may include on line data base services, interactive multi-media services, access to digital radio channels, and other services.

In the simplest embodiment, available converter boxes such as those manufactured by General Instruments or Scientific Atlanta, may be modified and upgraded to perform the functions of a set top terminal 220. The preferred upgrade is a circuit card with a microprocessor which is electronically connected to or inserted into the converter box.

6. Remote Control Device

The primary conduit for communication between the subscriber and the set top terminal 220 is through the subscriber interface, preferably a remote control device 900. Through this interface, the subscriber may select desired programming through the system's menu-driven scheme or by directly accessing a specific channel by entering the actual channel number. Using the interface, the subscriber can navigate through a series of informative program selection menus. By using menu-driven, iconic or alpha-character access, the subscriber can access desired programs by simply pressing a single button rather than recalling from memory and pressing the actual channel number to make a selection. The subscriber can access regular broadcast and basic cable television stations by using either the numeric keys on the remote control 900 (pressing the corresponding channel number), or one of the menu icon selection options.

In addition to enabling the subscriber to easily interact with the cable system 200, the physical characteristics of the subscriber interface 900 should also add to the user friendliness of the system. The remote control 900 should easily fit in the palm of the user's hand. The buttons of the preferred remote control 900 contain pictorial symbols that are easily identifiable by the subscriber. Also, buttons that perform similar functions may be color coordinated and consist of distinguishing textures to increase the user friendliness of the system.

7. Menu-Driven Program Selection

The menu-driven scheme provides the subscriber with one-step access to all major menus, ranging from hit movies to sport specials to specialty programs. From any of the major menus, the subscriber can in turn access submenus and minor menus by cursor or alpha-character access.

There are two different types of menus utilized by the preferred embodiment, the Program Selection menus and the During Program menus. The first series of menus, Program Selection menus, consists of an Introductory, a Home, Major menus, and Submenus. The second series of menus, During Program menus, consists of two primary types, Hidden menus and the Program Overlay menus.

Immediately after the subscriber turns on the set top terminal 220, the Introductory menu welcomes the subscriber to the system. The Introductory menu may display important announcements from the local cable franchise, advertisements from the cable provider, or other types of messages. In addition, the Introductory menu can inform the subscriber if the cable headend 208 has sent a personal message to the subscriber's particular set top terminal 220.

After the Introductory menu has been displayed the subscriber may advance to the next level of menus, namely the Home menu. In the preferred embodiment, after a certain period of time, the cable system will advance the subscriber by default to the Home menu. From the Home menu, the subscriber is able to access all of the programming options. The subscriber may either select a program directly by entering the appropriate channel number from the remote control 900, or the subscriber may sequence through incremental levels of menu options starting from the Home menu. The Home menu lists categories that correspond to the first level of menus called Major menus.

If the subscriber chooses to sequence through subsequent menus, the subscriber will be forwarded to the Major menu that corresponds to the chosen category from the Home menu. The Major menus further refine a subscriber's search and help guide the subscriber to the selection of his choice.

From the Major menus, the subscriber may access several submenus. From each submenu, the subscriber may access other submenus until the subscriber finds a desired television program. Similar to the Major menu, each successive level of Submenus further refines the subscriber's search. The system also enables the subscriber to skip certain menus or submenus and directly access a specific menu or television program by entering the appropriate commands on the remote control 900.

The During program menus (including Hidden Menus and Program Overlay Menus) are displayed by the set top terminal 220 only after the subscriber has selected a television program. In order to avoid disturbing the subscriber, the set top terminal 220 does not display the Hidden Menus until the subscriber selects the appropriate option to display a Hidden Menu. The Hidden Menus contain options that are relevant to the program selected by the viewer. For example, a Hidden Menu may contain options that enable a subscriber to enter an interactive mode or escape from the selected program.

Program Overlay Menus are similar to Hidden Menus because they occur during a program and are related to the program being viewed. However, the Program Overlay Menus are displayed concurrently with the program selected by the subscriber. Most Program Overlay Menus are small enough on the screen to allow the subscriber to continue viewing the selected program comfortably.

B. Operations Center with Computer Assisted Packaging System

Figure 4:
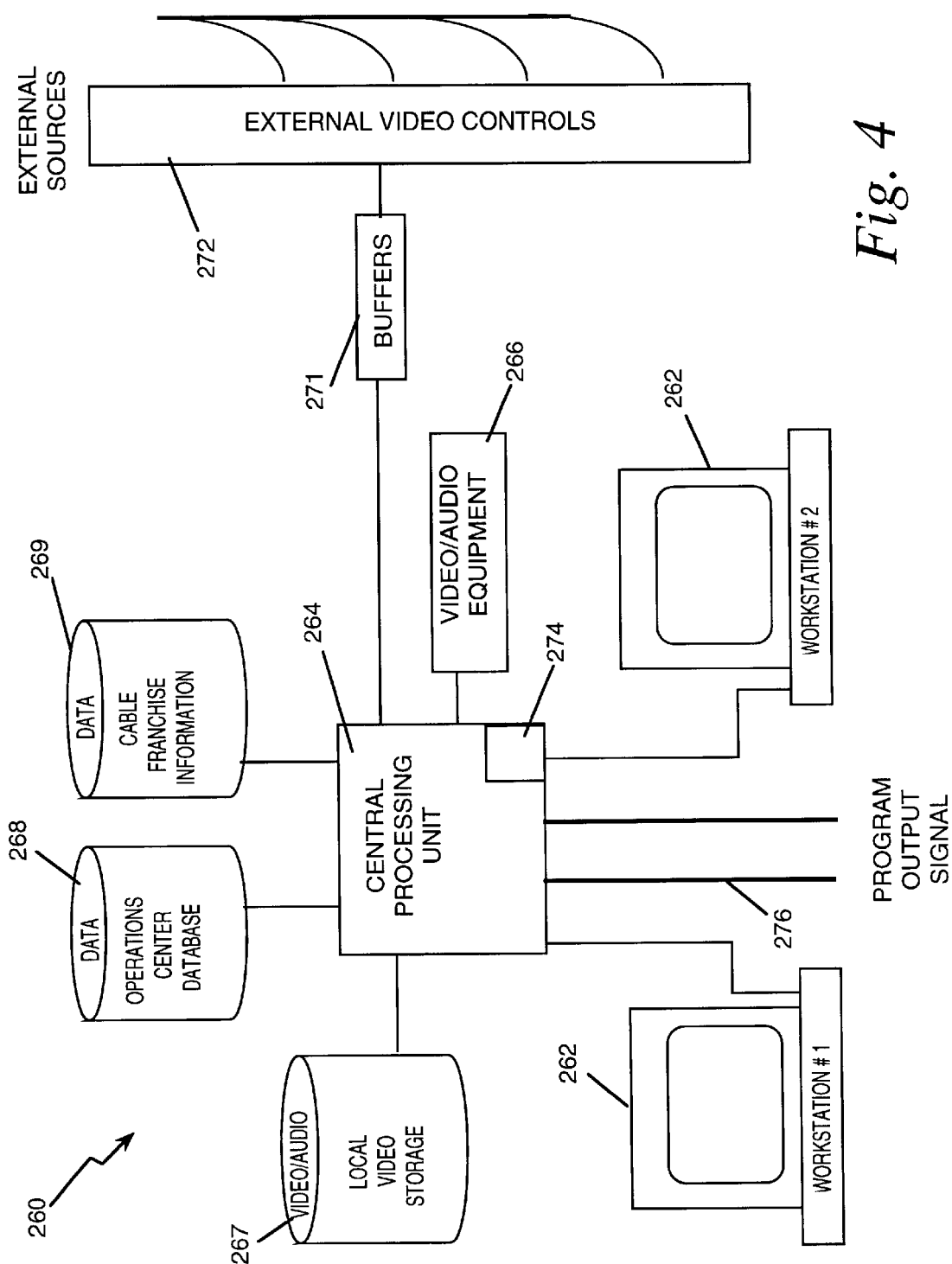
FIG. 4 is a schematic of the primary components of the Computer Assisted Packaging System (CAP).

FIG. 4 broadly shows the configuration for the computer assisted packaging system (CAP) 260 of the Operations Center 202. The primary components of the CAP 260 consist of multiple packager workstations 262, a central processing unit 264, video/audio editing equipment 266, and one or more databases 268 and 269. Additional remotely located databases, such as local video storage database 267, and buffers 271 and controllers 272 for external program feeds make up the peripherals of the CAP system 260.

The heart of the CAP 260 is a central processing unit 264 which communicates with all the component parts of the CAP 260. The central processing unit 264 can be a powerful PC, a mini-computer, a mainframe or a combination of computing equipment running in parallel. The central processing unit 264 includes all the necessary interconnections to control peripheral equipment such as the external video controls 272. The central processing unit 264 has sufficient memory 274 to store the program instructions of the subroutines which operate the CAP 260.

The CAP 260 receives data from one or more databases, such as the Operations Center Database 268 and the Cable Franchise Information Database 269 shown in FIG. 4. In addition, separate databases are maintained of viewer information, such as demographics and programs viewed. The CAP 260 can control the reception of external sources by enabling and disenabling the external video controls 272. The external video controls 272 include buffers to delay as necessary external programs received by the Operations Center 202.

The functions of the video/audio equipment 266 include digitizing analog programs, digitizing and compressing analog programs (in a single step, e.g., MPEG), and compressing digital program signals as requested by the central processing unit 264.

The CAP 260 receives video and audio from two sources: internally from a local video storage 267 and externally from external sources through external video controls 272. When necessary, video is manipulated, formatted and/or digitized using video/audio equipment 266 which is controlled by CAP 264.

Referring back to FIG. 2, an overview of an operating cable television menu driven program delivery system 200 highlighting various external programming signal sources 212 is depicted. The Operations Center 202 is shown receiving external programming signals which correspond to particular programming categories that are available for a subscriber's viewing. These external signals may be in analog or digital form and may be received via landline, microwave transmission, or satellite. Some of these external signals may be transmitted from the program source 212 to the Operations Center 202 in compressed digital format or other nonstandard digital formats. These external signals are received and packaged with programming that is stored at the Operations Center 202. Examples of external program sources 212 shown in FIG. 2 are: Sporting events, children's programs, documentaries, high definition TV sources, specialty channels, interactive services, weather, news, and other nonfiction or entertainment. Any source that can provide either audio or video or both may be utilized to provide programming to the Operations Center 202.

In order to achieve the required throughput of video and audio information for the system, digital compression techniques are employed. A television signal is first digitized. The object of digitization is two-fold: First, in the case of an analog signal, like a television picture, digitization allows the signal to be converted from a waveform into a digital binary format. Secondly, through the use of digital compression techniques, standard digital formats are designed to have the resulting pictures or video stills take up less space on their respective storage mediums. Essentially, as described below, a standard digital format will define the method of compression used.

There are three basic digital compression techniques: within-frame (intraframe), frame-to-frame (interframe), and within-carrier. Intraframe compression processes each frame in a television picture to contain fewer visual details and, therefore, the picture contains fewer digital bits. Interframe compression transmits only changes between frames, thus omitting elements repeated in successive frames. Within-carrier compression allows the compression ratio to dynamically vary depending upon the amount of changes between frames. If a large number of changes occur between frames, the compression ratio drops from, for example, sixteen-to-one to eight-to-one. If action is intense, the compression ratio may dip to four to one.

Several standard digital formats representing both digitizing standards and compression standards have been developed. For example, JPEG (joint photographic experts group) is a standard for single picture digitization. Motion picture digitization may be represented by standards such as MPEG or MPEG 2(motion picture engineering group specifications). Other proprietary standards have been developed in addition to these. The preferred embodiment uses the MPEG-2 standard of coding and those of ordinary skill in the art are presumed to be familiar with the MPEG-2 standard. The MPEG-2 Systems Working Draft Proposal from the Systems Committee of the International Organization For Standardization, document ISO/IE JT1/SC29/WG11"N0531" MPEG93 dated Sep. 10, 1993, is hereby incorporated by reference. Although MPEG and MPEG2 for motion pictures are preferred in the present invention, any reliable digital format with compression may be used with the present invention.

Various hybrids of the above compression techniques have been developed by several companies including AT&T, Compression Labs, Inc., General Instrument, Scientific-Atlanta, Phillips, and Zenith. As is known by those skilled in the art, any of the compression techniques developed by these companies, and other known techniques, may be used with the present invention.

With reference to FIG. 4, the human intervention in this system is conducted by a programmer or program packager operating from the one or more work stations 262 connected to the system. These work stations 262 are preferably intelligent work stations with large CRT screens. In the preferred embodiment, a suitable keyboard, mouse and color monitor are used with the workstation. From these work stations, the packager can create program lineups, prioritize programs, initiate dynamic menu allocation, initiate dynamic bandwidth allocation, design menus, place program names and descriptions onto menus, create menus with still and live video, move text on menus, change the colors of objects on menus and perform various other tasks for the program delivery system 200.

Almost any Operations Center 202 function that normally requires human intervention can be conducted at the packager workstation 262. Although data entry for the databases can be performed manually at the workstations 262, it is preferred that the data entry be completed through electronic transfers of information. Alternatively, the data can be loaded from customary portable storage media such as magnetic disks or tape.

Figure 8:
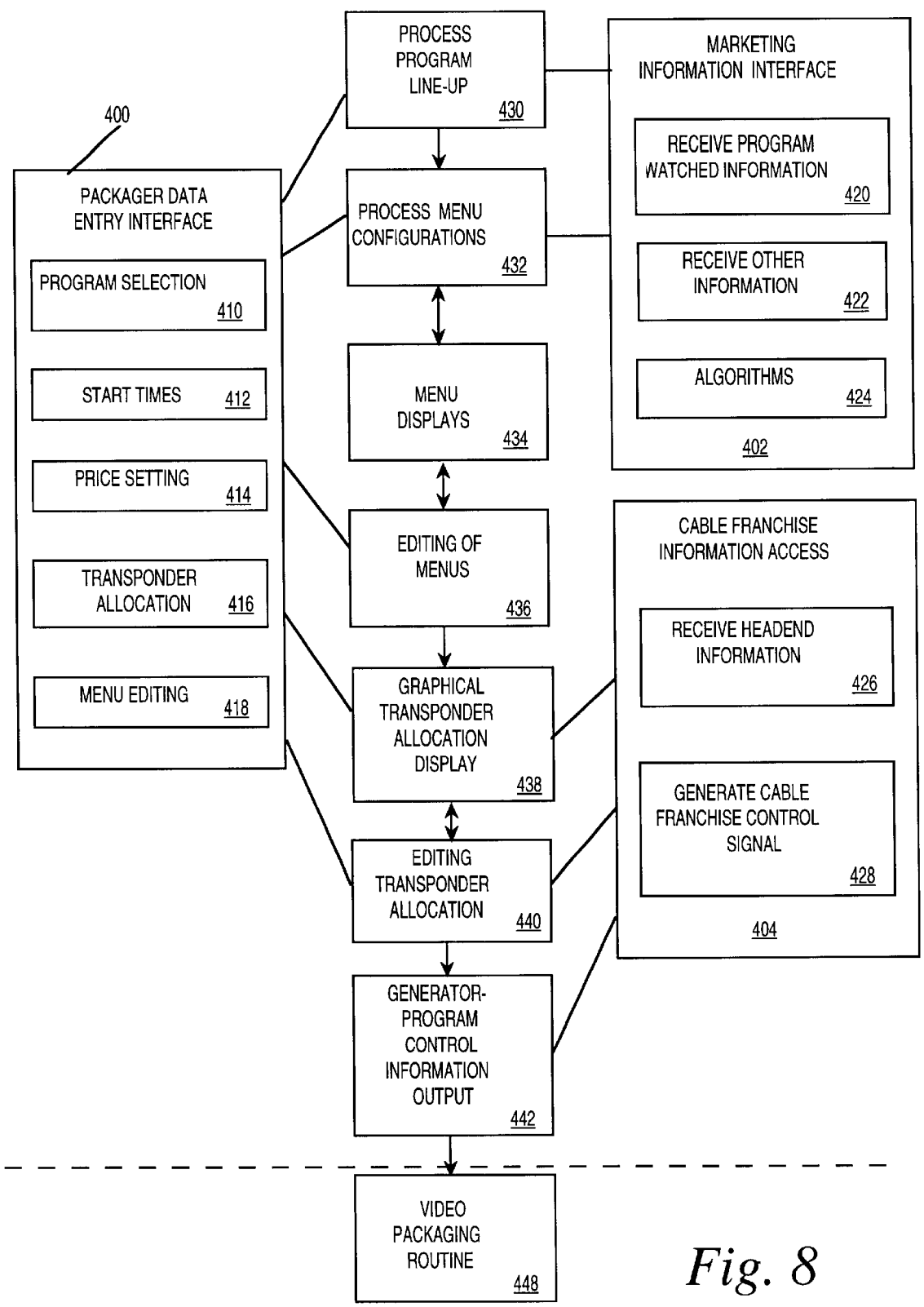
FIG. 8 is a schematic of the subroutines for the CAP software.

An integral part of the Computer Assisting Packaging system is the retrieval of viewer data, and the assimilation of that data into the program packaging method (especially the menu configuration) as discussed in reference to FIG. 8 MII 402. This involves two main steps, first, retrieval of raw data from the set top terminals, and then filtering and presenting that data. Each headend 208 compiles the viewer data, and then sends it verbatim to the Operations Center 202. This raw data is necessary because different responsibilities of the Operations Center 202 require different parts of the raw information. Also a record must be kept of overall data. Once the data is assembled at the Operations Center 202, the data is filtered for each application.

The raw data gathered includes but is not limited to:

What programs a viewer purchased and when it was purchased

What channel a specific viewer watched and for how long.

This information can then be used to calculate the following:

How many viewers watched a particular program.

Peak viewing times for different categories of shows.

Buy rates for particular menu positions.

Menu creation, both automatically and manually, is one of the major CAP functions that involves the incorporation of the raw data. An automated software procedure (such as the EIS) analyzes the data and, using certain heuristics, creates the menus.

One heuristic, for example, is that when a show is not ordered frequently, it is moved closer to the top of the menu for greater visibility. The filtering of the data allows it to be sorted and indexed for display to the user. The program data can be filtered into a new database containing program names and indexed by the number of times each program was purchased. The data can also be indexed by buy times and program categories.

Certain metrics are established to help in evaluating the data. Using the EIS or similar software, sales by menu placement, cost, category and lifespan can be pulled up for viewing in graphic presentation. The graphic presentation, in the form of line or bar graphs, help the packager recognize any trends in the data. For example, the first movie on a movie menu might not have sold as well as a second movie listed. A chart can be pulled up to reveal that the first movie has been at the top of the menu for two weeks and buy rates are naturally falling off. Steps can then be taken to move items in the menus to correct this, though many of these steps are automated in the menu creation system. Suggested changes can be displayed to help the user in this task.

The automated procedures create menus that are distinct between headends 208 because of demographic differences in the viewing audience. To help with this, a separate database of viewer demographics exists and is frequently updated. The headends 208 are able to alter the menu positions in order to further tailor the presentation, or to add local shows. Any changes to the menus are sent back to the Operations Center 202 at the same time as the viewer data, in order to prevent erroneous data analysis. Menu changes at the cable headend are described in detail in co-pending patent application Ser. No. 08/160,280, filed Dec. 2, 1993, entitled Network Controller for a Cable Television System, filed by the same assignee.

Another use for the indexed data is creation of marketing reports. Programming changes are helped by accurate information on viewer preference. Also viewer purchasing trends, and regional interests can be tracked.

In the preferred embodiment, an Executive Information System (EIS) is used to give high level access to both "buy" (what the customer purchases) and "access" (when the product was viewed, how often and duration) data. The EIS represents information in both a graphical and summary report format. "Drill down" functions in the EIS help the packager derive the appropriate product (product refers to programs, events or services) mix.

The purpose of the EIS is to provide an on-line software tool that will allow for real-time evaluation of current product positioning. The design of the system consists of user friendly icons to guide the user through available functions. The functionality in the system provides general information on current programming sales status. By working through the tiers in the system, the user has access to more specific information. The system is designed to shield the user from a long learning curve and information overload.

The graphical tools allow for analysis of current data through the use of multiple graph types such as line graphs, bar and pie charts. These tools will allow the user to manipulate independent variables such as time (hour, day of the week, week, month), demographic information, program category information (genre, property, events), headend information and pricing information for determining the appropriate programming mix within the allotted time slots.

The system also allows the packager to derive expected monetary returns through program line-ups by integrating outside industry databases. For instance, the system could be used to determine expected returns from a particular program by correlating buy information from the existing programs in the line up with a viewer ratings service database to determine the outcome of programs within a particular genre not in the current line up.

Report tools within the EIS aggregate buy access at the highest level. Due to the volume of available information statistical analysis methods are used for deriving marketing intelligence within the EIS.

A yield management tool is incorporated within the EIS. The yield management tool encompasses operations research techniques, statistical methods and neural net technology to decide program mix as it pertains to program substitutes, program complements, time slice positioning, repetitions and menu positioning.

This system is automated to the extent of providing viable alternative as to the proposed product mix. The system encompasses a Monte Carlo simulation for developing alternative product mix scenarios. The system feeds from both internal data and external industry data sources to provide expected revenue projections for the different scenarios. Other software subroutines of the CAP will automatically call upon the EIS to assist the program in important decision making, such as menu configuration and transponder allocation. Human interaction is required to change marketing parameters for fine tuning the desired product scheduling.

Figure 5:
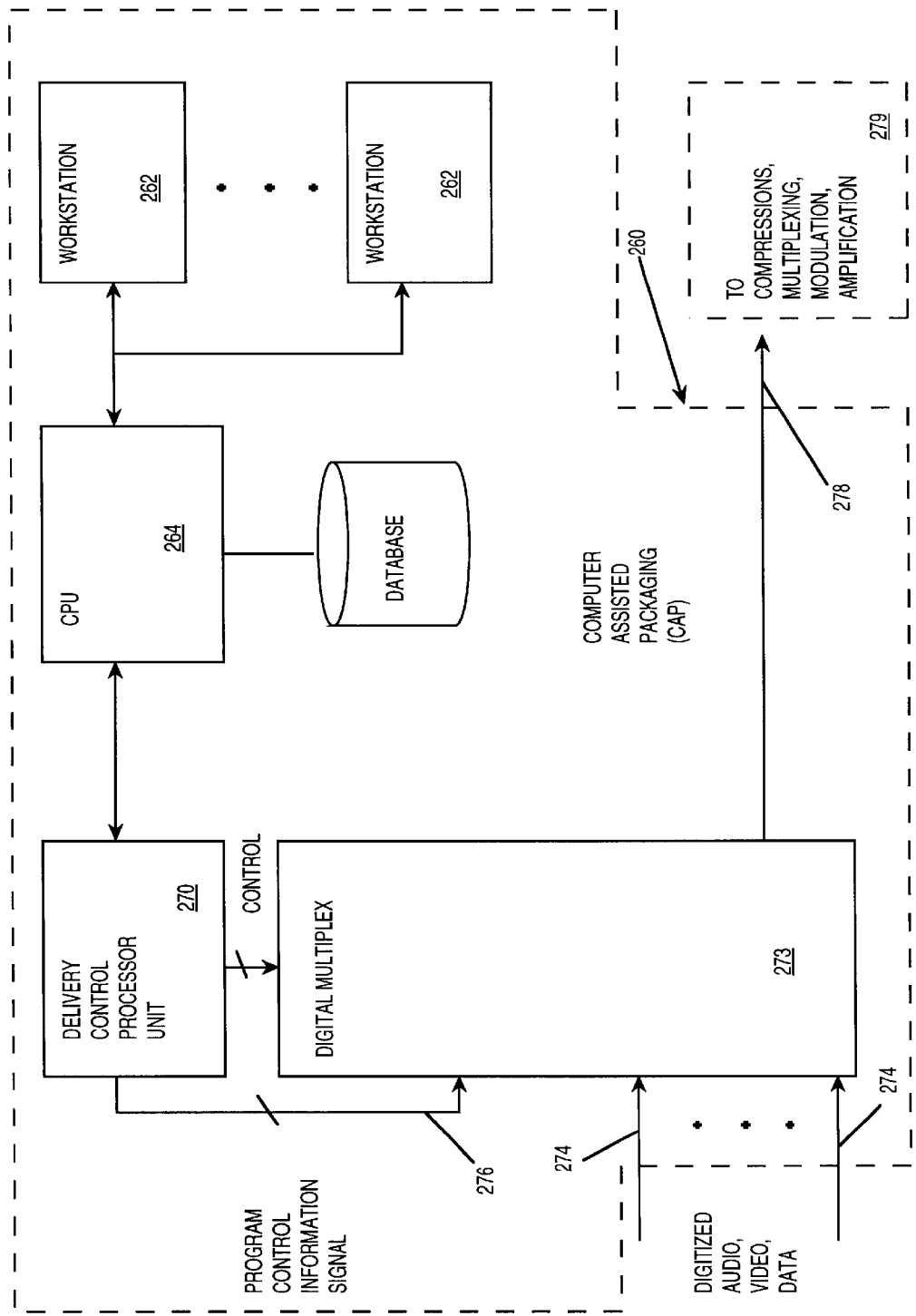
FIG. 5 is a more detailed schematic of the hardware the Operations Center and CAP.

Although the packaging of the program information and programs, including the creation of program control information, program lineup and menu designing configuration, is conducted at the CAP 260, all other functions of the Operations Center 202 can be controlled by a second separate processing unit (shown in FIG. 5 at 270). This second processing unit 270 is the Delivery Control Processing Unit 270, and can perform the tasks of incorporating the program control information signal from the CAP 260, coordinating the receipt and combining of external program video/audio and internal video/audio and combining the signals as necessary for transmission. This distribution of functions among the CAP 260 and Delivery Control Processing Unit 270 allows for greater speed and ease of use.

FIG. 5 shows a more detailed diagram of the CAP 260 and the Delivery Control Processor Unit 270. Once external and stored digital and analog sources have been converted into a standard digital format 274, they are input into standard digital multiplex equipment 273 (of the type manufactured by Scientific Atlanta, General Instruments, and others). Additionally, the Program Control Information Signal 276 is input into the digital multiplex equipment 273. These inputs 274, 276 are multiplexed appropriately under the control of the Delivery Control Processor Unit 270 as commanded by the CPU 264. The Delivery Control Processor Unit 270 is also responsible for the generation of the Program Control Information Signal 276 based on information received from the CPU 264. The Delivery Control Processor Unit 270 allows for the off-loading of real-time and near real-time tasks from the CPU 264. The CPU 264, as described earlier, processes information within its database and provides user access to the CAP 260 via multiple user workstations 262. The high-speed digital output 278 from the digital multiplex equipment 273 is then sent on to the compression (if necessary), multiplexing, modulation and amplification hardware, represented at 279.

C. The Program Control Information Signal

The following table, TABLE A, is an example of some information that can be sent in the program control information signal to the set top terminals 220. The program control information signal generated by the Operations Center 202 provides data on the scheduling and description of programs via the network controller 214 or, in an alternate configuration, directly to the set top terminal 220 for display to the subscriber.

In the preferred embodiment, the program control information signal 276 is stored and modified by the network controller 214 and sent to the set top terminal 220 in the form of a set top terminal control information stream (STTCIS). This configuration accommodates differences in individual cable systems and possible differences in set top converter or terminal devices. The set top terminal 220 of the present invention integrates either the program control signal 276 or the STTCIS, together with data stored in the memory of the set top terminal 220, to generate on-screen menu displays for assisting the subscriber in choosing programs for viewing. throughout the description the term "program control information" is being used to indicate control information coming from the cable headend 208 to the set top terminal 220, whether it is sent directly from the Operations Center 202, processed by the network controller 214, and then forwarded to the set top terminal as STTCIS, or transmitted over telephone lines.)

With further reference to TABLE A below, the types of information that can be sent via the program control signal include: number of program categories, names of program categories, what channels are assigned to a specific category (such as specialty channels), names of channels, names of programs on each channel, program start times, length of programs, description of programs, menu assignment for each program, pricing, whether there is a sample video clip for advertisement for the program, and any other program, menu or product information.

The goal of the menu driven program selection system of the present invention, described in greater detail in a co-pending U.S. Patent application entitled SET TOP TERMINAL FOR CABLE TELEVISION DELIVERY SYSTEM, Ser. No. 08/160,193, filed Dec. 2, 1993, owned by the assignee of the present invention and incorporated herein by reference, is to allow the subscriber to choose a program by touring through a series of menus utilizing a remote control 900 for cursor movement. The final choice in the series of menus will identify one particular channel and one time for activation of that channel. Armed with a channel and activation time the set top terminal 220 can display the selected program on the television for the viewer. To achieve this goal, an intelligent alpha-numeric code is assigned to each program. This alpha-numeric code identifies the category of the program, the menu in which the program should be displayed, its transmission time(s), and the position on the menu that the program should be displayed. In a preferred embodiment, the program control information, including menu codes, is sent continuously from the Operations Center 202 to the network controller 214, and ultimately to the set top terminal 220. For example, four hours worth of programming information can be sent via the program control information signal continuously in the format shown in TABLE A.

TABLE A

| *Program name | | *Program length | *Menu code | *Description | *Video |
|---|---|---|---|---|---|
| | | | 12 PM | | |
| 1 | Cheers | .5 | E24 | C | N |
| 2 | Terminator | 2.0 | A33 | Tx | S |
| 3 | PrimeTime | 1.0 | D14 | N | N |
| 4 | Football Special | .5 | B24 | S | N |
| | | | 12:30 PM | | |
| 1 | Simpsons | .5 | E14 & C13 | C | S |
| 4 | Football Game | 3.0 | B13 | S | N |

TABLE A shows the basic information that is needed by the set top terminal 220. The program descriptions shown are coded abbreviations. For example, C stands for comedy, N for news, S for sports, A for cartoons, and TX for text. If there is a textual description for a program, such as a movie, the description may be given following that program's coded description or may be communicated following the four hours of programming information. As is shown in the coded listing, program descriptions for programs greater than a half hour in length need not be repeated (each half hour). The video description code informs the set top terminal 220 whether there is still or live video available to advertise the program.

For example, a sporting program may be assigned a code of B35-010194-1600-3.25-Michigan St. vs. USC. The letter B would assign the program to category B, sports. The second alpha-numeric character number 3 would assign the program to the third menu of the sports category. The third character of the code, number 5, assigns the program to the fifth program slot on the third menu. The next six characters, 1/01/94, represent the date. The following four characters, 1600 represent the start time which is followed by the length of the program and the program name. This entry represents a sports show, a college football game, which will be aired at 4:00 PM on New Years day 1994.

In the 12:30 Channel 1 entry of TABLE A, two menu codes are shown. By allowing two menu codes, programs that may fit under two different category descriptions may be shown in both menus to the subscriber. With this minimal amount of information being communicated to the set top terminal 220 on a regular basis, the terminal is able to determine the proper menu location for each program and the proper time and channel to activate for the subscriber after his menu selection. In the preferred embodiment, the menu codes are generated at the Operations Center 202.

Table B shows an example Events Table that may be downloaded to a set top terminal 220 using the Event Data file which contains information about events and pricing. As shown in the table, the three columns of the Events Table identify the field number, the field itself and the type of information downloaded in the Event Data file. The first column contains the field numbers 1 through 11. The middle column contains the corresponding field parameters, including the event type, event ID, global channel ID, price, start time, end time, start date, end date, P- icon, name and description. The third column contains corresponding field type information. As shown in this field type information typically consists of an unsigned integer; hours, minutes and seconds; months, day and year; and ASCII character identifier.

TABLE B

| Field # | Field | Type |
|---|---|---|
| 1 | Event Type<br>1 = YCTV<br>2 = Pay-Per-View<br>3 = Reg. TV | Unsigned Int |
| 2 | Event ID | Unsigned Int |
| 3 | Global Channel ID | Unsigned Int |
| 4 | Price (in Cents) | Unsigned Int |
| 5 | Start Time | HH:MM:SS |
| 6 | End Time | HH:MM:SS |
| 7 | Start Date | MM/DD/YY |
| 8 | End Date | MM/DD/YY |
| 9 | P-Icon | ASCIIZ |
| 10 | Name | ASCIIZ |
| 11 | Description | ASCIIZ |

Table C shows an example Event Data data file. In particular, Table C shows two data streams corresponding to two event types. The first data stream identifies a YCTV event in the first field. The second field designates the event ID, which is 1234 in this example. The third field includes the global channel ID number two. The fourth field indicates the cost of 50 cents for this event. The fifth and sixth fields indicate the respective start and end times of 3:00 a.m. to 3:00 p.m., respectively. The seventh and eighth fields show the corresponding start and end date, designated as 8/25/93 and 8/27/93, respectively. Field nine indicates the P icon set to a graphics file. Finally, fields ten and eleven indicate the name and description of the event selected, which in this case is Sesame Street™ and Barney™. The second data stream in the Event.Dat example shown in Table C includes analogous information for Terminator IV™, which is designated in field one as a pay-per-view event.

TABLE C

Event Data Example

1'1234'2'50'03:00:00'15:00:00'08/25/93'08/27/93'pbs.pcx'Sesame Street &
Barney's Sesame Street and Barney Abstract
2'1234'2'50'20:00:00'22:00:00'08/25/93'08/25/93't4.pcx'Terminator
4'Terminator 4 Abstract The program control information signal 276 and STTCIS can be formatted in a variety of ways and the on-screen menus can be produced in many different ways. For instance, if the program control information signal 276 carries no menu format information, the menu format for creating the menus can be fixed in ROM at the set top terminal 220. This method allows the program control signal 276 to carry less information but has the least flexibility since the menu formats cannot be changed without physically swapping the ROM holding the menu format information. In the preferred embodiment, the menu format information is stored at the set top terminal 220 in temporary memory either in a RAM or EPROM. This configuration provides the desired flexibility in the menu format while still limiting the amount of information needed to be communicated via the program control information signal 276. New menu format information would be sent via the program control information signal 276 or the STTCIS to the set top terminals 220 each time there was a change to a menu.

In the simplest embodiment, the menus remain fixed and only the text changes. Thus, the program control information signal 276 can be limited to primarily text and a text generator can be employed in the set top terminal 220. This simple embodiment keeps the cost of the set top terminal 220 low and limits the bandwidth necessary for the program control information. Another simple embodiment uses a separate channel full-time (large bandwidth) just for the menu information.

FIGS. 6a and 6b, particularly FIG. 6a, show a data format 920 at the bit-level for one embodiment of a program information signal 276. This frame format consists of six fields, namely: (1) a leading flag 922 at the beginning of the message, (2) an address field 924, (3) a subscriber region designation 926, (4) a set top terminal identifier 928 that includes a polling command/response (or P/F) bit 930, (5) an information field 932, and (6) a trailing flag 934 at the end of the message.

The eight-bit flag sequence that appears at the beginning 922 and end 927 of a frame is used to establish and maintain synchronization. Such a sequence typically consists of a "01111110" bit-stream. The address field 924 designates a 4-bit address for a given set top terminal 220. The subscriber region designation 926 is a 4-bit field that indicates the geographical region in which the subscriber's set top terminal 220 is housed. The set top terminal identifier 928 is a 16-bit field that uniquely identifies each set top terminal 220 with a 15-bit designation followed by an appended P/F bit 930. Although field size is provided by this example, a variety of sizes can be used with the present invention.

The P/F bit 930 is used to command a polling response 920' (FIG. 6b) from the set top terminal 220 addressed. The polling response 920' is substantially similar to the from format 920, and is commonly numbered, but with a prime (') designation appended for clarity. The frame format 920 also provides a variable-length information field 932 for other data transmissions, such as information on system updates. The frame format ends with an 8-bit flag 934 (or trailing flag) that is identical in format to the leading flag 922, as set forth above. Other frame formats, such as MPEG, for example, will be apparent to one skilled in the art and can be easily adapted for use with the system.

D. Software Subroutines

Figure 7:
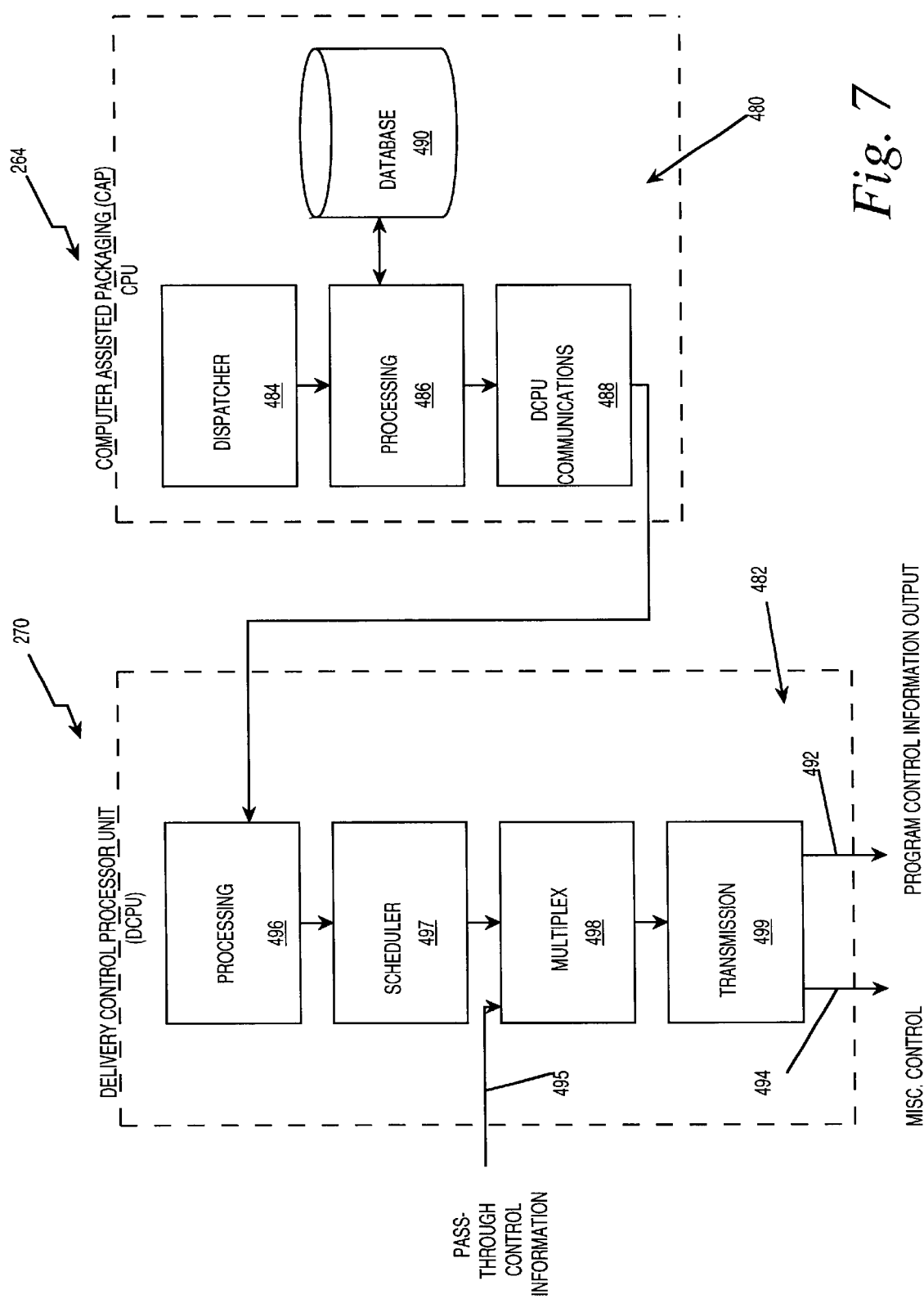
FIG. 7 is a block diagram showing a Delivery Control Processor Unit and a Computer Assisted Packaging Apparatus.

The program control information signal 276 is produced substantially by the CAP CPU 264 and the Delivery Control Processor Unit (DCPU) 270. An overview of the software modules, focusing on the processing of signals and communication between CAP CPU 264 and DCPU 270 is shown in FIG. 7. The software modules for the CAP CPU 264 and DCPU 270 include dispatcher 484, processing 486 and communications 488, each of which performs like-named functions, as well as supporting database 490 access. Processing within the CAP CPU 264 is controlled by the dispatcher 484 software module which may generate processing commands based on user command (e.g., do something now), schedule events (e.g., do something at noon) or based on the occurrence of other events (e.g., do something when the database is updated). The dispatcher 484 sends messages to the processing software module 486 instructing it to process information within the database 490 and generate control information for the DCPU 270. For example, based on the updating of information associated with a particular headend 208, the dispatcher 484 may command the CAP CPU 264 to regenerate headend 208 parameters, perform any required database integrity checking and send them to the DCPU 270. Also, in the case of headend 208 information processing, a filtering function (not shown) is performed which eliminates any information that does not either directly or indirectly relate to a given headend 208. Information transfer between the CAP CPU 264 and the DCPU 270 is controlled by the DCPU communications software module 488.

Information received by the DCPU 270 from the CAP CPU 264 is processed at the DCPU processing module 496 and put into a form consistent with the DCPU 270. Some of this information is used for DCPU control, while most is data to be integrated into the program control information signal 261. Some of this information is also used for miscellaneous control 494 for such things as external multiplex equipment, source material generation hardware, transmission equipment and so on. Information destined for the program control information signal 261 may be transmitted once or may be scheduled for periodic transmission. This information is integrated by the processing module 496 with other information, both internal and external. The DCPU scheduler module 497 is responsible for scheduling and regulating this data traffic. Also, the scheduler 497 may perform information filtering. For example, imbedded date/time information within the information records of interest can be used for filtering. External pass-through control information 495 may also be incorporated into the program control information signal 261 to provide external input to this digital data stream. The DCPU multiplexer 498 is responsible for multiplexing external pass-through control Information. Finally, a transmission software module 499 in conjunction with appropriate communications hardware (not shown), controls the output of both the program control information signal 261 and the miscellaneous control signals 494.

FIG. 8 is a high level diagram of CAP software subroutines and their interrelations. A Main Program (not shown) orchestrates the use of the various subroutines as needed to perform the CAP's tasks. The Packager Data Entry Interface (PDEI) 400, Marketing Information Interface (MII) 402, and Cable Franchise Information Access (CFIA) 404 subroutines perform the interface functions between the CAP Main Program and outside data or information. The remaining subroutines shown in the center column of FIG. 8 perform the processing and manipulations necessary to the functioning of the CAP 260.

The Packager Data Entry Interface (PDEI) 400 subroutine includes routines that enable the Packager to interactively enter program selections 410, start times of programs 412, price setting 414, transponder allocation 416, and menu editing 418. The PDEI subroutine 400 controls the keyboard and mouse data entry by the packager and runs in concert with the processing and editing subroutines described later.

The Marketing Information Interface (MII) 402 subroutine interfaces the processing and editing subroutines with marketing data. This interface regularly receives programs watched information from billing sites 420, cable headends 208, or set top terminals 220. In addition, other marketing information 422 such as the demographics of viewers during certain time periods may be received by the MII 402. The MII 402 also uses algorithms 424 to analyze the program watched information and marketing data 420, 422, and provides the analyzed information to the processing and editing subroutines. In the preferred embodiment, an Executive Information System (EIS) with a yield management subsystem is included in the MII subroutine as described above.

The Cable Franchise Information Access (CFIA) 404 subroutine receives information on cable franchises, as represented at block 426, such as the particular equipment used in a cable headend 208, the number of set top terminals 220 within a cable franchise, groupings of set top terminals 220 on concatenated cable systems 210, distribution of "high-end" cable subscribers, etc. The CFIA 404 generates a cable franchise control signal 428 which is integrated with the program control information 276 output to generate cable headend 208 specific information to be transmitted. The integration algorithm for accomplishing this resides within the Generator subroutine described herein below.

The process program line-up subroutine 430 uses information from the MII 404 and PDEI 400 to develop a program line-up. Importance weighting algorithms and best fit time algorithms are used to assign programs in time slots.

The process menu configurations subroutine 432 determines appropriate menu formats to be used and positions programs on menu screens. Information from the MII 404 and PDEI 400 are used to determine program positions on menus.

The menu display algorithms 434 displays menus as the menus would be seen by the viewer on a large CRT or color monitor.

The editing of menus subroutine 436 works with the menu display algorithm and PDEI 400 to allow the packager to edit menus on-the-fly during viewing of the menus.

The graphical transponder allocation display 438 sends information obtained from the CFIA 404 and PDEI 400 to create graphical displays enabling the packager to comprehend the allocation of transponder space across the entire television delivery system 200.

In a manner similar to the display and editing of menus represented at blocks 434, 436, the packager may utilize the editing transponder allocation subroutine 440 to interactively reallocate assignment of transponder space. In the preferred embodiment, the EIS with yield management may be used by the packager to assist in decisions on allocating transponder space.

The generator subroutine 442 creates the program control information signal for output. The Generator subroutine receives the cable franchise control signal and uses this signal to help create a custom signal for each cable headend 208.

The Packaging Routine 448 obtains and packages the programs, along with the program control information signal 216, for transmission to the transponders.

Figure 9:
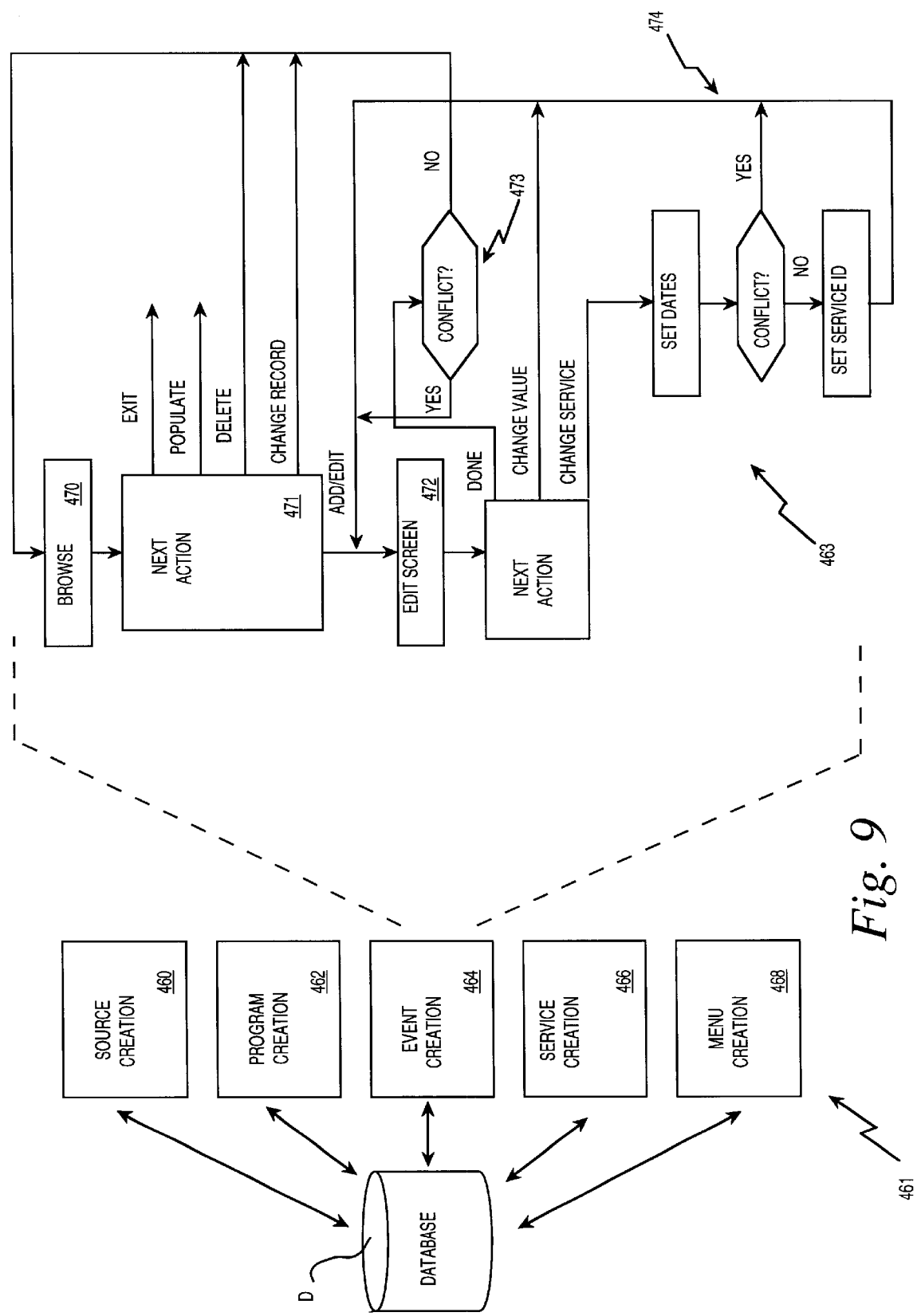
FIG. 9 is a software flowchart representing CAP operations.

With continued reference to FIGS. 7, 8 and 9, the general software flow of the operations center 202 is depicted. The flow can be broken up into modules that apply to parts of the database to allow viewing, editing, and adding records to the database. The software also accomplishes database integrity checking by restricting the user to enter only valid data, and by checking for conflicts.

Figure 11:
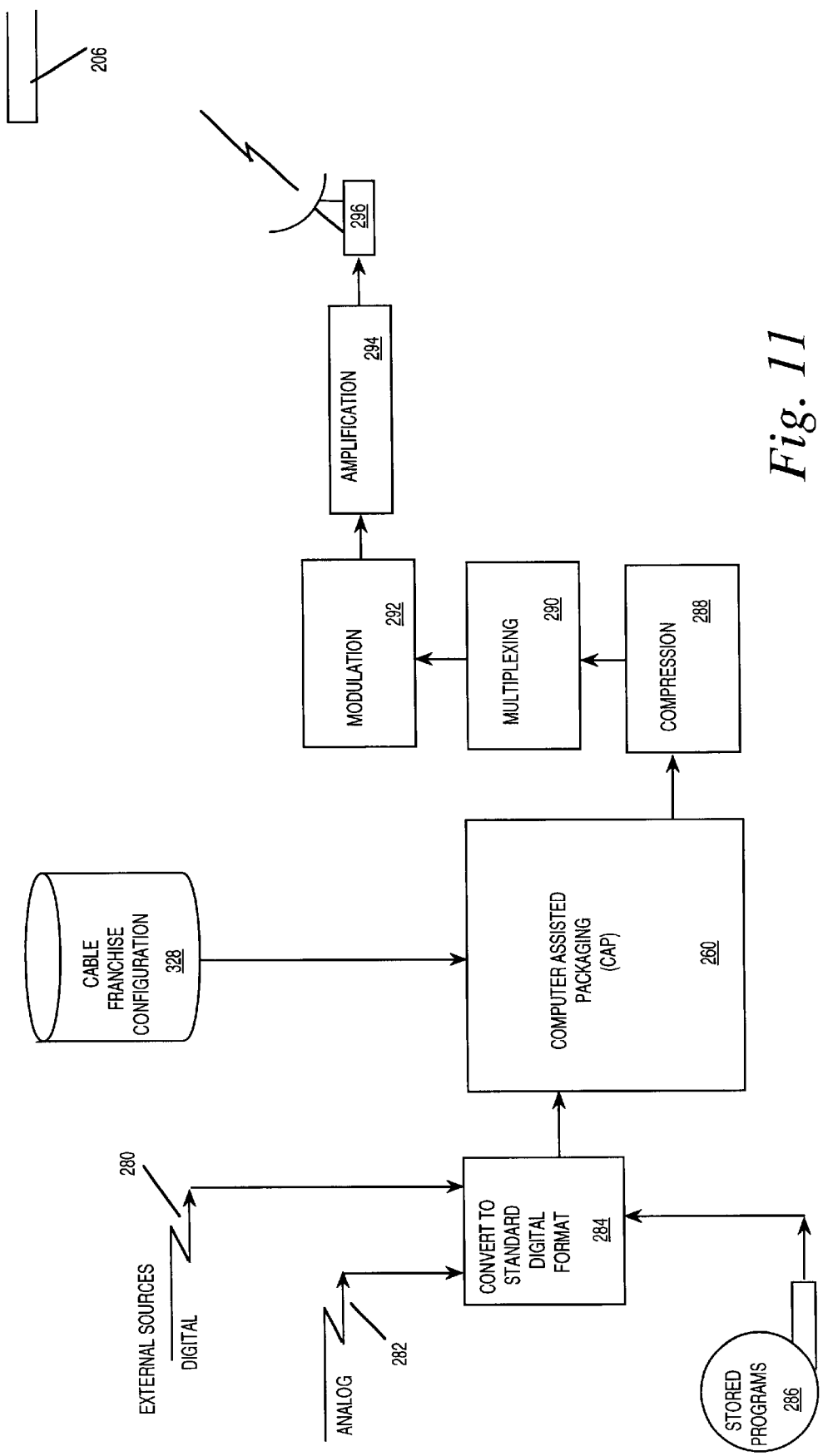
FIG. 11 is a block diagram of the Operations Center and Master Control Site.

FIG. 9 shows some of the software involved in the creation of programs, events and services. This creation occurs prior to or during the processing of the program line-up 430 shown in FIG. 8. With reference to FIG. 9, a first step is indicated generally at 461 and includes acquiring source materials for program production at the Operations Center 202 (e.g., tape production). Once the source materials are collected 460, and entered into the database "D", they can be used to create programs 462. These programs are made up of source 'cuts' from various video/audio source materials. Once the programs have been generated and entered into the database "D", events, collections of one or more programs, are created 464. Each event is then schedule onto a service 466, with the software checking for conflicts. Each service is given run times, and days, and checked for conflicts. Once the services and events have been created, the event names can be added to the menus 468. The programs for the events and services may be stored at the Operations Center (as shown in FIG. 11 at 286). Processing and manipulation of the events or records is depicted generally at 463.

The packager user interface (a portion of 463) for each of the creation modules works substantially identically to each of the other modules to make the interface easy to use and learn. The packager user interfaces forms a portion of the PDEI 400 shown on FIG. 8. The browse system 470 is entered first and allows viewing of records, and selection of specific records. The database can be 'populated' by selection of a button, which activates a populate screen. As represented at block 471, this allows details to be deleted, added or changed for events, programs, and sources. The browse screen also allows access to the edit screen 472, where fields in a selected record can be modified, with conflicts or errors, in scheduling for example, being checked continuously, as at 473 and 474.

In use, the Operations Center 202 of the present invention performs a variety of management functions which can be broken out into five primary areas: (1) cable headend 208 management, (2) program source management, (3) broadcast program management, (4) internal program storage and management, and (5) marketing, management and customer information. A relational database, such as that represented by FIG. 10, can be used to maintain the data associated with these areas.

Customer billing is not included in any of the above five areas for the Operations Center 202. Although billing can be handled by the Operations Center 202 (as shown in the database structure 508, 511), it is preferred that billing is handled at a remote location through traditional channels and methods (such as Cable TV billing provided by Telecorp corporation). Extracts of customer purchases will be provided to the Operations Center 202. These extracts of information will be formatted and correlated with customer demographics for marketing purposes by the Marketing Information Interface (MII) 402.

(1) Cable Headend Management

Management of the cable headend 208 includes the following activities: defining the cable headend site; profiling the viewers; determining available set top equipment; defining the concatenated cable systems connected to the cable headend site. This information may be stored as cable franchise information within the Operations Center 202 database by the Cable Franchise Information Access routine 404. Such information can be compiled and maintained in a relational database (described below and shown as 328 in FIG. 11).

(2) Program Source Management

Source programs will be provided by a variety of networks. Information from the contractual records to the actual program tapes should be maintained and includes: tracking of property rights; tracking and profiling source tapes; profiling source providers. A relational database (such as "D" shown in FIG. 9) can be used, for example, that identifies and correlates programs sources. Programs may be received from various rights holders, and such a database would track the person or entity that owns the rights to each program at issue. Other data could be maintained relating to program cuts (a program cut is a portion of a program) that specifies, for example, the program from which the cut is taken. Information relating to time slot allocations, menu entries, and categories, and channel assignments are also maintained in the relational database.

Program services represents a purchasable time slice which is occupied by a type of programming. Each time slice has multiple time constraints. Using the purchasing of through time slices allows for great flexibility. An infinite number of program and time slice combinations are possible. Preferably, services are created using the software shown in FIG. 9, particularly the service creation routine 466. For a service to become available at a cable headend 208 site, it is mapped to the site. At the time of mapping the program service is assigned a program channel.

Program services are defined by the following fields:
Service ID
  System generated unique ID

| | |
|---|---|
| Description | Describes the service. The description will allow the packager to easily assign a service to a broadcast program. |
| Type | Defines the type of service. Current service types include YCTV ™, Grid, Network and Other. |
| Network ID | Relevant for network services. (examples: ABC, NBC, DISC ™) |
| Broadcast Event | Relevant for a YCTV ™ service. Identifies the current YCTV ™ broadcast event assigned to the service. |
| PICON File | Name of the picture icon (PICON) assigned to the service. This picon is displayed for example on the buy screen for a pay per view event. |
| Expiration Date | Expiration date of the service. Removes the service from the service selection list. |
| Day Start | Each service is a series of days within a week. This represents the starting day. (example: Monday) |
| Day Stop | Represents the last day in the interval. |
| Time Start | Within a day, the service has a time period. This field represents the start of the period. |
| Time Stop | Represents the end of the time period. |
| Required Tape | If stored tapes are required, the number of tapes required by the service. |

(3) Broadcast Program Management

Broadcast program management is one focal point of the data management system. The issues of product, price, promotion and packaging are addressed at this level. Decisions in these areas will affect the actual programming that will be shown to the viewers. Information on description of the content of each program event, program scheduling, broadcast program pricing, TV/set top information flow and information on how broadcast programs will be mapped to viewer channels should be included in the database. Preferably, the EIS system described below will access this data and assist in the Broadcast Program Management.

(4) Internal Program Management

Information on internally stored programs at the Operations Center 202 should also be maintained. This will allow the Operations Center 202 to assemble electronically stored programs, CD stored programs and program tapes, and ensure the quality of programs and location of programs.

(5) Marketing And Customer Information

Last, and important, marketing and customer information should be maintained. In order to effectively manage the operations, information is constantly needed on market conditions. Information is needed on the existence of markets for certain programs. The following type of information must be maintained in a Marketing and Customer Information data base: demographic profile of viewers, viewer buy information; correlation of demographic information with buy information, information rapid restructuring of program mix in response to data analysis. As a subscriber uses the system, this viewer information or viewer log data can be stored and maintained in relational database. The Marketing Information Interface 402 gathers the marketing information and indexes the information for inclusion in the Marketing and Customer Information database. An example of the type of information that is needed in this data base is a viewer profile.

The viewer profile data fields are an example of typical fields required in the databases. Definitions of various fields are listed below. The primary purpose of profiling the viewer is to acquire marketing information on the viewer's response to available selections. Ancillary information will be available including the actual program and channel selections of the viewer. Information tracked within the viewer's profile includes:

| | |
|---|---|
| Viewer ID | A unique identifier generated by the system. |
| Set-Top Types | Boolean field which identifies the type of set top used. |
| Headend ID | Links the viewer to a particular cable site. |
| Site Assigned ID | Viewer ID assigned by the cable site. |
| Set-Top ID | ID of the viewer's set top. |
| Hookup Date | Date physical hardware is connected. |
| Survey Date | A demographic profile will be conducted on each user. The following fields represent this demographic information. The data represents when the interview survey was completed. |
| Viewers Age 2–5 | Boolean field if the household has viewers between 2 and 5 years of age. |
| Viewers Age 6–11 | Boolean field if the household has viewers between 6 and 11 years of age. |
| Viewers Age 12–17 | Boolean field if the household has viewers between 12 and 17 years of age. |
| Tape Rental $ | Approximate amount spent on tape rentals on a monthly basis. |

| | |
|---|---|
| PPV $ | Household average pay-pre-view expenditures per month. |
| Income | Annual household income. |
| Zip Code | Self-explanatory. |
| Cable Tier | Level of cable service purchased. |
| Number of TV's | Self-Explanatory. |
| Years with Cable | Self-Explanatory. |
| Occupancy | Number of people in household. |
| Highest Education | Highest level of education of any member of the household. |

The compilation of viewer demographic information has an impact on decisions based on marketing. The names of the heads of household are not used due to Privacy Act considerations. Completion of demographic data can be accomplished referencing the cable site assigned ID or the system generated ID. There are numerous variations to the field definitions listed above such as different age groupings.

To maintain the database at the Operations Center 202, a data base server, communications server, user work station or stations 262, or the suitable equivalent thereof, are needed. The database server performs the following functions: it is the repository for data base files, event logging, event scheduling (example, automated download of files to headends 208), multi-user services, data base server services, and data base security access.

The communications server performs the following functions on data base data: integrity check, filtering, processing, downloading to headends 208, uploading from headends 208, and uploading from remote location.

User work stations 262 perform the following tasks: creation, deletion and access of all database data, system administration and report generation. Database manipulations are performed through the user workstations or remotely. The database structure is designed to support multiple users performing multiple tasks simultaneously. The preferred embodiment includes a network of user workstations 262. The workstations 262, through user interface software, access data within database files on the database server.

For example, once the appropriate database data has been generated for downloading to a cable headend 208, the communications server is instructed to perform the download. Although this may be done manually at the communications server, it is preferred that the communications server automatically send information to the cable headends 208. The communications server retrieves required data from the database server, filters out any data not associated with the specified headend 208, and performs data integrity checks, creates data files to be downloaded and then downloads the data file via modem (or other means such as the DCPU 270). While the communication server is connected with the headend 208, it also requests any data that the headend might be holding for the Operations Center 202. This may consist of cable headend 208 event log information, set top billing and viewer log data on programs watched, etc.

The communications server may also assist in retrieving information from other remote sites such as remote billing and statistic sites. For example, if a location is being used for billing purposes, the communications server may retrieve viewer log data. Also, the communications server may retrieve billing and viewer log data from actual set top converters in the field. Once the data is retrieved it is sent to the database server. Thus, in the preferred embodiment the communications server will support incoming information via modem or otherwise.

The basic database structure at the Operations Center 202 consists of multiple tables. Database data tables contain one or more data records, each with multiple fields. Each field contains a piece of data about the particular record. This data may be general information, such as a numeric value, date or text string, or it may be a reference to another database record relating one piece of data to another. Database index files contain information about associated data files to allow for improved data retrieval. The database index file makes retrieval of information much quicker.

In an alternative embodiment where some television programming begins with the procurement of source material in the form of tapes or CDs, additional data about the tapes or CDs may be stored in the Operations Center database. Each tape or CD may have a database record associated with it, source tape data file. Each tape may contain multiple cuts of which each cut has an associated record in a source tape detailed data file. Additionally, a company data file may contain individual records for the rights of the holders of the source tapes as well as company information about cable headends 208. In this alternative embodiment with tapes, programs may be created from multiple tapes using multiple tape source cuts. The programs created by these source cuts may be stored and the individual cuts that make up the programs may be stored in a database record called "program tape detail." Events may be created that consist of more than one program and details on individual programs that make up these events may be stored in a database file called "event detail." Using this embodiment, events may be sold to subscribers.

Figure 10:
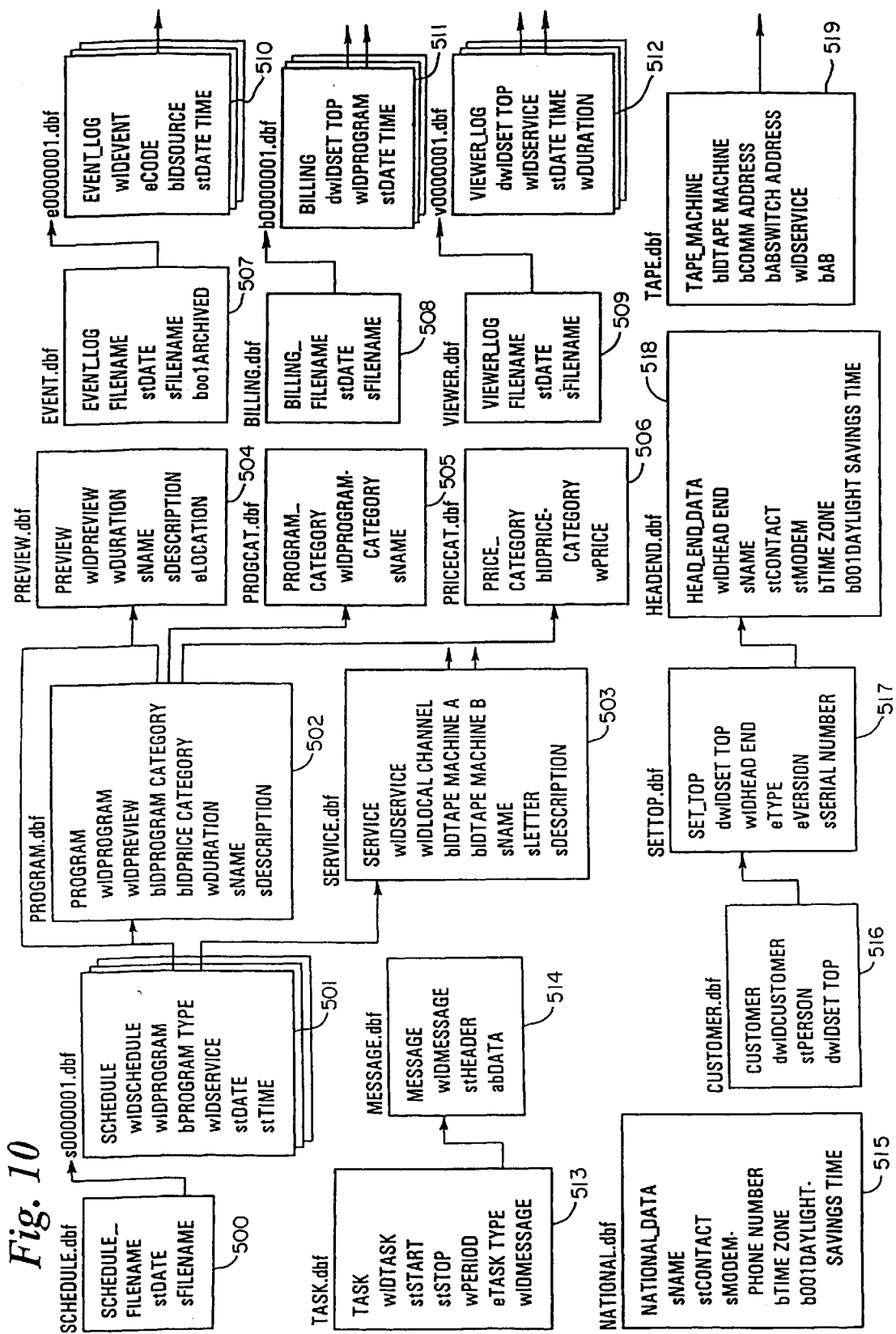
FIG. 10 is a diagram of the database structure for the databases supporting the operations of the CAP.

FIG. 10 and the description below is a more complete example of a database structure that can be used with the present invention. Each database file is listed below along with a description, record field details and explanation of relationships. The software data structures are defined after the description of the database structure.

The SCHEDULE Database file 501 contains scheduling data for a single day. There are many schedule files, one for each day of schedule information. The actual filename for a given days schedule is assigned under computer control. Schedules are broken up into single days so they may be easily created, dispatched and archived. A cross-reference of days to computer generated filenames is kept. Each scheduled event (either a program or a preview) has its own record entry and unique schedule ID This record references the corresponding scheduled program or preview and program type (either program or preview). The service to carry the scheduled program is also referenced. The starting date and time is also specified. Program duration is stored as a program attribute and is not included here. Note that program, preview and service records must be provisioned before they may be referenced in a schedule record.

Another SCHEDULE Database file 500 contains a cross-reference of starting dates data to computer generated filenames.

The PROGRAM Database file 502 contains Program records are contained in another database file 502, with each record representing a source program. Each program has a unique program ID. If the program has a corresponding preview, it is also referenced. Program category and price are also referenced. The structure of the program category database may be modified if multiple categories per program are desired. Program name, description and duration are also given. Note that preview, program category and price category records must be provisioned before they may be referenced in a program record.

The SERVICE Database file 503 contains service records with each record representing an available service. A service may be thought of as a virtual video channel. Virtual channels are non-existent channels which are mapped or created by hardware and software and is described in co-pending patent application Ser. No. 08/160,194, filed Dec. 2, 1998, entitled ADVANCED SET TOP TERMINAL FOR A CABLE TELEVISION DELIVERY SYSTEM, incorporated herein by reference. Services are then mapped into local headend channels. Since initial distribution of video source material may be by "Federal Express" instead of a video channel, a service ID is used to identify the virtual channel being used for the desired service. "60 Minutes" could be distributed and then be mapped into any desired local headend channel. The service database exists at both the national site and at each local headend 208. Every service has a name, call letters and a description of the service. Every service also has an assigned local channel, "A" tape (or CD) machine ID and "B" tape (or CD) machine ID. Note that these last three parameters only apply to the service databases at the local headends 208. The local headend service database performs an equivalent function of a "channel map." For a further description of the cable headend function, see co-pending patent application Ser. No. 08/160,280, filed Dec. 2, 1993, entitled NETWORK CONTROLLER FOR A CABLE TELEVISION DELIVERY SYSTEM, filed by the same assignee.

The PREVIEW Database file 504 contains preview records with each record representing a source preview. A preview is like a program that is scheduled and distributed over a service. It differs from a program in that multiple previews may be distributed over the same service at the same time. Also, previews are free. Each preview specifies its location on the TV screen. This is generally done by selecting from a menu of valid screen positions. Unlike programs, previews do not reference program and price categories or other previews.

The PROGRAM CATEGORY Database file 505 contains program category records with each record representing a valid program category. Examples of program categories are movies, sports, educational and news. Multiple program categories per program may be accommodated if desired with simple changes to the database structure.

The PRICE CATEGORY Database file 506 contains price category records with each record representing a valid price category. Price categories are used to provide pricing consistency throughout the system. It also provides flexibility at the headend 208 to price various categories differently should this be desired. For example, distributed movies may be assigned the price category "movie" at the national site. Each headend 208 could then charge differing amounts for their movies by manipulating their local price category database. If a current price structure needed to be changed, the change would be made once in the price category database instead of in each program record.

The EVENT LOG Database file 510 contains event data for a single day. There are many event files, one for each day of event information. The actual filename for a given days events is assigned under computer control. Events are broken up into single days so they may be easily archived. A cross-reference of days to computer generated filenames is kept.

Each event record contains a unique ID, an event code, ID of the process that generated the event and date/time stamp of the event.

The EVENT LOG FILENAME Database file 507 contains a cross-reference of start date to computer generated filenames.

The VIEWER LOG Database file 512 contains viewer log data for a single day. There are many viewer log files, one for each day of viewer log information. The actual filename for a given days viewer log data is assigned under computer control. Viewer log data is broken up into single days so it may be easily archived. A cross-reference of days to computer generated filenames is kept.

Each event record contains a unique ID, an event code, ID of the process that generated the event and date/time stamp of the event. The Marketing Information Interface 402 accesses the VIEWER LOG Database file as necessary to retrieve "program watched" information 420.

The VIEWER LOG FILENAME Database file 509 contains a cross-reference of date to computer generated filenames.

The BILLING Database file 511 contains billing data for a single day. There are many billing files, one for each day of billing information. The actual filename for a given days billing data is assigned under computer control. Billing data is broken up into single days so it may be easily archived. A cross-reference of days to computer generated filenames is kept.

Each event record contains a unique ID, an event code, ID of the process that generated the event and date/time stamp of the event.

The BILLING FILENAME Database file 508 contains a cross-reference of start date to computer generated filenames.

The NEWS FILENAME Database file 509 contains a cross-reference of date to computer generated filenames.

The SET TOP Database file 517 contains set top converter records with each record representing a unique set top converter. Each set top is assigned to a headend 208. Set-top type, software version and serial number is also stored. Note that headend records must be provisioned before they may be referenced in a set top record.

The HEAD END Database file 518 contains headend records with each record containing headend 208 data specific to a single headend 208. Each headend 208 has a name, contact name, address, phone number, modem information, time zone (relative to GMT) and daylight savings time flag. This information may be stored in a separate database file called Cable Franchise Configuration (shown as 328 in FIG. 11).

The NATIONAL Database file 515 contains a single record containing national site information. This includes site name, contact, modem information, time zone and daylight savings time flag.

The CUSTOMER Database file 516 contains customer records with each record containing customer data specific to a single customer. This includes personal information (name, address, phone number, . . . ) and assigned set top converter.

The TAPE MACHINE Database file 519 contains video tape or CD machine information. Each machine is assigned a unique ID, its control port address, its A/B switch address (if present), its assigned service and an A/B assignment. This database is only located at the headends 208.

The MESSAGE Database file 514 contains available system messages. They are detailed in nature and are preprogrammed. Each message has an associated function. To schedule a desired function, the appropriate message is referenced in the scheduler task list.

The TASK Database file 513 contains scheduled tasks to be performed periodically. It is used in conjunction with a scheduler process to control computer system functions such as data dispatch and retrieval, archival and database maintenance. Each task is assigned a unique ID, start time, stop time, period in minutes) and task type (single, periodic, round-robin). Functions are actually scheduled by scheduling the appropriate message to be sent to the appropriate process. Available messages are kept in a separate database. Note that these messages must be provisioned before they may be referenced in a task record.

E. System Operations

FIG. 11 shows the basic operations that must occur in order for the packaged signal to be sent to the satellite 206. External digital 280 and analog signals 282 must be received from television programming sources and converted to a standard digital format by a converter 284, as described above. Also within the Operations Center 202, stored programs 286 must be accessed using banks of looping tape machines or other video storage/retrieval devices, either analog or digital, and converted to a standard digital format by the converter 284 prior to use by the CAP 260.

The programmer or program packager utilizing the CAP 260 must input a variety of information, including program information, in order to allow the CAP 260 to perform its function of generating program control information and packaging programs. Some of the information required by the CAP 260 are the date, time slots and program categories desired by the television programmer.

The CAP 260 system includes one or more CPUs and one or more programmer/packager consoles, together identified in FIG. 4 as workstations 262. In the preferred embodiment, each packager console includes one or more CRT screens, a keyboard, a mouse (or cursor movement), and standard video editing equipment. In large Operations Centers 202, multiple packager consoles 262 may be needed for the CAP 260.

Figure 12:
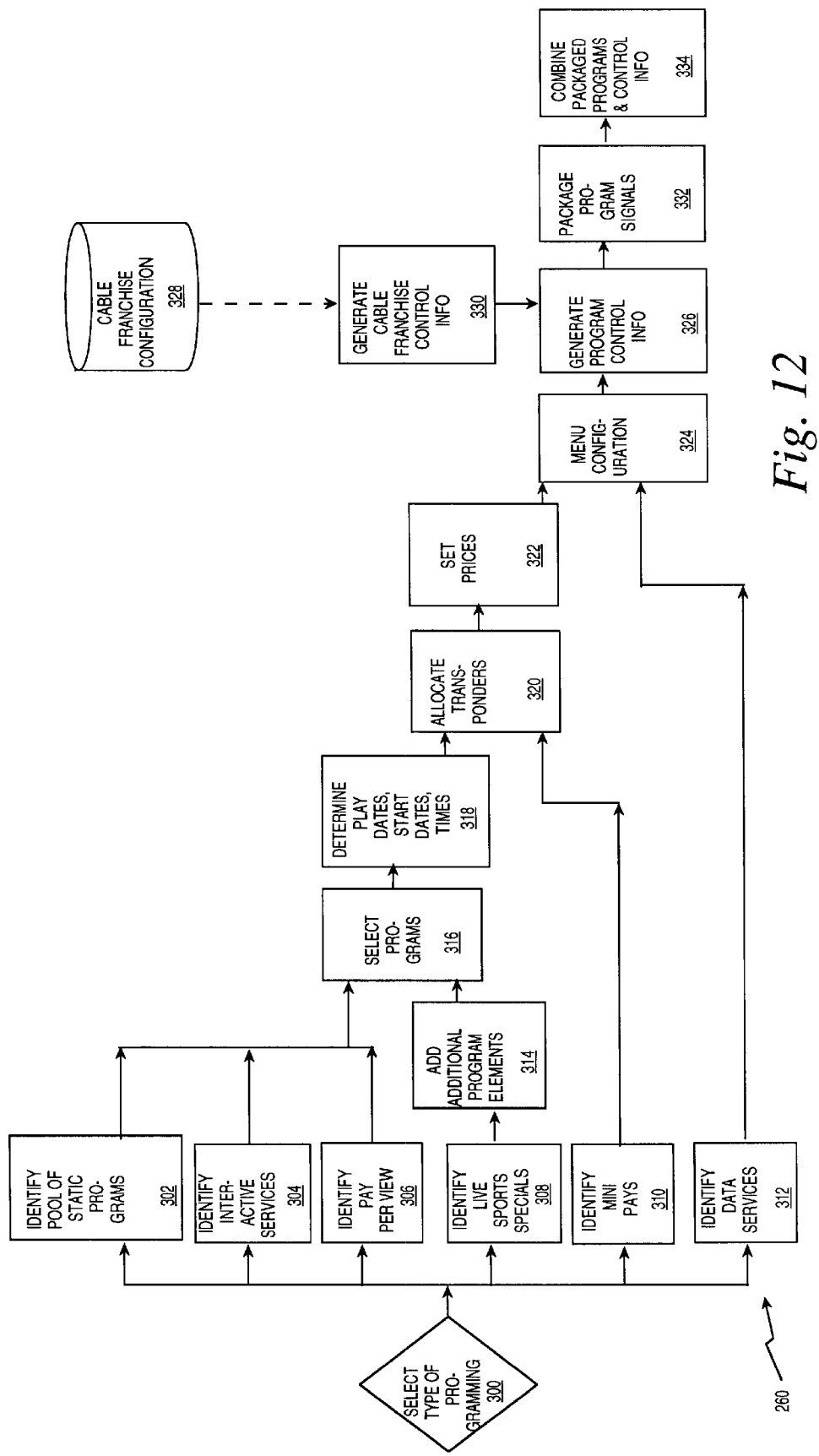
FIG. 12 is a block diagram of the computer assisted packaging shown in FIG. 11.

As shown in FIG. 12, the first step in the operation of the CAP 260 is selecting the type of programming 300 which will be packaged. Basically there are six broad categories in which most television programming can be classified: static programming 302, interactive services 304, pay per view 306, live sports specials 308, mini pays 310, and data services 312. Static programs are programs which will show repetitively over a period of time such as a day or week. Static programs include movies showing repetitively on movie channels, children's programs, documentaries, news, entertainment. Program services, with defined start and end time periods, behave like static programs and may be handled in a similar manner.

Interactive services 304 typically include interactive programs using the Vertical Blanking Interval (VBI) or other data streams synchronized with the programming to communicate interactive features (such as those used in education), and games. Using this feature, interactive home shopping programs are possible. Pay per view 306 are programs which are individually ordered by the subscriber. After ordering, the subscriber is authorized to access the program for a limited time, (e.g. three hours, two days, etc.). Live sports specials are live events usually related to sports which subscribers are unlikely to watch on taped delay.

Mini pays 310 are channels to which existing set top converter boxes (not shown) and the set top terminals 220 of the present invention may subscribe. The subscriptions for mini pays 310 may be daily, weekly, or monthly. An example would be the Science Fiction channel. Data services 312 are services in which information is interactively presented to the subscriber using a modem or other high rate of speed data transfer. Some examples are Prodigy, services for airline reservations, and TV guide services (e.g. TV Guide X*PRESS™, InSight™, etc.). Data could also include classified or other forms of advertising.

The packager begins the CAP processing using the Packager Data Entry Interface Software 400 and a workstation 262. After selecting the type of programming, the packager must identify a pool of programs (within a category) to be packaged. The next CAP step varies for different program categories. For the category of live sports 308, additional program interstitial elements 314 such as promos and other sports news may be added before further processing. For the live sports 308, static (or program service) 302, interactive services 304 and pay per view 306 categories, the next CAP 260 step is for one television program to be selected 316. This is followed by each program individually being assigned dates to be played, a start date (for continuous play) and start times 318. Many dates and start times may be assigned to any given program. Using this methodology, programs may be purchased by viewers in time slices (e.g., one week). The program information for these categories may then be processed for allocation of transponder space and setting of prices, as indicated at blocks 320, 322, respectively.

Mini pays 310 and data services 312 require less processing by the CAP 260. After identifying the mini pays 310, the CAP 260 may proceed to allocation of transponder space and pricing, block 320, for the mini pays 310. Data services in the preferred embodiment generally do not require allocation of transponder space and generally do not require price setting. The information for data services 312 may be directly processed for menu configuration, block 324. In alternate embodiments, the data services 312 may be processed through these portions of the CAP 260 program.

The CAP 260 uses an interactive algorithm 416 to allocate transponder space 320 and set prices 322. The factors weighed by the algorithm are: 1. buy rates of the program, 2. margin of profit on the program, 3. length of the program, 4. any contractual requirement which overrides other factors (such as requirement to run a specific football game live in its entirety). The information on buy rates of the program may be obtained by the Marketing Information Interface 400 from a Central Statistical and Billing Site, a Regional Statistical and Billing Site, the cable headend 208 or directly from the set top terminals 220 as will be described later. The CAP 260 must consider the priority levels of programming (e.g., FIG. 16) when allocating transponder space. Particularly, as in the preferred embodiment, transponders are assigned to three specific priority levels. The CAP may automatically (without packager intervention) access the MII 400 and the EIS to obtain necessary decision making information on transponder allocation.

Following transponder allocation and price setting 320, 322, respectively, the CAP 260 proceeds to menu configuration 324. The positioning of programs within the menu configuration 324 can have an effect on subscriber buy rates for the program. (The processing of menu configurations 432 is also described in reference to FIG. 8.) Therefore, an algorithm accounting for either a manually assigned program importance or a calculated weight of the program importance is used to determine each programs position within the menu scheme. For instance, a popular program with a high profit margin may be assigned a high weight of importance and shown in a prominent place in the menu scheme. Alternatively, a high profit program with sagging sales may be manually assigned a prominent place in the program schedule to increase sales.

After a series of entries by the programmer/packager at the Operations Center 202, the CAP 260 displays draft menus 434 or schedules (including priority levels) for programming. The packager may now manipulate the menus and schedules and make changes as necessary 436. After each change, the packager may again display the menus or schedules and determine if any more changes are necessary 436. The packager may use the Executive Information System with yield management as described below to assist in editing the menus and schedules. When the packager is satisfied with the menu configuration 324 and scheduling of television programs, the packager may then instruct the CAP 260 to complete the process.

E. 1. Menu Structure

Figure 22:
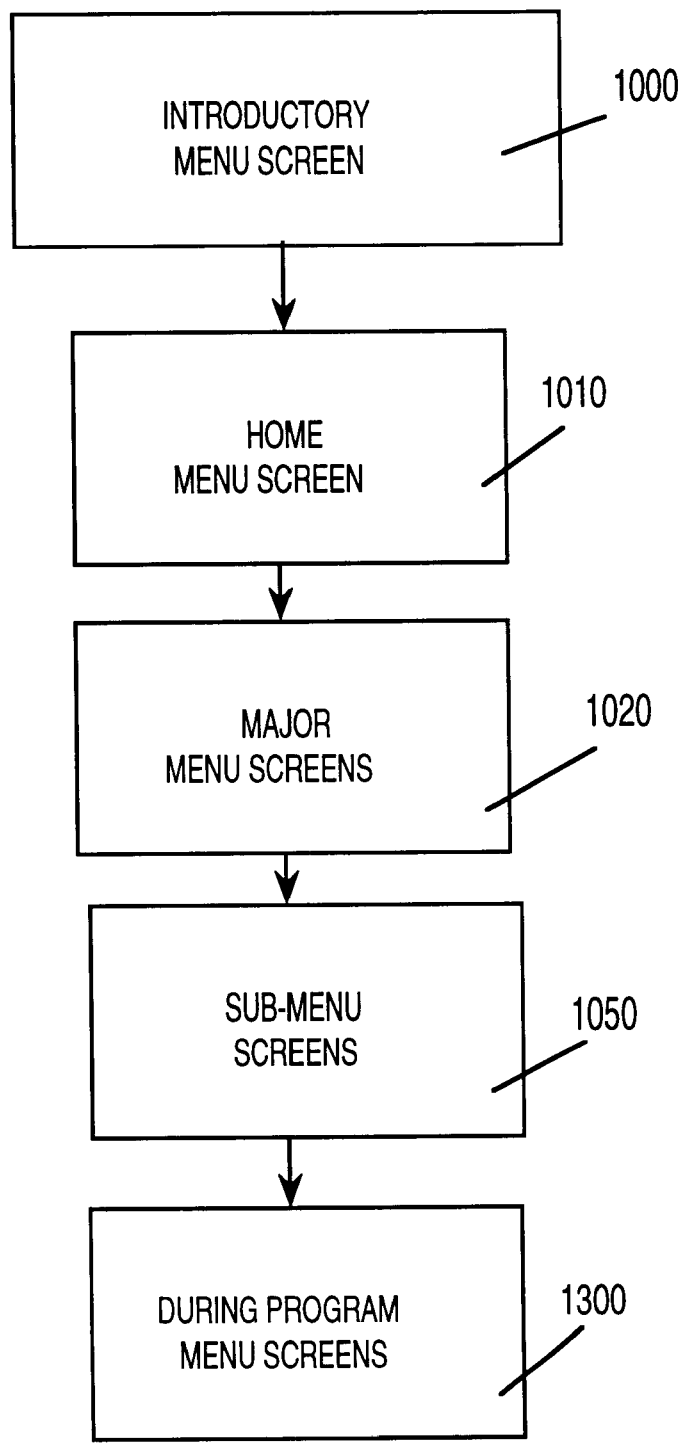
FIG. 22 is a flow chart of the progression of primary menus in the menu driven system of the set top terminal.

The series of menus shown in FIG. 22 is the normal or standard format for a variety of alternative embodiments to the present invention. An introductory screen upon power up that contains important messages, followed by a home menu 1010 with major programming categories is the basis upon which many alternative embodiments of the menu driven selection process can be built.

Skipping a sequence or level of the menu structure is possible and perhaps desired in certain instances. In simple alternate embodiments it is possible to combine the home menu 1010 and introductory menu 1000 into one menu that performs both functions. It will be obvious to one skilled in the art that the specific functions of the Home menu 1010 and Introductory menu 1000 may be exchanged or shared in a number of ways. It is also possible to allow a user to skip directly from the introductory menu 1000 to a submenu 1050. This can be accomplished most easily with a separate direct access remote control 900 button. Generally, a subscriber will access a television program through execution of a submenu 1050.

The During program menus 1200 are enacted by the set top terminal 220 only after the subscriber has selected a television program. These menus provide the subscriber with additional functionality and/or additional information while he is viewing a selected program. The During program menus 1200 sequence can be further subdivided into at least two types of menus, Hidden Menus 1380 and Program Overlay Menus 1390.

To avoid disturbing a subscriber during viewing of a program, the Hidden Menus 1380 are not shown to the subscriber but instead "reside" at the set top terminal 220 microprocessor. The Hidden Menus 1380 do not effect the selected program audio. The microprocessor awaits a button entry either from the remote 900 or set top terminal 220 buttons before executing or displaying any Hidden Menu options. The Hidden Menus 1380 provide the subscriber with additional functions such as entering an interactive mode or escaping from a selected program.

Program Overlay Menus 1390 are similar to Hidden Menus 1380 in that they occur during a program. However, the Program Overlay Menus 1390 are overlayed onto portions of the television screen and not hidden. The Program Overlay Menus 1390 allow the subscriber to continue to watch the selected television program with audio but place additional information on portions of the television screen. Most overlays cover small portions of the screen allowing the subscriber to continue to comfortably view his program selection. Other Overlays which are by their nature more important than the program being viewed will overlay onto greater portions of the screen. In the preferred embodiment, some Program Overlay Menus 1390 reduce or scale down the entire programs video screen and redirect the video to a portion of the screen.

All menu entries may be made either from buttons available on the top cover of the set top terminal 220 or from the remote 900.

Figure 23A:
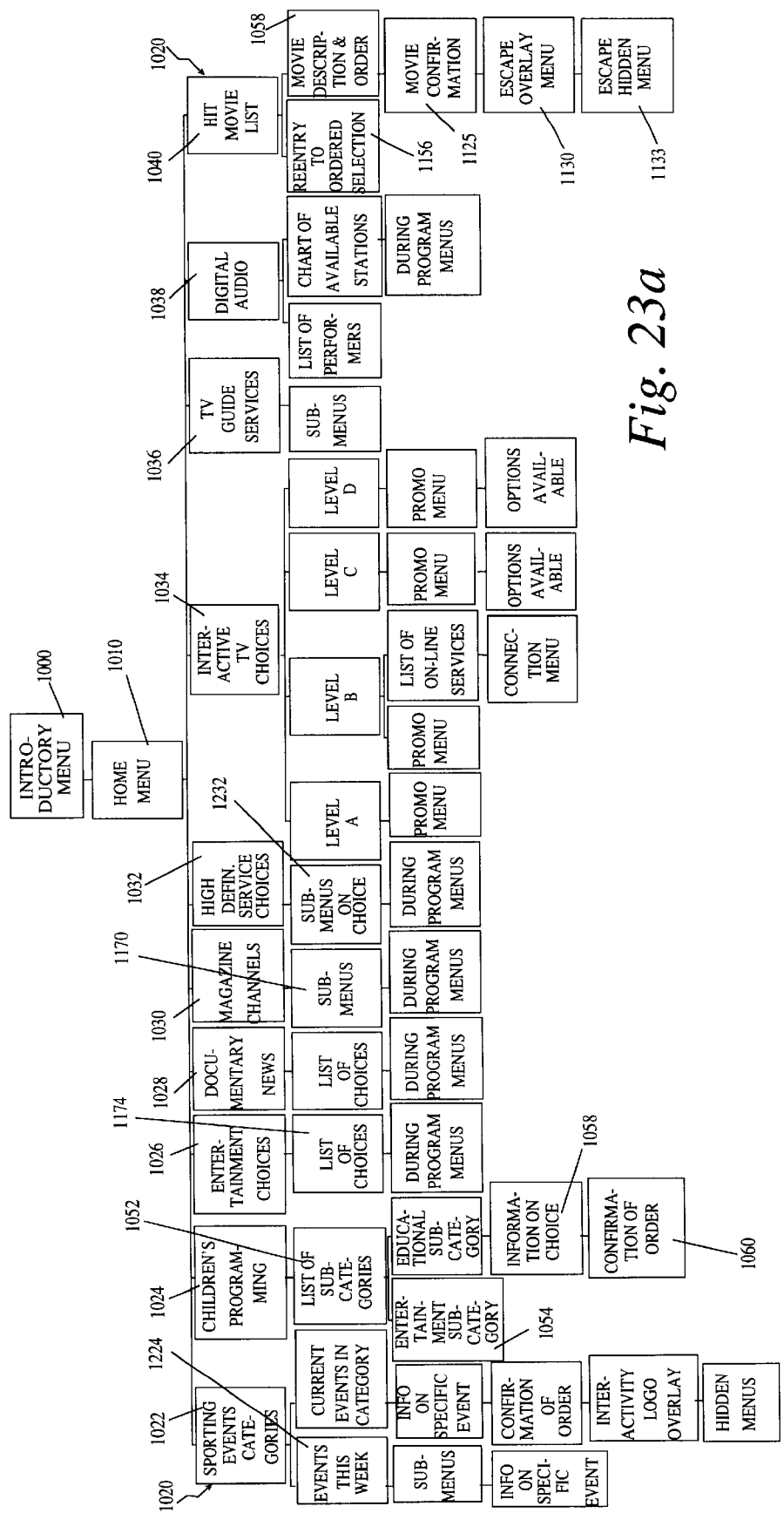
FIG. 23a is a drawing of the basic menus used in the present invention, including the ten major menus represented by icons.
Figure 23B:
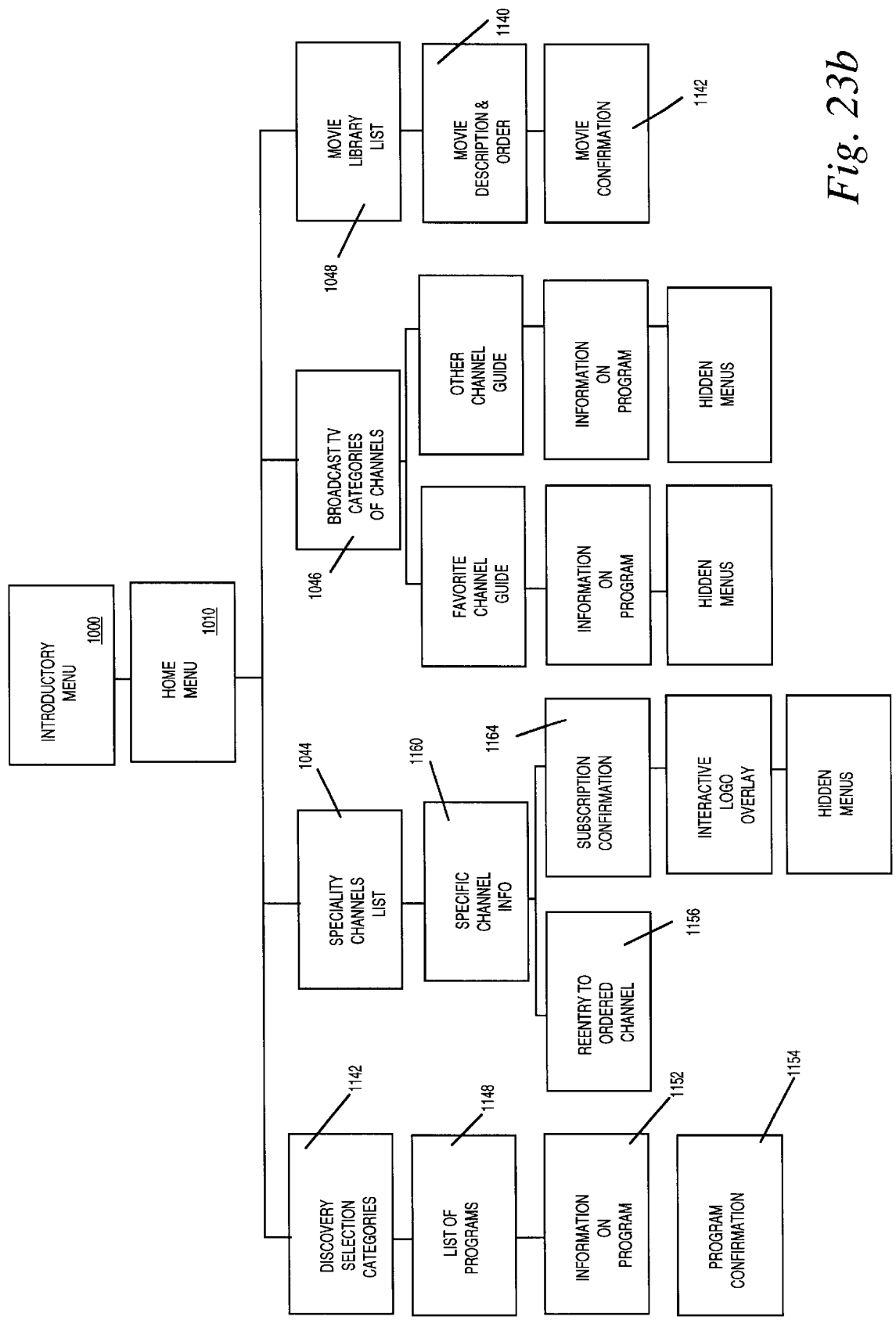

FIG. 23a shows the preferred embodiment for subscriber selection of television programming. FIG. 23b shows additional major menu 1020 categories, 1042, 1044, 1046, 1048, which may used with the invention. Again, the introductory menu 1000 followed by the home menu 1010 is the preferred sequence of on-screen displays. In the preferred embodiment shown in 23a, the home menu 1010 provides a choice of ten major menus 1022, 1024, 1026, 1028, 1030, 1032, 1034, 1036, 1038, 1040. Upon selection of a major menu 1020 category from the home menu 1010, the program proceeds to a major menu 1020 offering further viewer selections. Each major menu 1020 is customized to target the expected viewership. Depending on the number of available program choices the major menus 1020 either breakdown the major category into sub-categories or provide the subscriber with access to further information on a particular program.

For example, the major menu 1020 for children's programming provides a list of subcategories 1052 from which the subscriber selects. Upon selection of a subcategory a submenu 1054, 1056 listing program choices within that sub-category is shown to the subscriber. Upon selection of a particular programming choice within the first submenu 1050, the subscriber is then provided with a second submenu 1058 describing the program that the subscriber has selected. From this menu, the subscriber may now confirm his program choice and receive a confirmation submenu 1060 from the set top terminal 220 software.

Since the system utilizes digital signals in compressed format, High Definition Television programming can also be accommodated through the menu system. In addition, since the set top terminal 220 has two way communication with the cable headend, interactive television programming is possible, with return signals generated by the set top terminal 220. Similarly, the system can support "movies on demand" where a subscriber communicates through the set top terminal 220 with an automated facility to order movies stored at the facility.

Using this on-screen menu approach to program selection, there is nearly an unlimited number of menus that can be shown to the subscriber. The memory capability of the set top terminal 220 and the quantity of information that is sent via the program control information signal are the only limits on the number of menus and amount of information that can be displayed to the subscriber. The approach of using a series of menus in a simple tree sequence is both easy for the subscriber to use and simply implemented by the set top terminal 220 and remote control device 900 with cursor movement. A user interface software programmer will find many obvious variations from the preferred embodiment shown.

Figure 24A:
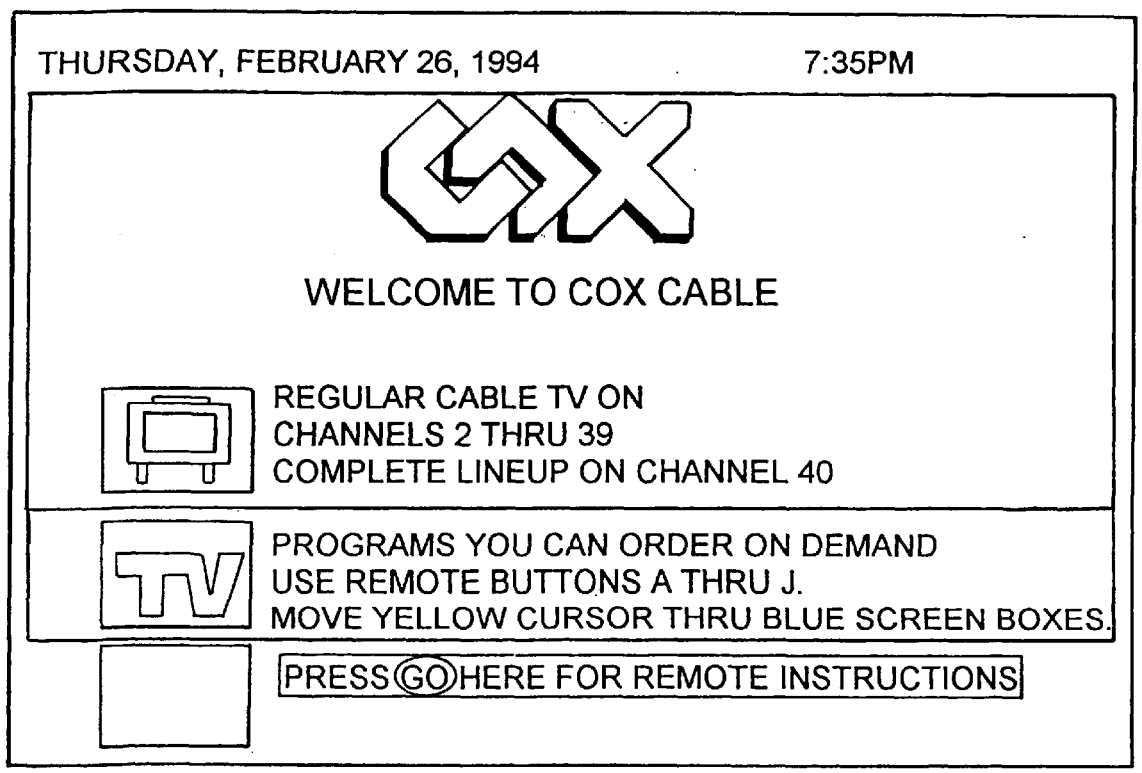
FIGS. 24a and 24b are drawings of introductory menus.
Figure 24B:
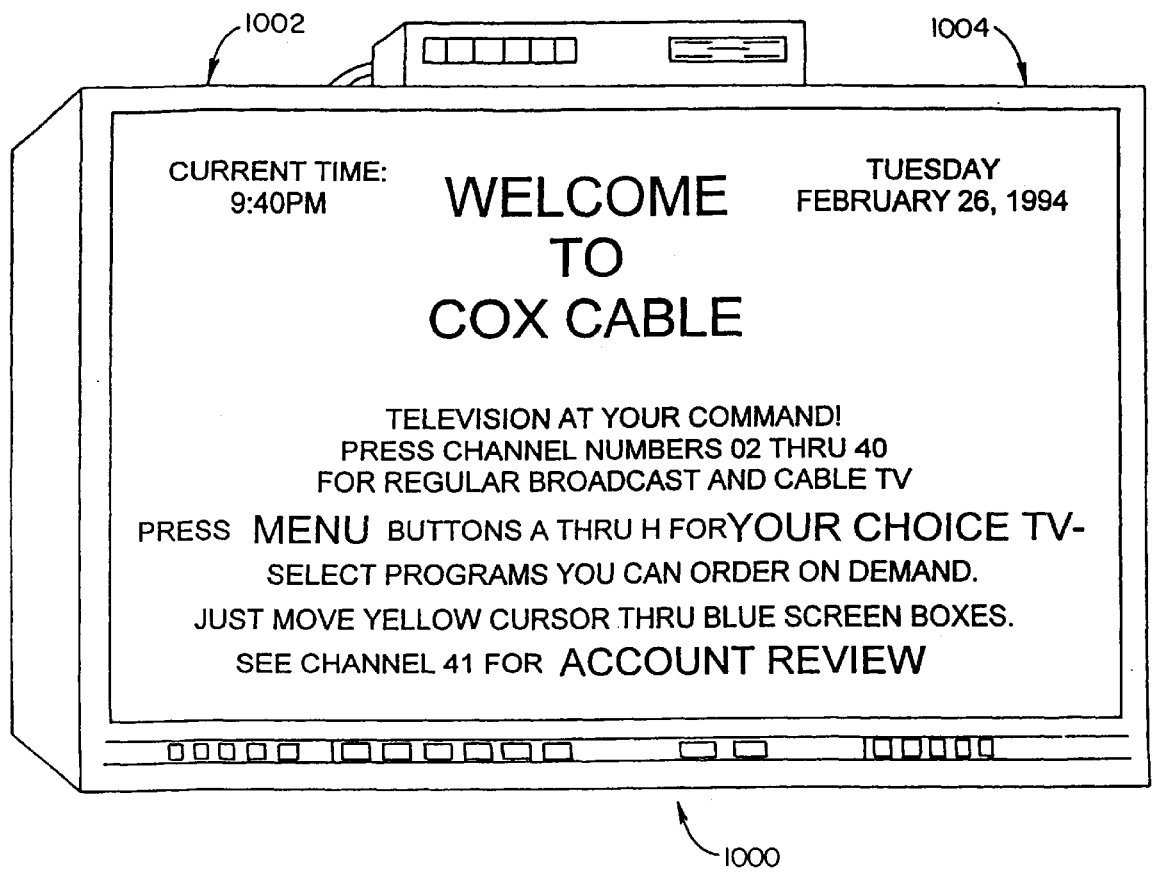

FIGS. 24a and 24b show examples of introductory menu screens that are displayed on the subscriber's television. FIG. 24a, the preferred embodiment, welcomes the subscriber to the cable system and offers the subscriber three options. The subscriber may choose regular cable television (channels 2 through 39), programs on demand (e.g., movies), or instructions on the use of the remote control 900. Other basic program options are possible on the introductory menu screen 1000. For example, instead of, or in addition to, the remote control 900 instructions, a system "help" feature can be offered on the introductory menu 1000.

FIG. 24b shows an alternate embodiment for the introductory menu screen 1000. In the upper left-hand corner of the menu, there is a small window 1002 that may be customized to the subscriber. A subscriber will be given the option of showing the current time in this window. In the upper right-hand corner a second customized window 1004 is available in which a subscriber may show the day and date. These windows may be easily customized for subscribers to show military time, European date, phase of the moon, quote of the day, or other informational messages. These windows may be customized by subscribers using on-screen menu displays following the introductory menu 1000.

In the preferred embodiment, the subscriber is given the capability of accessing base channels such as regular broadcast TV and standard cable channels directly from the introductory menu 1000 by entering the channel number. The subscriber is also given the capability of directly accessing his account with the cable company. Further, in the preferred embodiment, the subscriber may directly access a major menu 1020 and bypass the home menu screen 1010. If the subscriber is familiar with the programming choices available on the major menus 1020, he may select an icon button 960, or a lettered key (alpha key) from his remote control 900 and directly access the desired major menu 1020. If any key entry other than those expected by the set top terminal 220 software program is made, the home menu 1010 is placed on the television screen. In addition, after a period of time if no selections are made from the introductory menu 1000, the program may default to the home menu screen 1010.

FIGS. 25a, 25b, 25c, and 25d are examples of home menus 1010 that may be used in the set top terminal 220 software. FIGS. 25a–25d all employ multiple window techniques to make the menu user friendly and offer a significant number of choices. It is preferred that a channel line up and the major menu 1020 categories both appear on the home menu 1010.

Figure 25A:
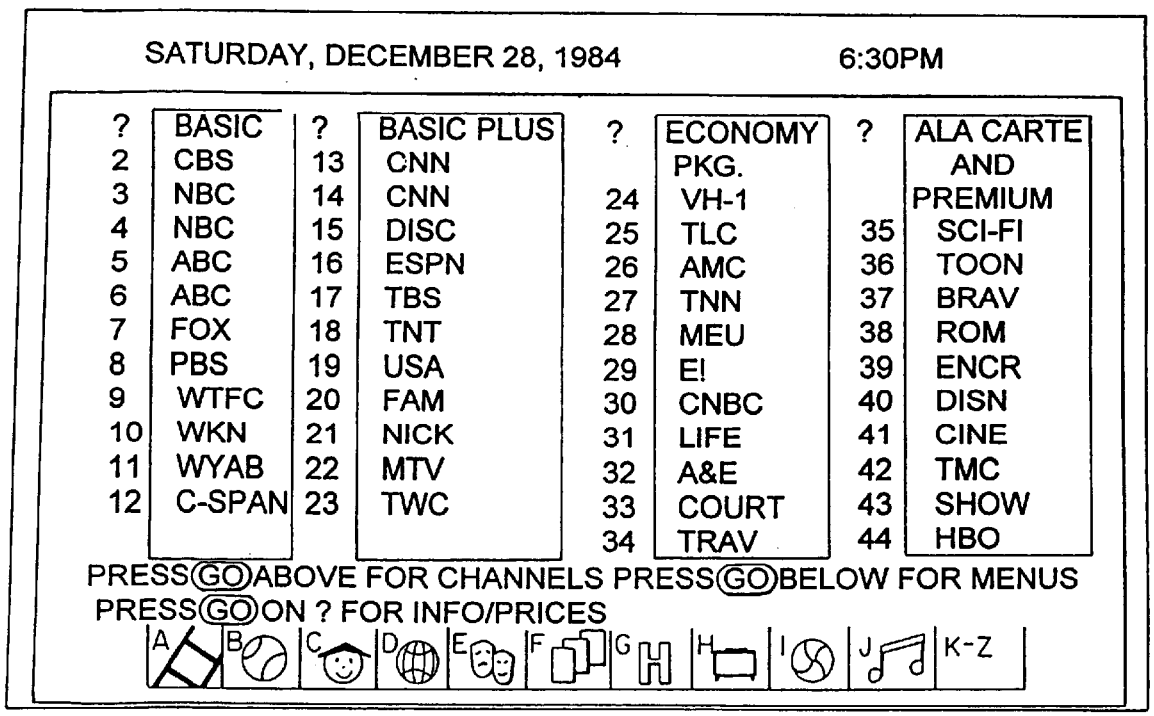
FIGS. 25a, 25b, 25c and 25d are drawings of home menus.

FIG. 25a, the preferred home menu 1010 embodiment, displays both the standard channel line up and the programming on demand icons for selection by the subscriber. FIG. 25a also shows various levels of subscription programming, including a "Basic" cable package and a "Basic Plus" package. Each of the choices of subscription programming preferably is assigned a different color. This increases the user friendliness of the present invention.

Figure 25B:
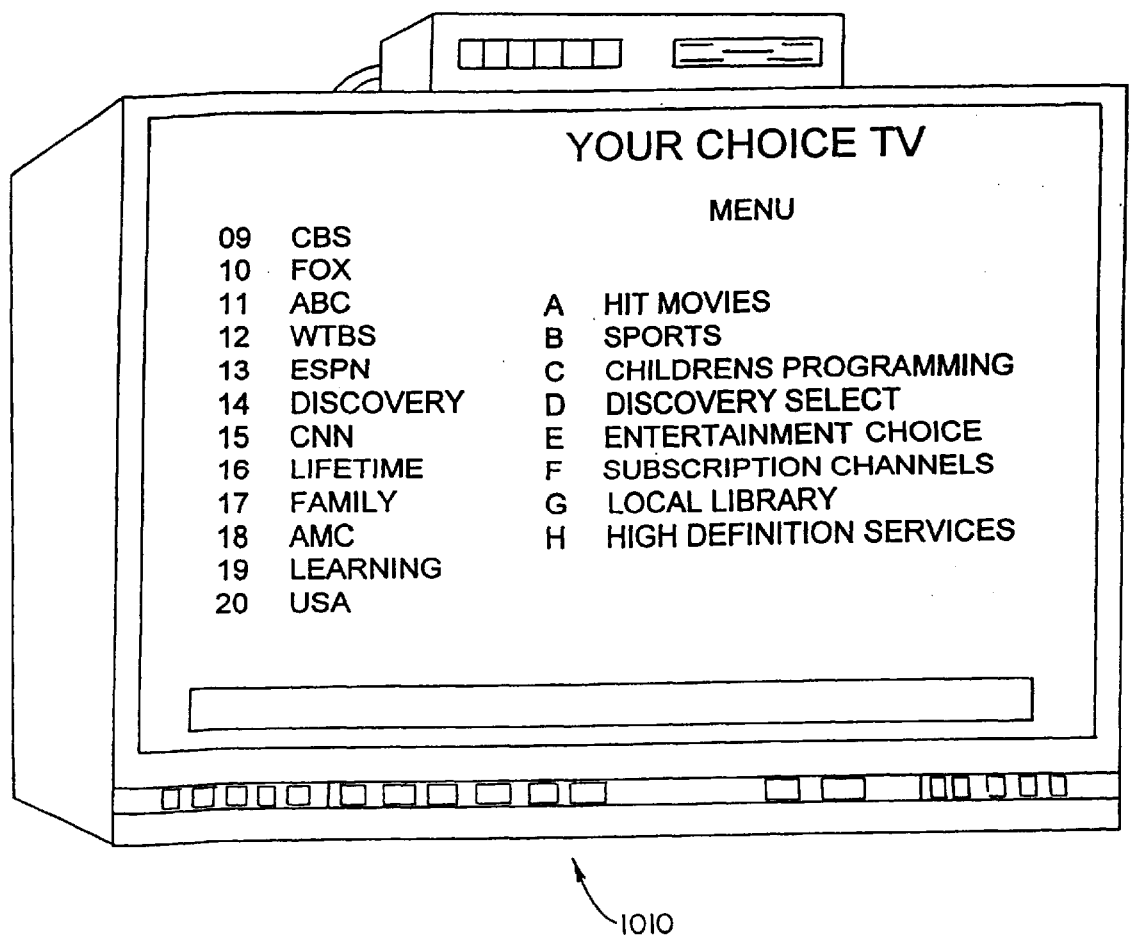
Figure 25C:
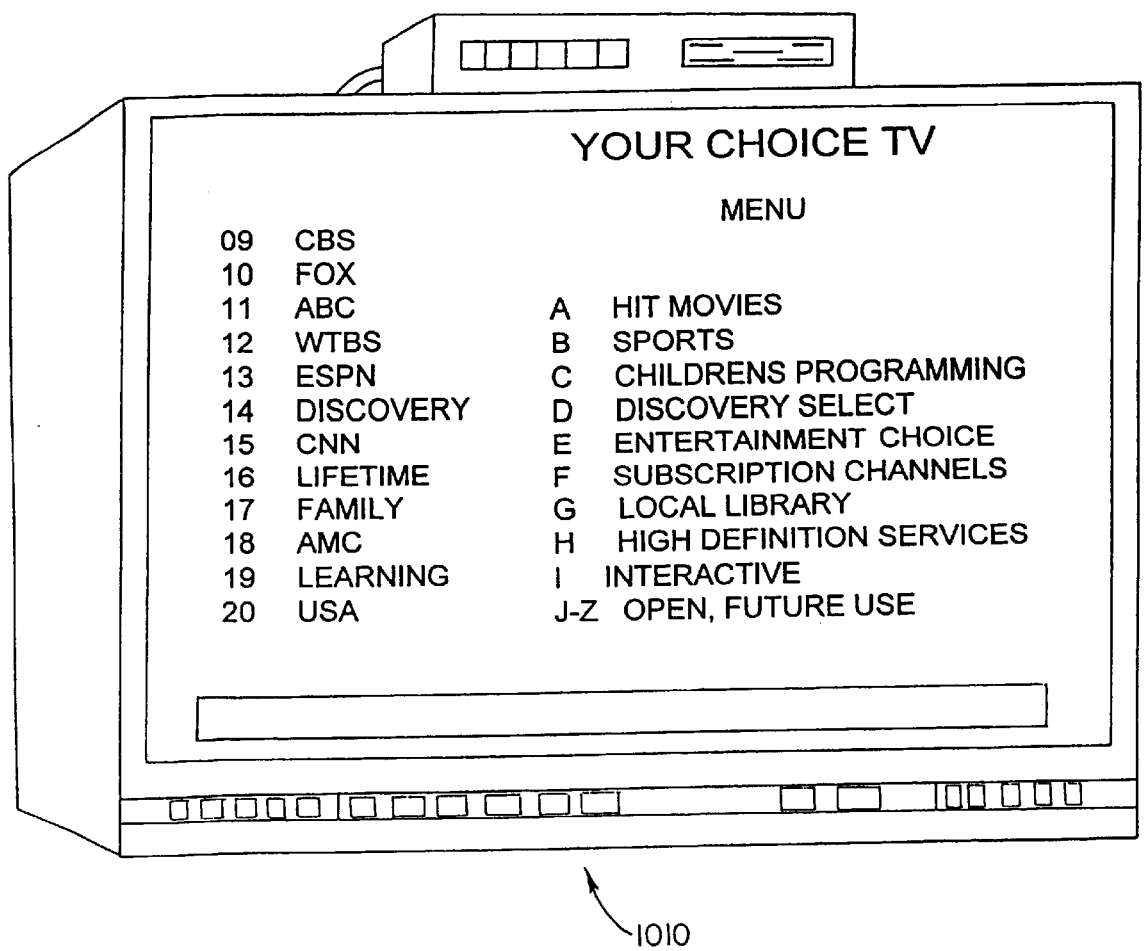
Figure 25D:
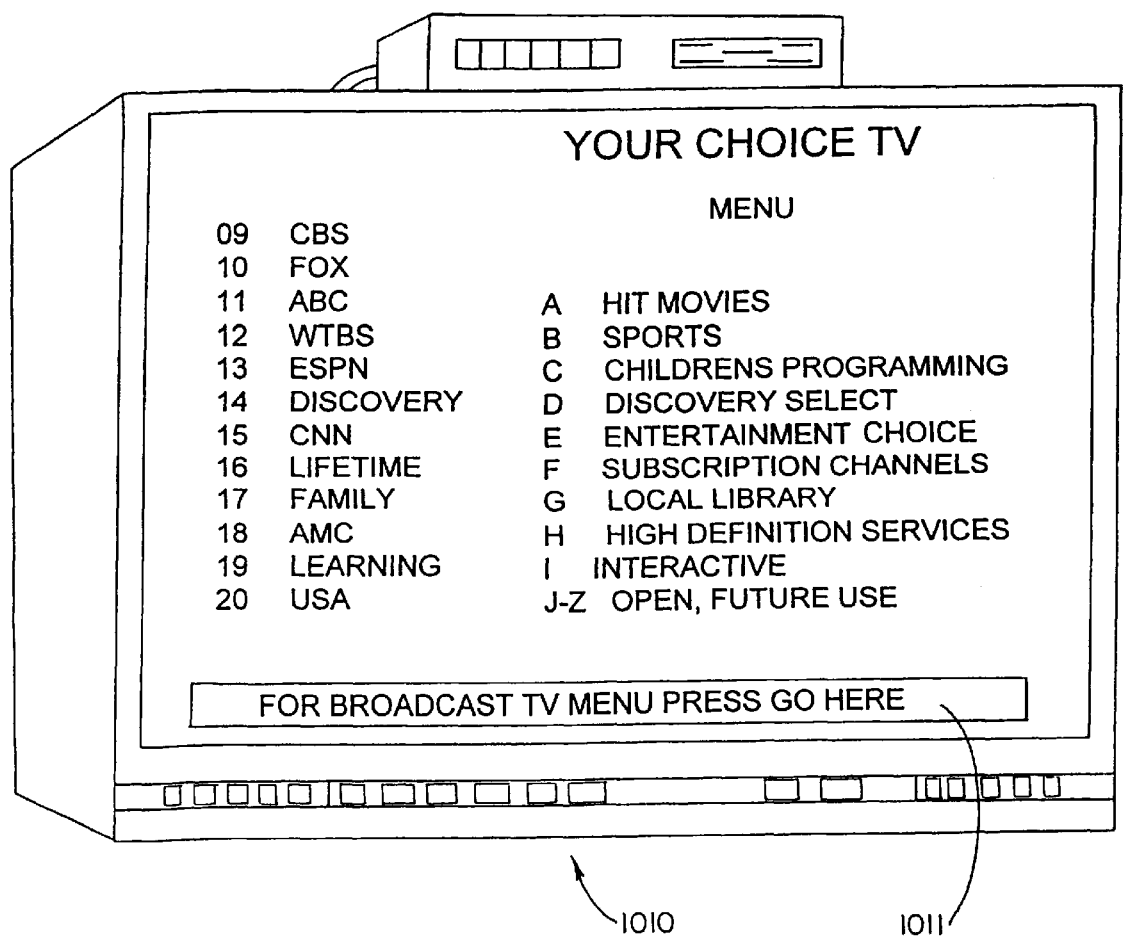

In FIGS. 25b–25d, the left half of the screen is used to list the channel number and network abbreviation of the most popularly watched networks. The right half of the screen offers access to a variety of major menus 1020 listed by category names.

FIG. 25b shows an embodiment in which only eight major menus 1020 are utilized. By pressing the alpha-numeric or icon key 960 corresponding to the category of programs the subscriber desires, the appropriate major menu 1020 is accessed. In addition, the subscriber may employ an on-screen cursor to select any option shown in the menu. To move the cursor, the subscriber may use either the cursor movement keys on the remote control 900 or similar keys located at the top of the set top terminal 220.

FIG. 25c shows how additional major menus 1020 can be displayed on the home menu screen 1010. When there is no longer room available for additional major menu 1020 choices on the home screen, the subscriber may access a second screen of the home menu 1010. For example, in FIG. 25c, if additional major menus 1020 "J" through "Z" existed, the subscriber would access those menus by highlighting and selecting the J through Z menu option(or press the J–Z on his remote 900). After selecting J through Z, the second or extended home menu screen 1010 would appear on a subscriber's television set. This menu would then list options J through Z separately by name. Theoretically, the home menu 1010 may have many extended home menu screens. However, any more than a few extended home menu screens would confuse the average subscriber.

The home menu 1010 of FIG. 25d adds an additional feature at the bottom of the television screen 1011. This option allows a subscriber to see only those program selections that are available on broadcast television. FIGS. 25a–d are but a few of the numerous variations available for the home menu 1010.

Additionally, as shown in FIG. 26, in an alternate embodiment, the home menu 1010 (or menu which would normally follow the introductory menu 1000) can be simply the standard cable channel line-up. Offering the standard cable line-up on a separate menu may make selection easier for viewers with small television screens.

Figure 27A:
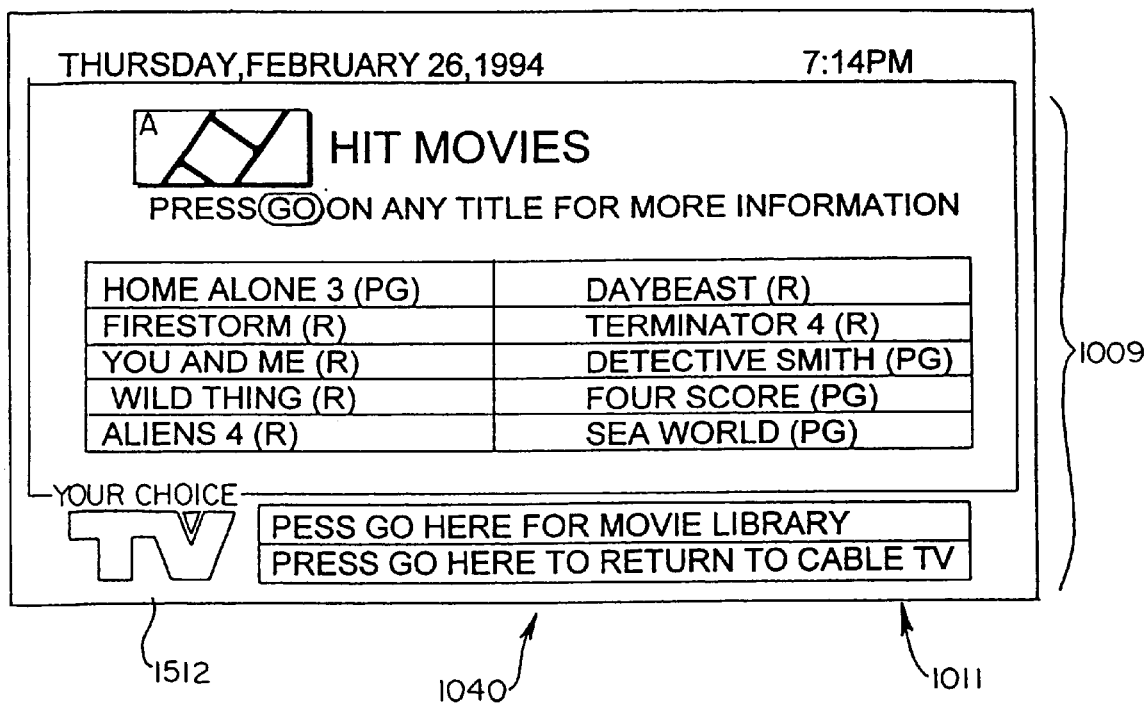
FIGS. 27a, 27b, 27c, 27d, 27e, 27f and 27g are drawings of major menus.
Figure 27B:
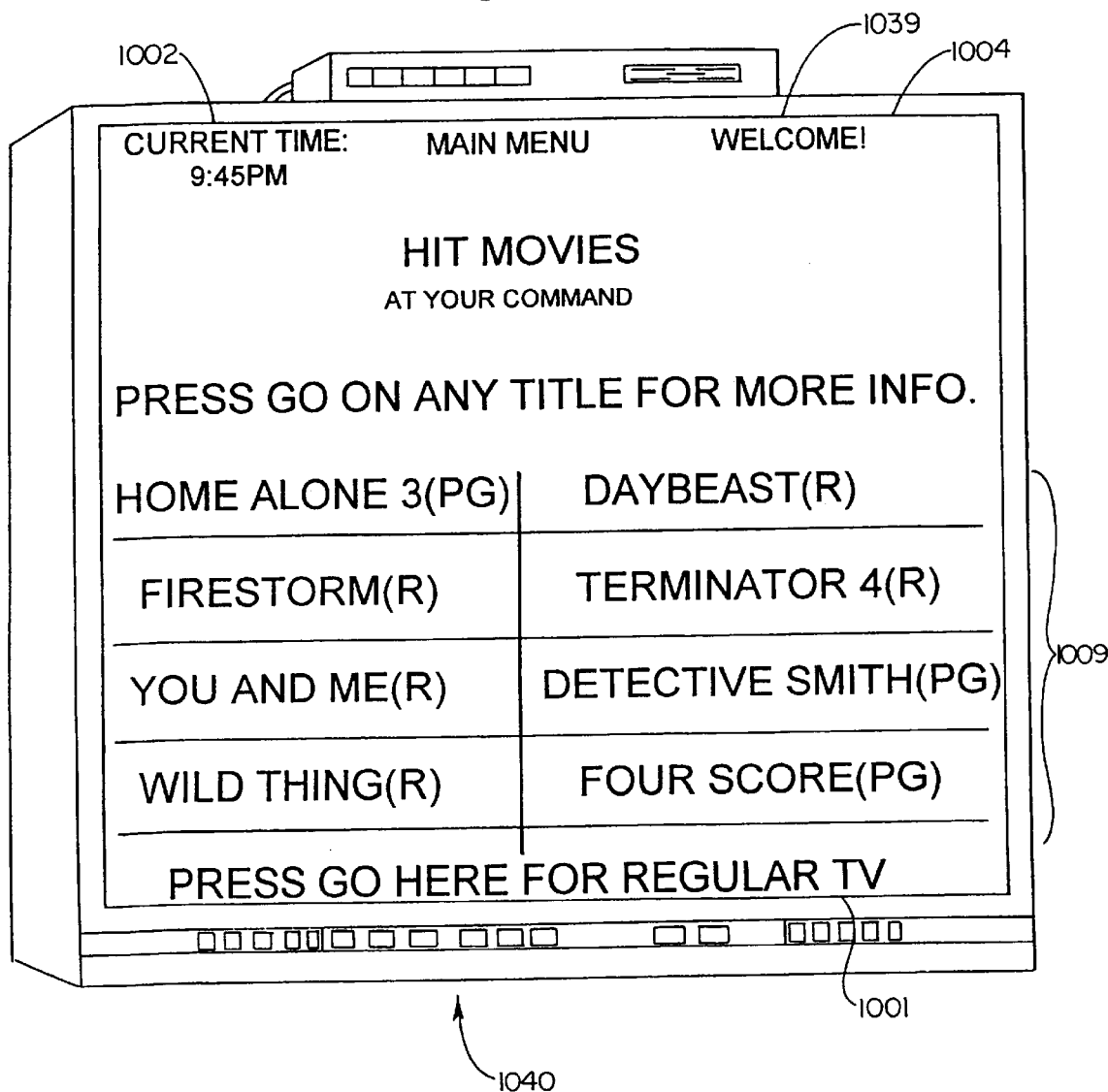
Figure 27C:
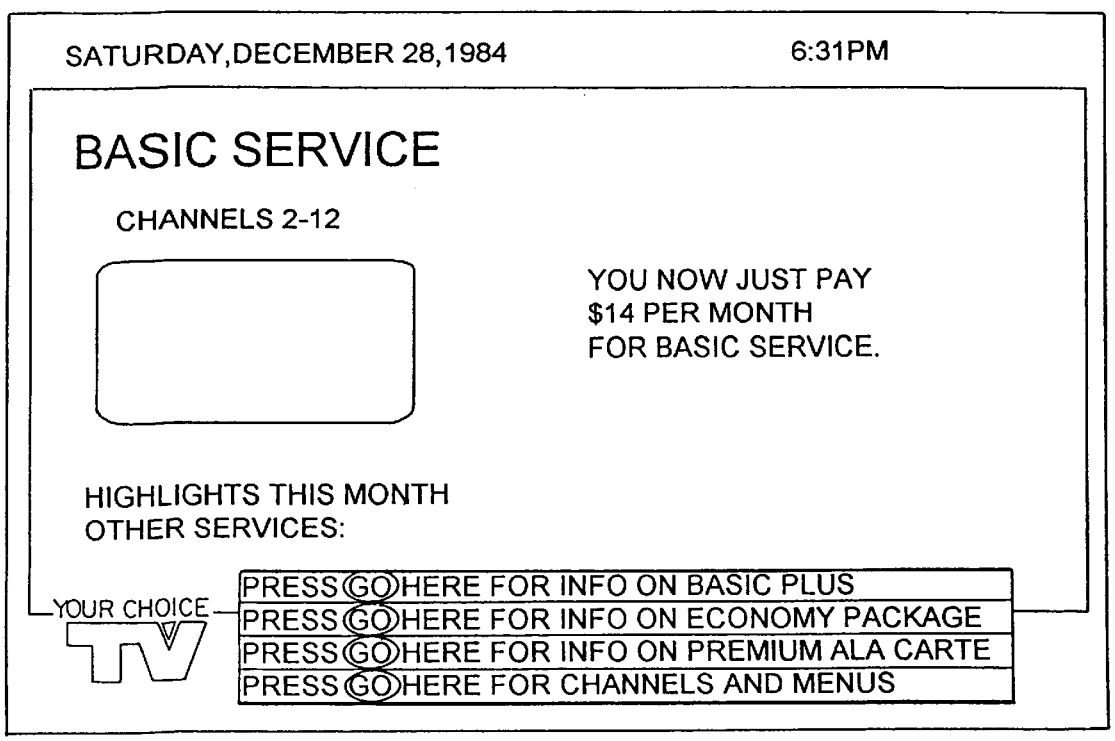
Figure 27D:
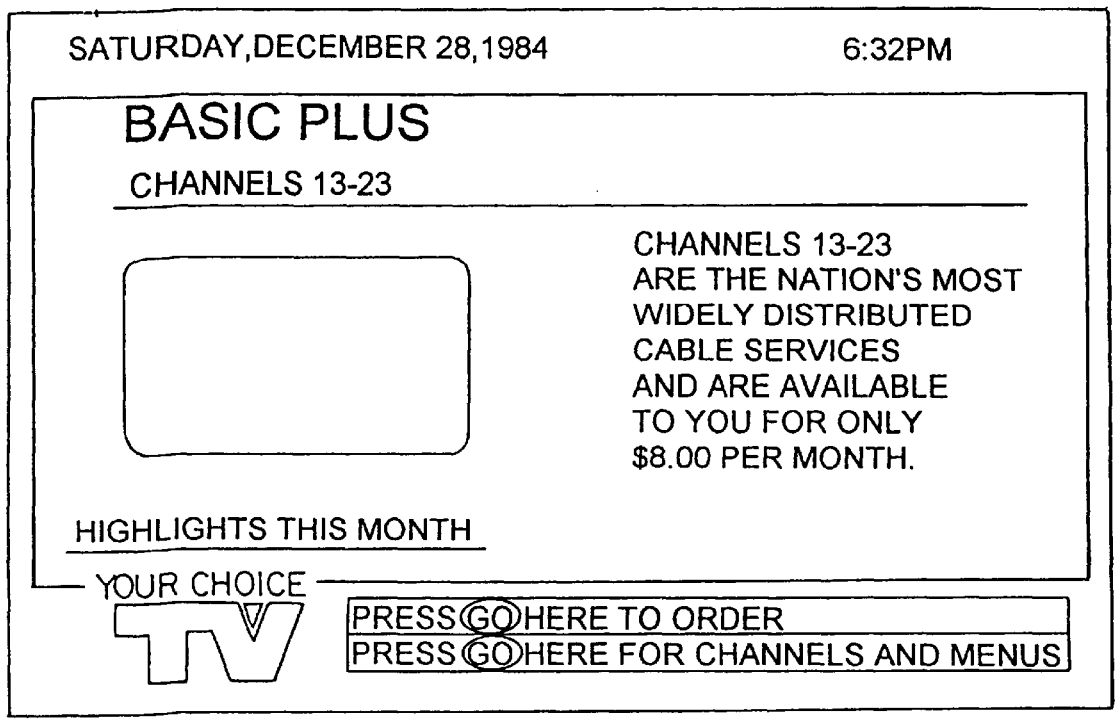
Figure 27E:
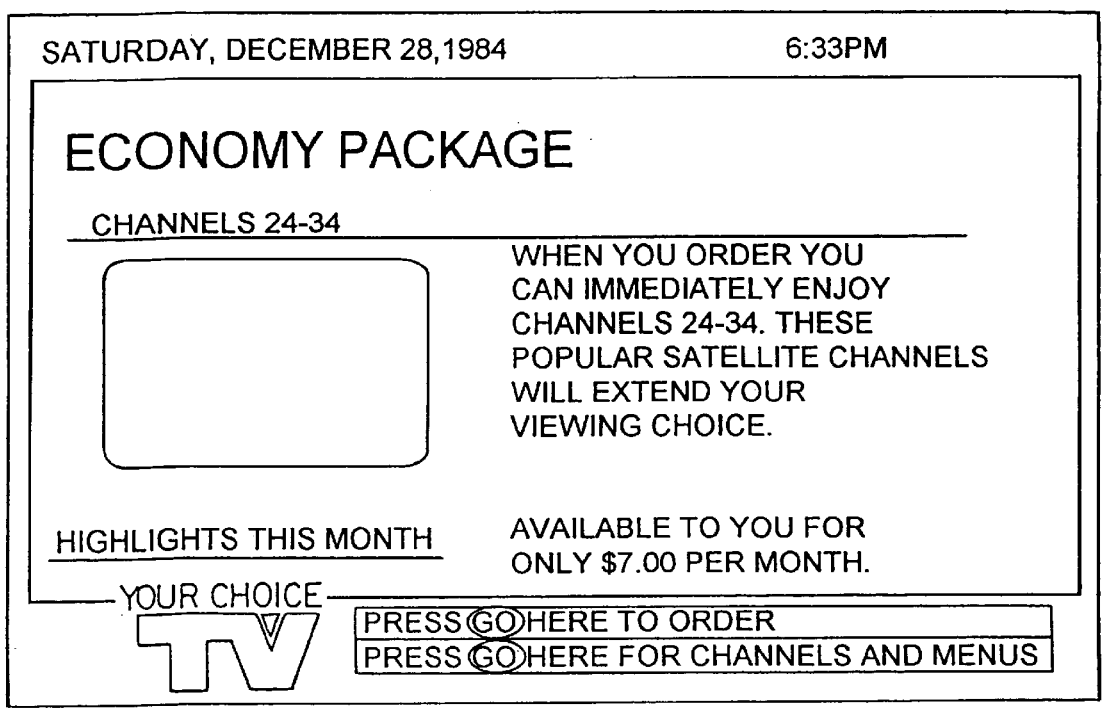
Figure 27F:
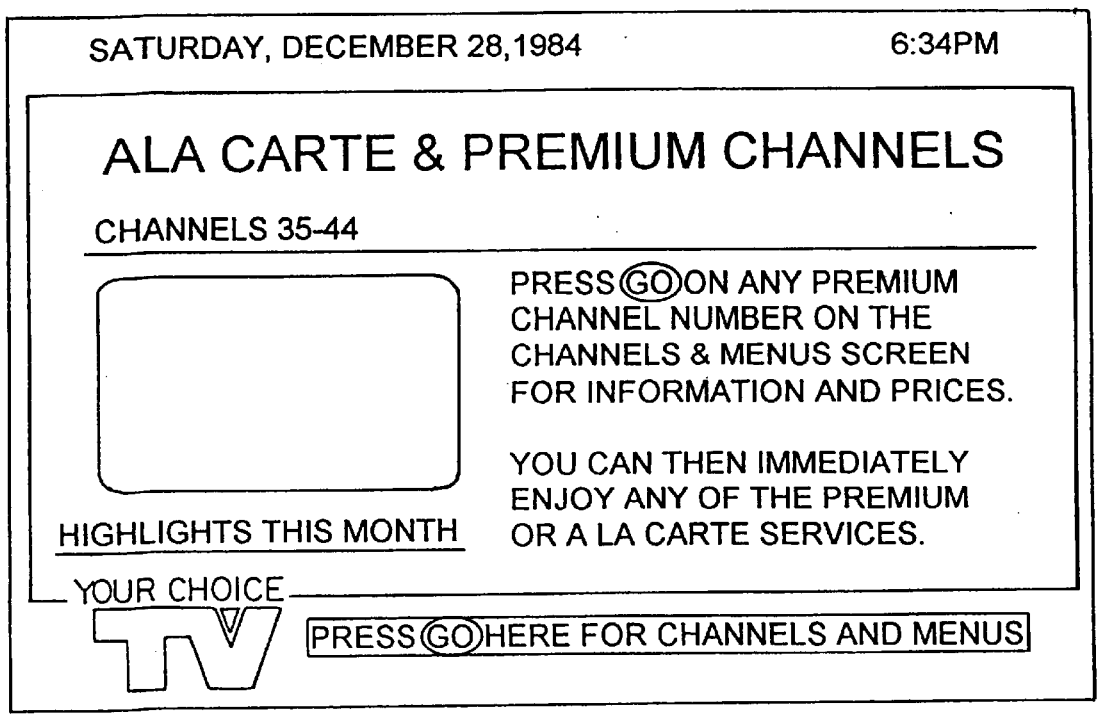

FIGS. 27a and 27b are examples of major menus 1020. In particular, FIGS. 27a and 27b show a major menu 1040 whose category is hit movies.

The hit movie category is a list of recently released movies which have been found to be popular among movie goers. This movie list is changed once or twice a week to keep in line with new movie releases. Again, multi-window and customized window techniques are utilized to make the menu as user friendly as possible.

FIG. 27a shows the preferred embodiment of the hit movies menu 1040. The hit movies menu icon along with the hit movies category letter A are displayed. The current date and time are displayed at the top of the screen over a menu background. Ten movie selections are displayed in the center of the screen 1009, each in a box which may be highlighted when selected. In the lower left part of the screen, a logo window 1512 is available as well as two other option choices 1011, Movie Library and Return to Cable TV. In an alternate embodiment, the return to Cable TV option is changed to return to the Home menu 1010 (or return to other viewing choices).

In FIG. 27b, the left upper window 1002 displays current time and the right upper window 1004 displays a message. This menu provides a list of eight movie titles and their rating 1009. If the subscriber desires further information on any particular movie he may select a movie using the cursor movement buttons and press the "go" button on the remote control 900 or set top terminal 220 box.

It is important in creating user friendly interfaces that the menus are consistent and follow a pattern. A manner of making the menus is discussed below with respect to FIGS. 55 and 56. This consistency or pattern between the different menus provides a level of comfort to the subscriber when encountering new menus. In the major menu 1020 example of FIG. 27a, the upper sash 1502 and lower sash 1504 remain consistent throughout menus in the preferred embodiment. The logos 1508, icons 1510 and titles also remain consistent in the same locations.

In the major menu 1020 example of FIG. 27b, the customized windows 1002, 1004 in the upper corners remain constant from menu to menu. Also, the name of the menu and category are at the top and center of the menu screen 1039. To make the menu aesthetically pleasing, the instructions are given across the center of the screen and choices in large legible type are provided. Additionally, at the bottom of most menu screens 1011, the subscriber is given the option of returning to regular TV or returning to the home menu 1010.

Figure 27G:
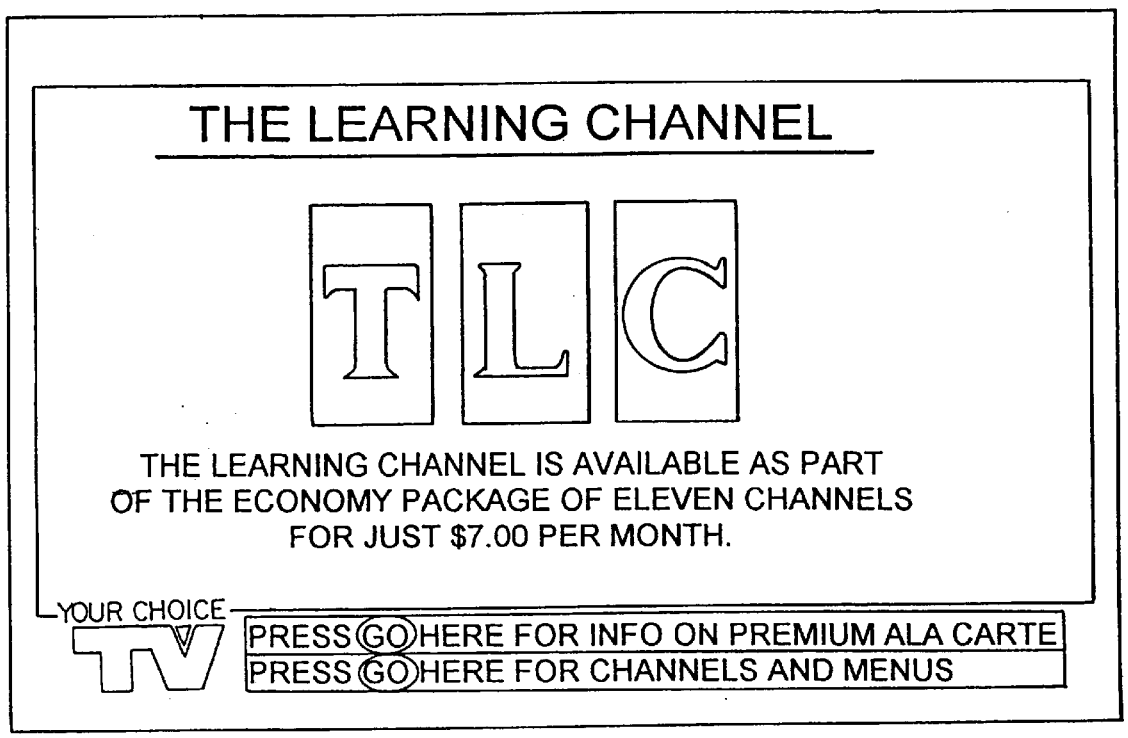

FIGS. 27c–27g show alternative embodiments of major menus 1020 for the home menu shown in FIG. 25a. FIGS. 27c–27g show various major menus directed to the type of subscription services available (basic service 1420, basic plus 1422, economy package 1424, ala carte and premium channels 1426). These menus also provide promotional or advertising information, for example, the cost for the particular subscription service. FIG. 27g shows a major menu for the Learning Channel 1428, one of the individual channels shown in the home menu of FIG. 25a.

These menus may be grouped in similar colors or shades of colors. For example, the basic subscription service could have a light pink color. As the subscription services increase in terms of the number of channels available, the color shading may increase correspondingly. Therefore, the premium subscription service (ala carte service) would have a dark red color, contrasting with the light pink color of the basic subscription service.

Figure 28A:
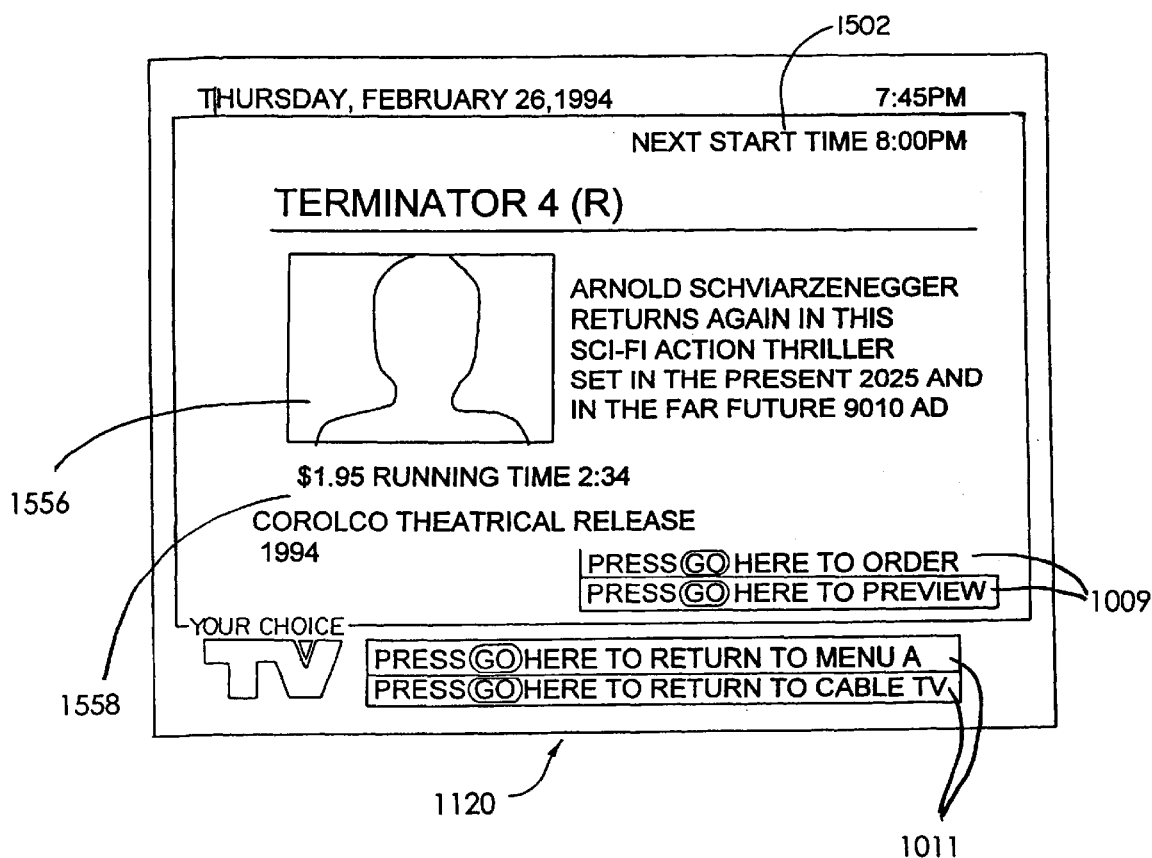
FIGS. 28a and 28b are drawings of hit movie description menus.
Figure 28B:
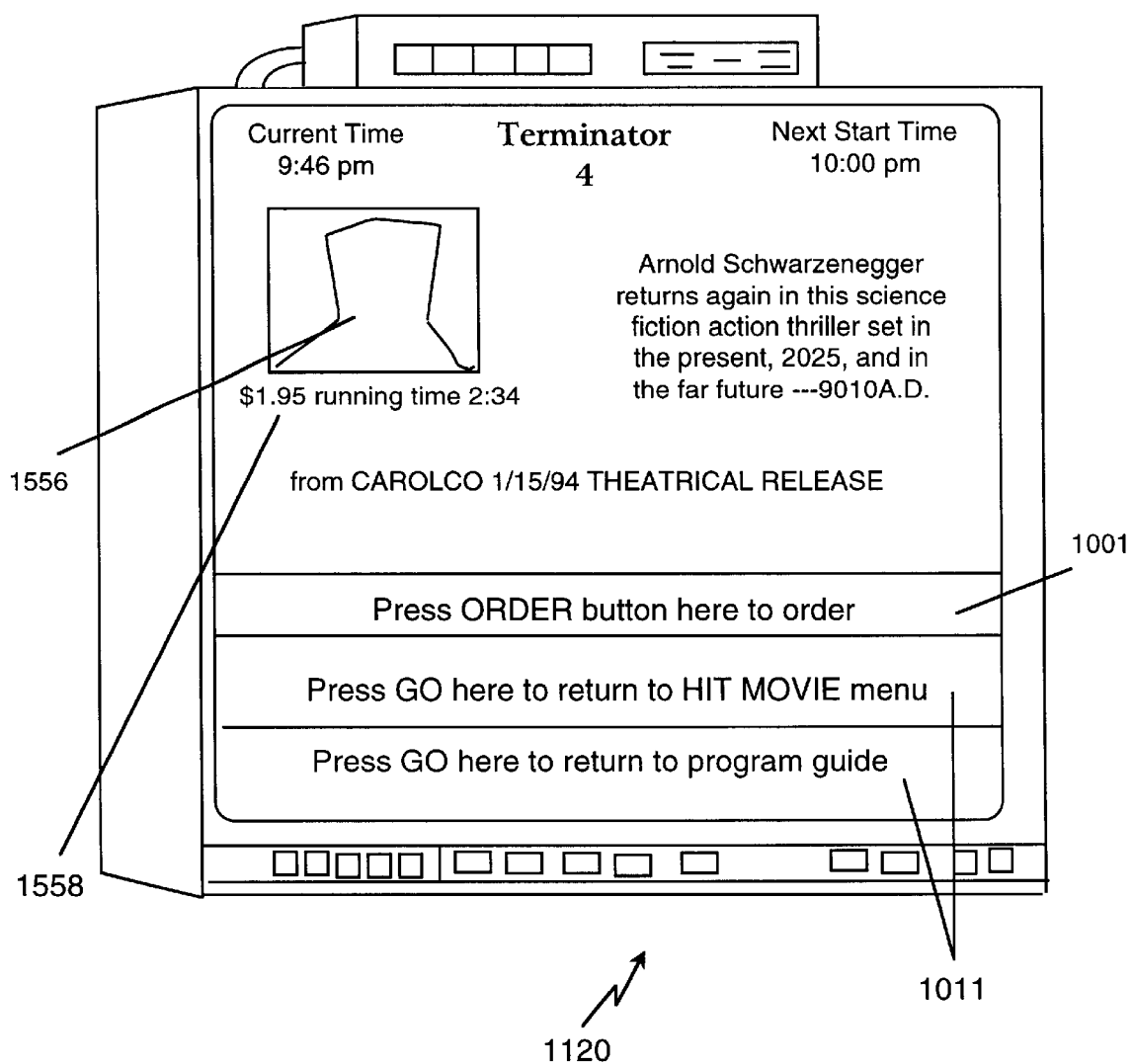

In FIG. 27b, the movie titled Terminator Four is highlighted, signifying that the subscriber has chosen this program option from the hit movie major menu. FIGS. 28a and 28b show submenus 1050 which would follow the selection of Terminator Four on the hit movie major menu. In FIG. 28a, the sash across the top of the screen 1502 remains constant from major menu 1020 to program description submenu 1050. Again in FIG. 28b, for the comfort of the subscriber, the left upper window 1002 remains the same and shows the current time. The upper right-hand corner 1004 carries a message stating the next start time for the movie selected.

E. 2. Notification

Figure 29A:
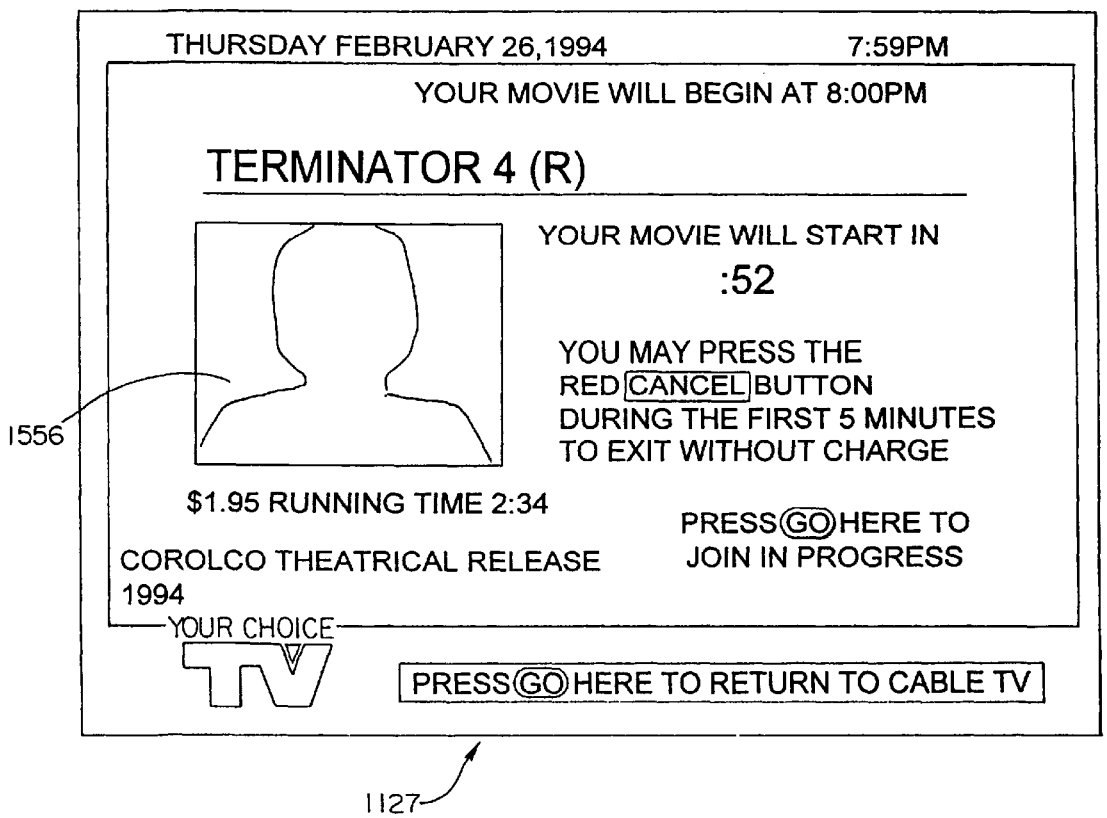
FIGS. 29a and 29b are drawings of hit movie notification submenus.
Figure 29B:
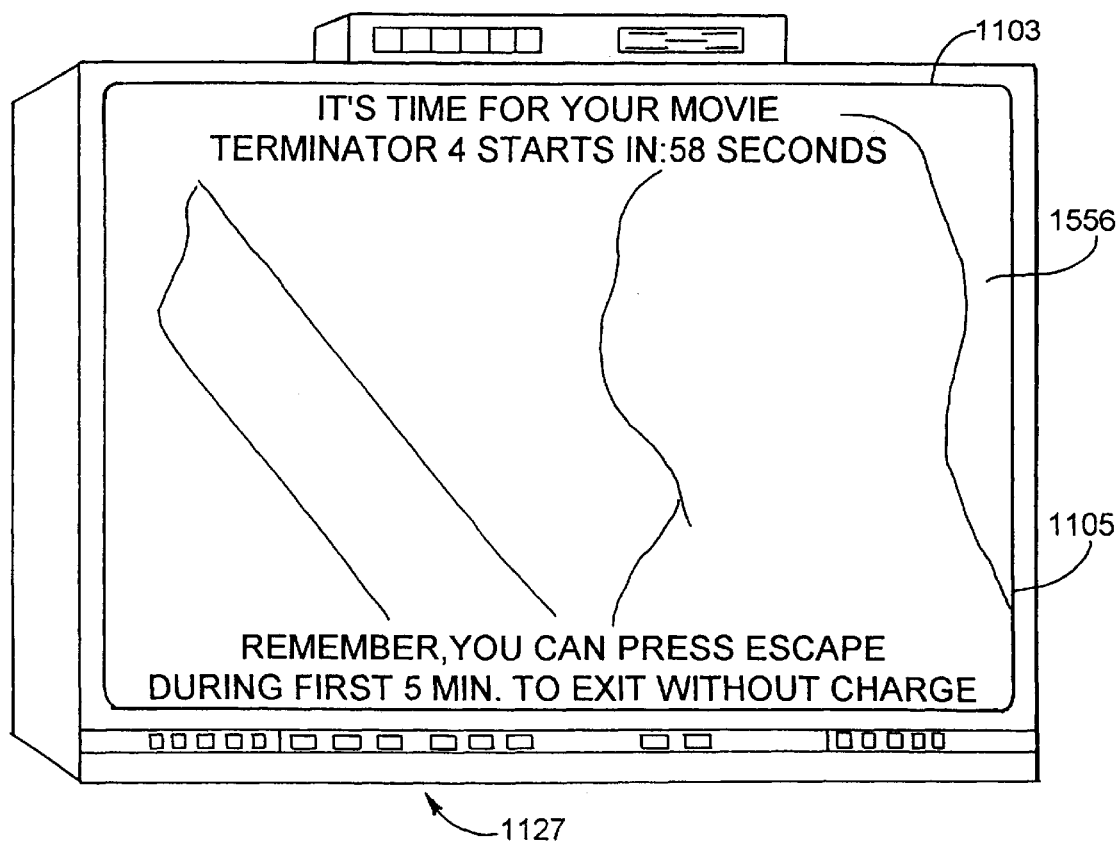

FIGS. 29a and 29b are notification submenus informing the user that his program selection is about to begin (e.g., counting down until start time). Using this submenu, the set top terminal 220 warns the user prior to switching him away from the channel he is viewing to a prior selected program channel. This notification submenu is provided to the subscriber approximately one or more minutes before the set top terminal 220 changes the viewing channel.

Both notification submenu examples allow the subscriber to cancel his movie order. In FIG. 29a, the subscriber is notified in the center of the screen that he may cancel within the first five minutes. In FIG. 29b the subscriber may press escape to cancel his order without charge. The notification submenu of FIG. 29b informs the user of the start time at the upper right portion of the screen.

The notification submenu of FIG. 29b is a simple three-window menu. A strip window at the top of the screen 1103 notifies the subscriber of the movie selected and the amount of time before the movie will begin. The center window is a large video window 1556 for displaying a scene from the movie. At the bottom of the screen the submenu carries another strip menu 1105 which informs the user that he may escape from his program selection without charge.

Using a notification submenu 1127, the set top terminal 220 may allow a subscriber to view other programs prior to his movie start time. The subscriber is amply notified of the start time of his program and effortlessly moved to the correct channel to view his selected program. This notification-type submenu may be used to move a subscriber from his current channel to any preselected channel for viewing a program which has been ordered at an earlier time. In the preferred embodiment, the amount of time provided by the notification submenu may be customized by the subscriber to a length of his preference. The notification submenu also allows a subscriber to cancel or escape from his previously selected program choice and avoid any charges. If a subscriber cancels or escapes he is returned to the channel that he is currently watching.

E. 3. Escape Time Expired

Figure 30A:
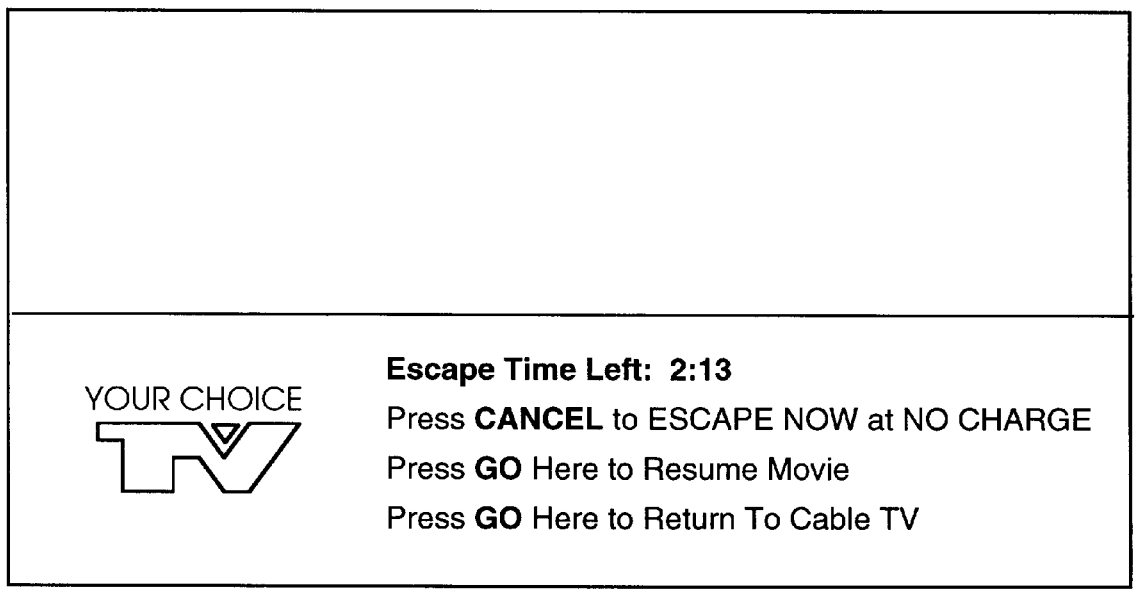
FIG. 30a is a drawing of a hit movie escape during program menu.

As shown in FIG. 30a, in the preferred embodiment, the subscriber is given a During Program Menu, specifically an Overlay menu 1130 to inform him when his five minutes of movie escape time have expired. Once the time has expired the subscriber will be billed for the movie selection.

E. 4. Escape after Charged

FIG. 30b is an overlay menu 1133 warning the user that he is escaping a program after being charged for the order of that program. The warning overlay menu 1133 of FIG. 30b follows in sequence and is prompted by a hidden menu which constantly monitors for subscriber input during viewing of the program. The hit movie hidden menu (not shown) specifically waits for certain key entries by the subscriber. In particular, the hit movie hidden menu awaits for a key stroke such as escape, cancel or an icon selection. If the escape button is depressed during the viewing of a hit movie the overlay menu of FIG. 30a or FIG. 30b will be shown. A strip menu in the lower sash of FIG. 30b allows the subscriber to resume full screen viewing of the hit movie.

Figure 30C:
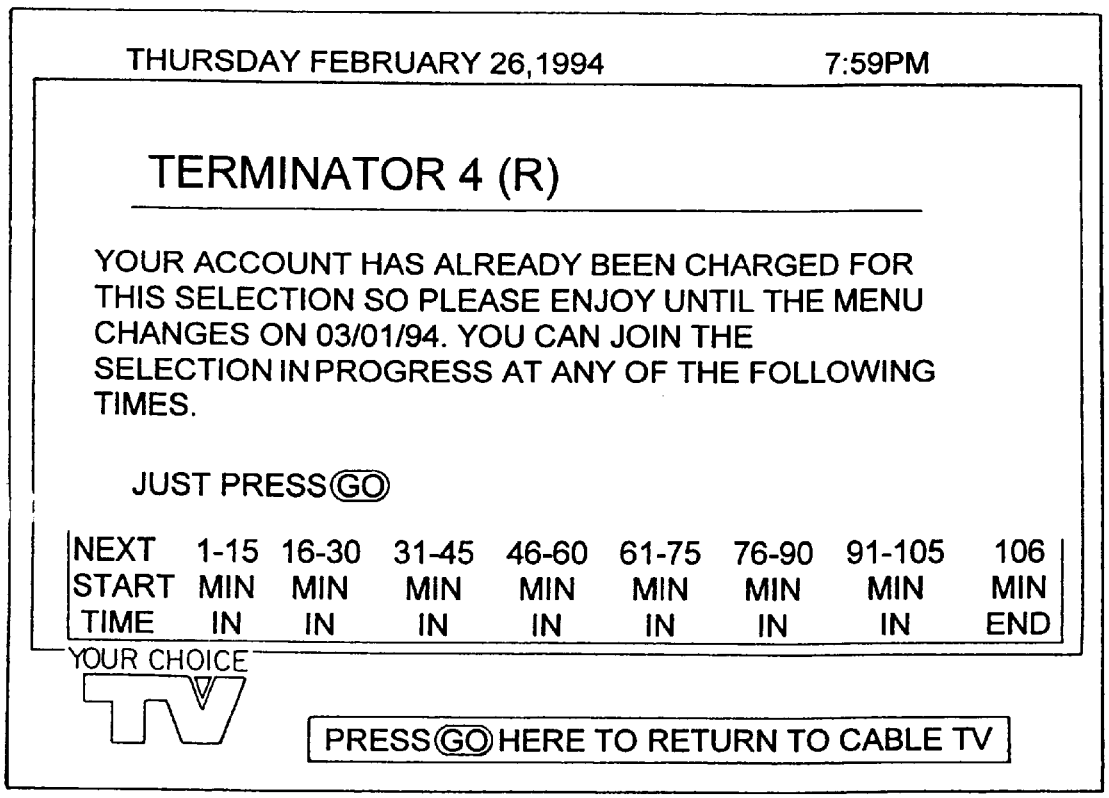
FIG. 30c is a drawing of a hit movie re-entry submenu.

FIG. 30b is a representative example of an overlay menu 1133. It has a dark lower background sash and a light colored informational sash. The upper portion of the screen continues to display the video of the program selected. FIG. 30c is a reentry to ordered selection submenu 1135 for the hit movie category. The reentry to ordered selection submenus appear whenever a subscriber selects a programming option (program, event, or subscription channel), that the subscriber has already ordered. This menu has a program title window with a text title entry, and a description of the order that has already been placed for the program (or channel). In the preferred embodiment, the submenus which allow reentry to ordered selection provide the subscriber with the added option of joining the program within any fifteen minute interval. This special feature of the preferred embodiment allows a subscriber who has viewed one-half of a particular program to rejoin the program at the half-way point. In this manner, the program delivery system mimics a VCR tape recording of the program. For example, if a subscriber had rented a videotape of the movie Terminator 4 and had watched thirty minutes of the movie, he would have left his videotape in the thirty minute position.

E. 5. Reenter Program

With the menu of FIG. 30c a subscriber to the system who has watched thirty minutes of Terminator 4 may reenter the Terminator movie at the thirty-one to forty-five minute interval as shown in FIG. 30c. The nine-fifteen minute blocks of the menu display blocks are representative of the choices available for a two-hour hit movie. Other variations are possible depending on the length of the movie and the timing intervals desired.

E. 6. HDTV Promotion

Figure 31A:
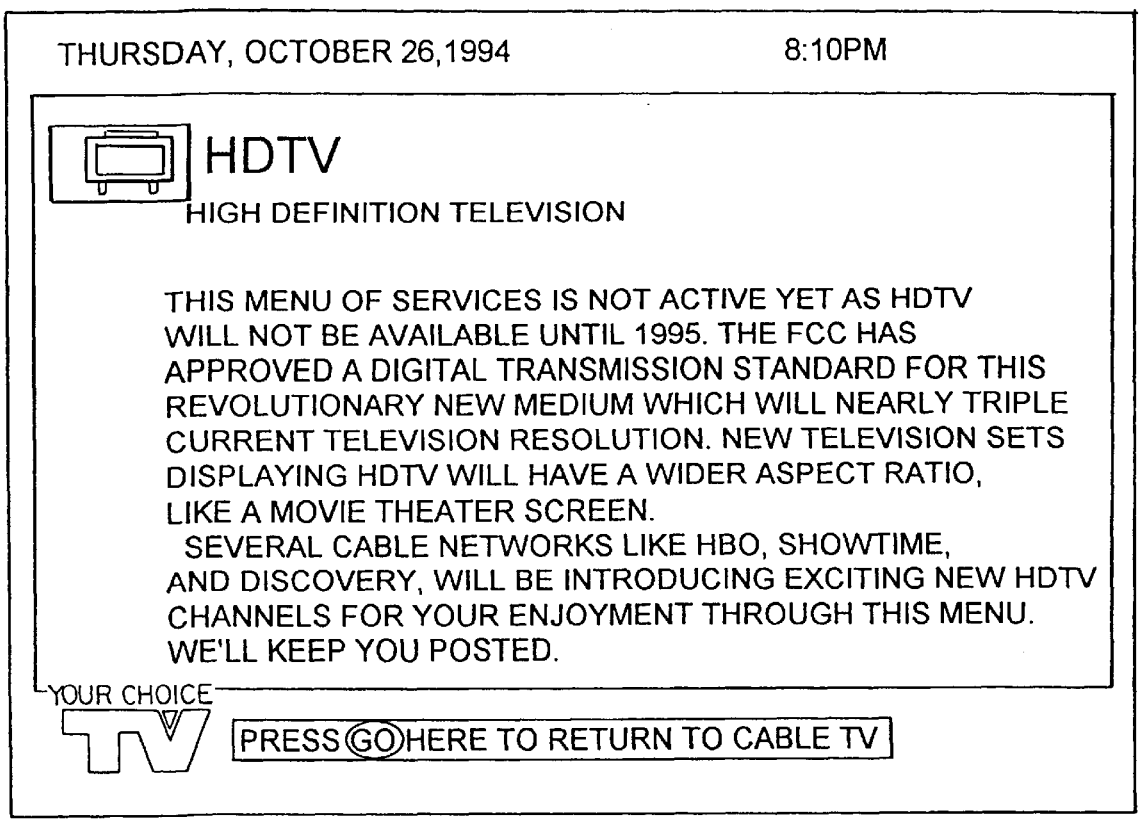
FIGS. 31a and 31b are drawings of menus related to high definition television programming.
Figure 31B:
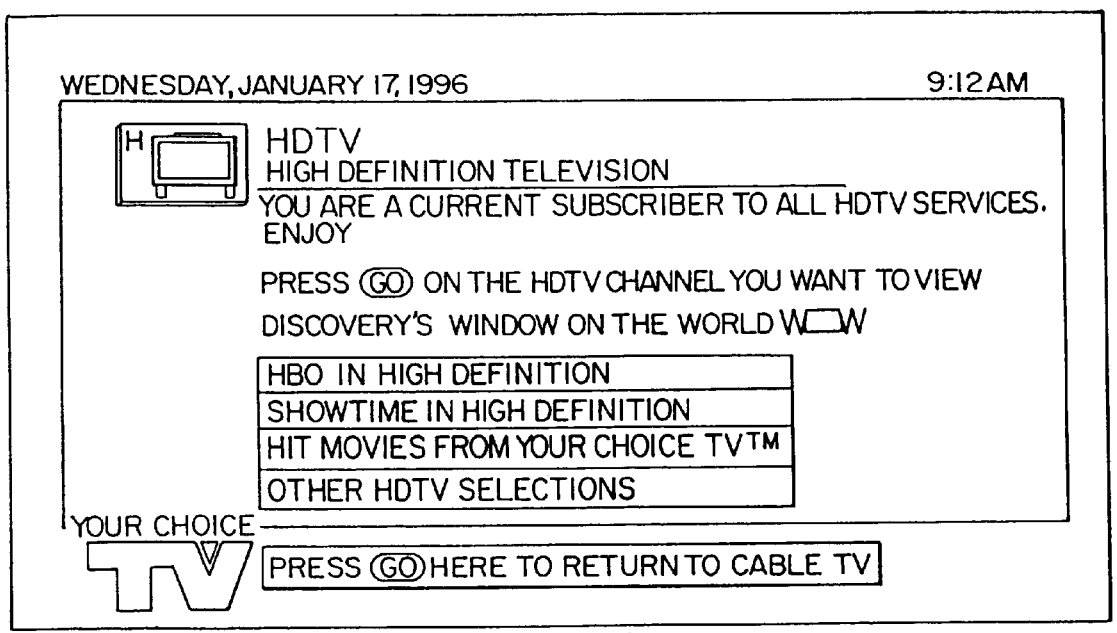

FIGS. 31a and 3b relate to HDTV. FIG. 31a is an example of a menu 1032 advertising a new feature of the system. Promotional menus, such as FIG. 3a, may be dispersed throughout the menu driven program selection system. This particular menu describes the HDTV feature and explains its unavailability until a future date. FIG. 31b shows the integration of HDTV services into the menu driven program delivery system. If the subscriber selects the major menu for HDTV, he will either receive a description of the service with a suggestion to order the system, or a text note that he is a current subscriber and a listing of the currently available program selections in HDTV 1232. If the subscriber has not paid to join the particular service, HDTV, he may be allowed to join one of the programs in progress for a limited time as a demo to entice the subscriber to order.

If the subscriber has paid his HDTV fees, a subscriber proceeds as he would in any other major menu screen.

This particular major menu shows an example of how a follow-on or second screen may exist for the same menu. In this particular case, a second screen exists for the major menu HDTV 1032. The subscriber may access the second screen 1232 by selecting the last menu display block in the lower part of the screen "Other HDTV Selections". Following this selection, the subscriber will be given a second screen of program selections. In this manner, any menu can have multiple screens with many program choices. This type of screen pagination on one menu allows the packager to avoid categorizing program selections within that same menu. In an alternative embodiment, the options available to the subscriber may be scrolled on one menu screen with the text within the menu display blocks changing as the subscriber scrolls up or scrolls down.

E. 7. Programs Available

Figure 32A:
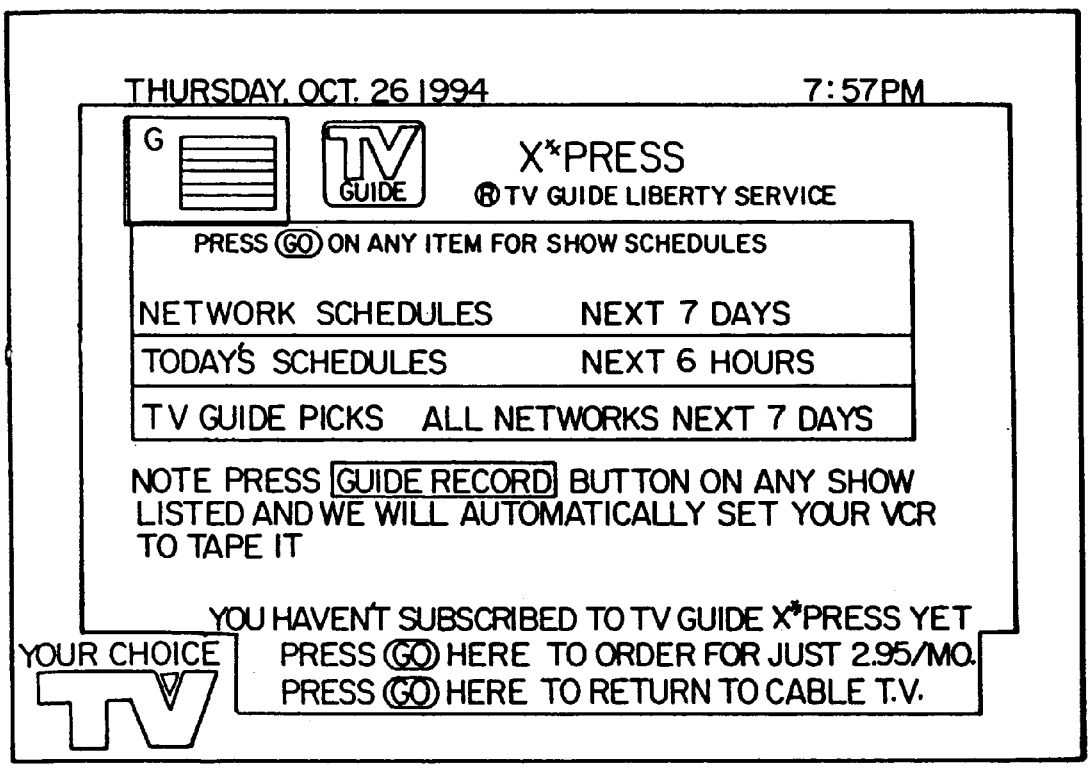
Figure 32C:

In the preferred embodiment, TV guide services, listing programs available on network schedules, will be available on a major menu, as shown in FIG. 32a. In the preferred embodiment, the major TV guide menu 1036 would offer submenus, such as network schedules for the next seven days, today's network schedules for the next six hours, and TV guide picks for the next seven days. If the particular set top terminal 220 has been subscribed to the TV guide service, the subscriber may proceed to a submenu showing schedules of programs. If the subscriber chooses the network schedule submenu 1236, he is offered a list of network schedules to choose from as shown in FIG. 32b. If a subscriber were to choose, for instance, HBO, the submenu 1238 shown in FIG. 32c would appear. This submenu allows a subscriber to choose the program date that interests him. Following selection of a date, the subscriber is shown a more specific submenu 1242 listing programs available on the particular date as shown in 32d.

Figure 32E:
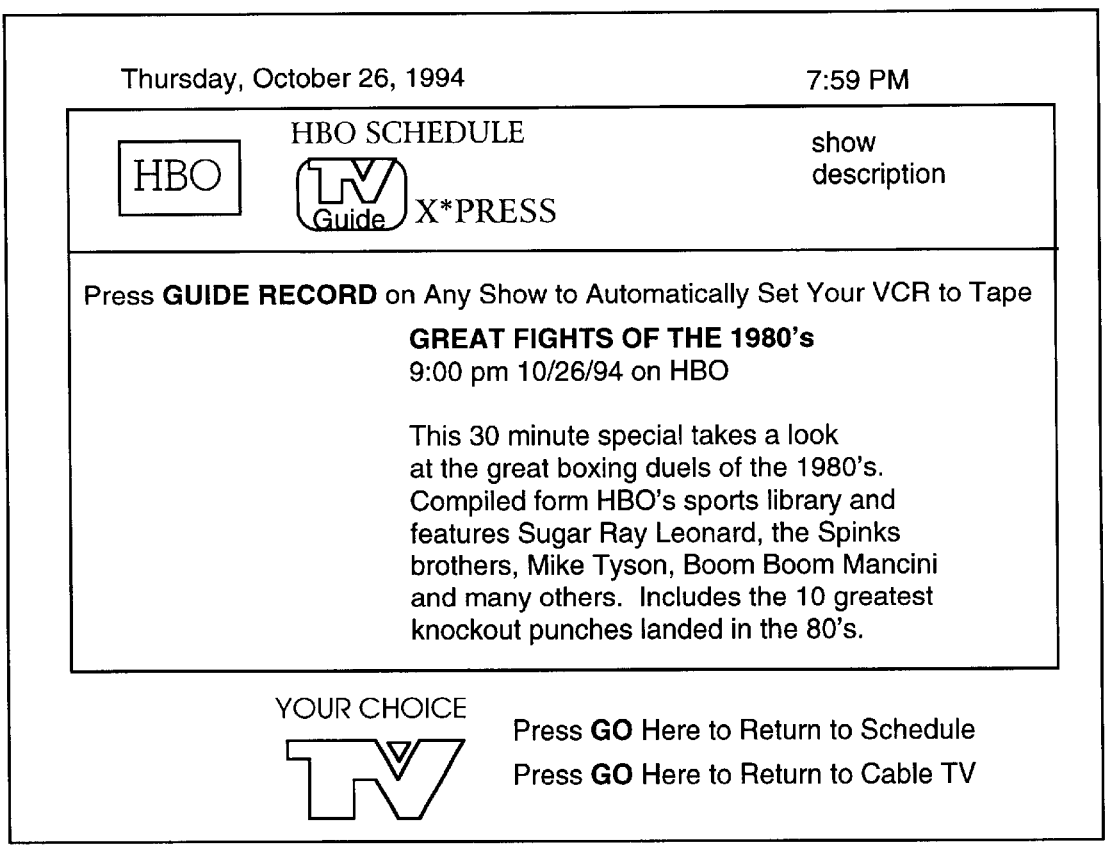
Figure 32F:
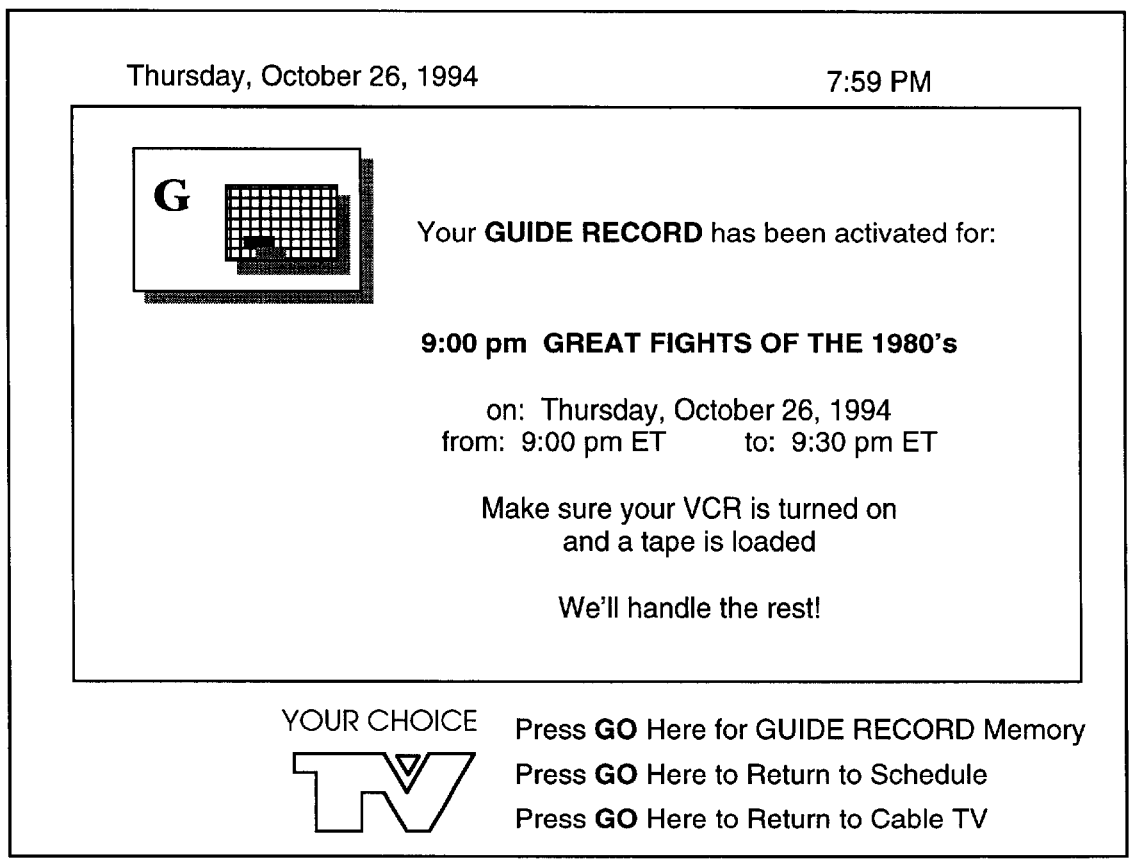

Following a program choice, a program description submenu 1244 is placed on the television screen as shown in FIG. 32e. In addition, from this program description submenu, the viewer may choose to record the selected program on his VCR using the guide record feature. If the guide record feature is chosen, the guide record submenu 1248 shown in FIG. 32f provides the subscriber with further instructions. In order for the set top terminal 220 to perform the guide record functions and operate the VCR, control signals must be sent from the set top terminal 220 to the VCR via the video connection 650 or via a separate connection between the set top terminal 220 and the VCR. The VCR must be capable of interpreting these control signals from the set top terminal 220 and performing the desired function (such as, activating the record feature). In the preferred embodiment, the VCR control signals are sent with the video signal and output from the output 650, as described above.

Figure 32G:
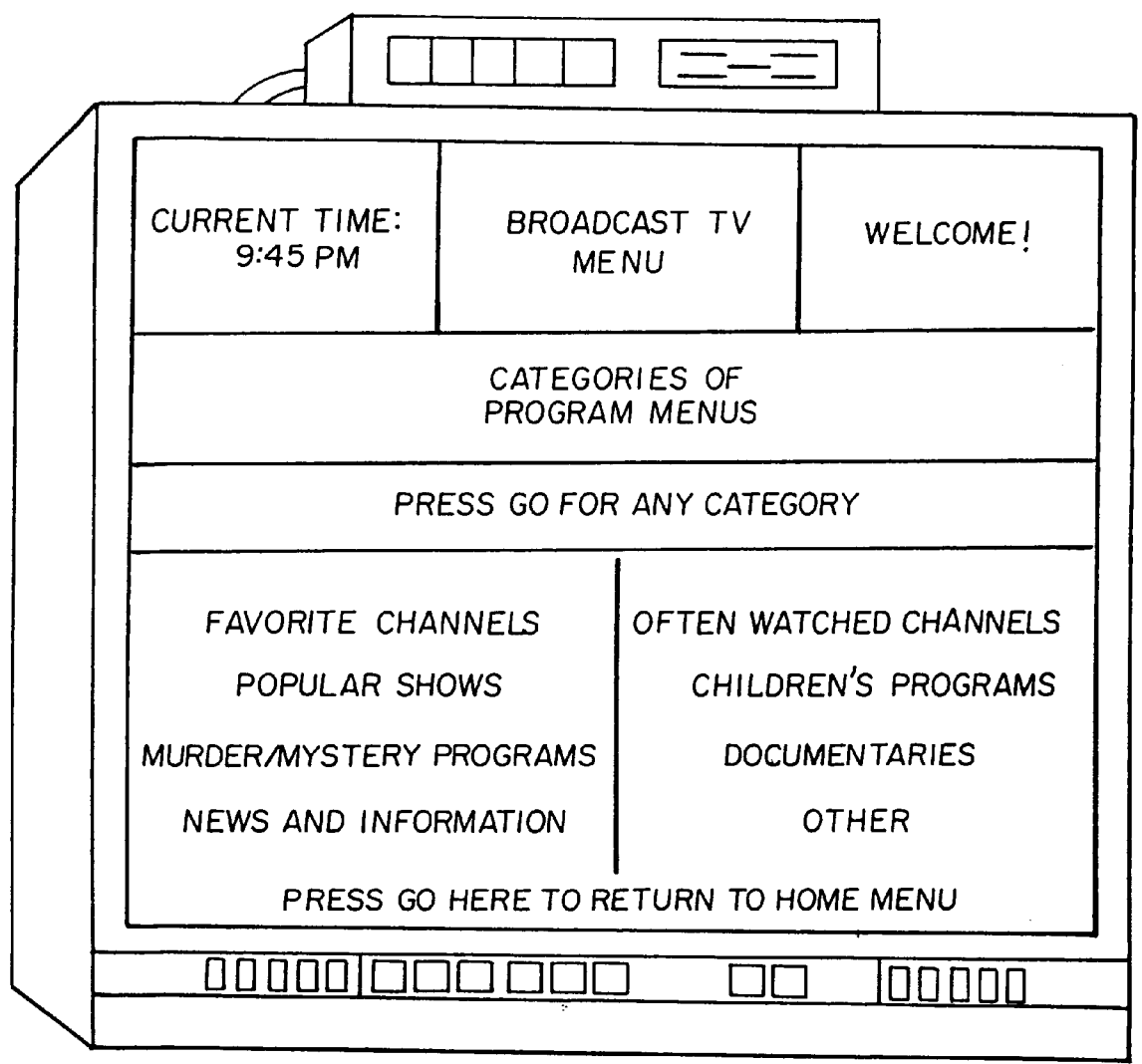
FIGS. 32g and 32h are drawings of broadcast television menus.
Figure 32H:
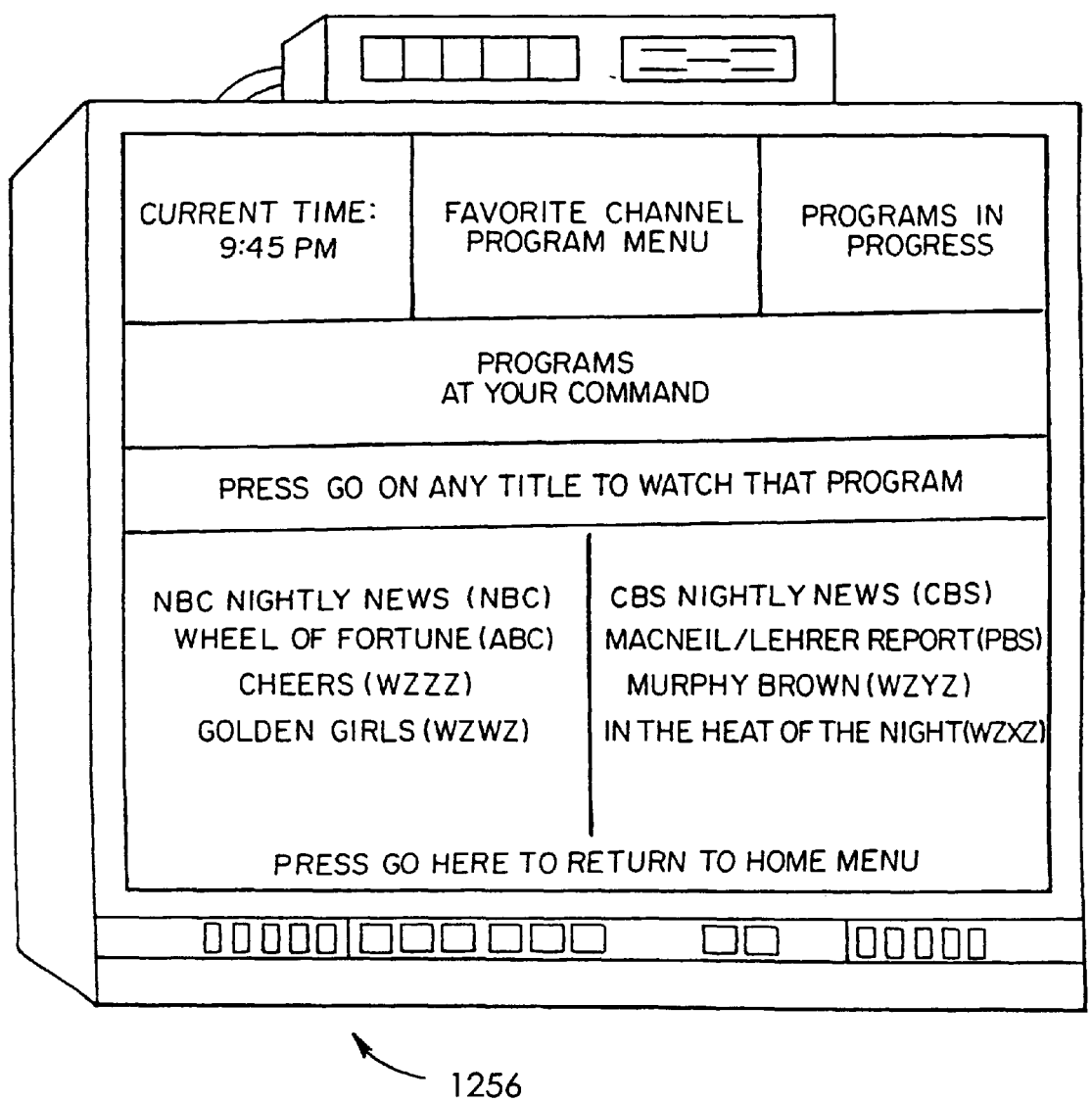

FIGS. 32g and 32h refer to the broadcast TV menu option available in FIG. 23b. FIG. 32g is a major menu 1046 displaying subcategories of programs available on a group of channels called generically "broadcast TV." For each subcategory there is a separate submenu listing programs that are available in the particular subcategory on a group of channels called broadcast TV.

By using the broadcast TV menu, the subscriber does not need a written guide of available television programming on the major networks. Although the preferred embodiment categorizes television programs available on the major networks, a simple chronological listing of programs may also be used.

Following a subcategory selection on the broadcast TV menu such as favorite channels, the set top terminal 220 will display a submenu of programs as shown in FIG. 32h. The favorite channel program menu 1256 of FIG. 32h allows the subscriber to choose among eight programs in progress at 9:45 p.m. on a broadcast TV network.

Using this methodology, the subscriber may also be allowed to choose among television programs which will be available for viewing in the next half hour or hour. When the time of the preselected program is approaching, the set top terminal 220 will display a notification menu or window to the subscriber (similar to FIG. 29a and 29b) informing him of an eminent change of channels to a previously selected program.

E. 8. Mood Questions

Once a personal profile has been created (in a particular set top terminal 220), it can be indefinitely stored in non-volatile memory. A selection at the home menu screen 1010 activates the program selection feature. Following activation of the feature, the set top terminal 220 will present the viewer with a series of brief questions to determine the viewer's mood at that particular time. For example, the first mood question screen 1260 may ask the viewer to select whether he desires a short (30 minute), medium (30–60 minute), or long (60 plus minute) program selection, as shown in FIG. 32i. The second mood question screen 1262 requests the viewer to select between a serious program, a thoughtful program, or a light program, as shown in FIG. 32j. And the third mood question screen 1264 requests whether the user desires a passive program or an active program, as shown in FIG. 32k. The viewer makes his selection in each question menu utilizing the cursor movement keys and "go" button on his remote control 900. A variety of other mood questions are possible such as fatigue level of the viewer.

After the viewer has responded to the mood question menus which determine his mood, the set top terminal 220 finds the best programming matches for the viewer and displays an offering of several suggested programs to the viewer (three or more programs are preferred). The matching algorithm compares the viewer profile data with information about the program derived from the program control information (or STTCIS) signal, such as show category, description type, length, etc. Using the personal profile information and mood questions suggested above, the following types of outcomes are possible. If the set top terminal 220 is presented with a young lady viewer, educated in Boston who watches sitcoms on a regular basis, and desires a short, light, passive program, a match might be found with the 30-minute sitcom Cheers, the sitcom Designing Women, and Murphy Brown. Taking another example, a middle-aged male viewer from the Boston area, wishing a longer length, light, passive program suggestion might be suggested the New England Patriots game, the Boston Red Sox game and a science fiction movie.

With this program selection feature, the set top terminal 220 can intelligently assist the specific viewer in selecting a television program. Instead of the set top terminal 220 requiring an input of personal profile information, the terminal may also "learn" a subscriber's viewing habits by maintaining historical data on the types of programs the viewer has most frequently watched. This information can then be fed to the matching algorithm which selects the suggested television programs.

Using this methodology, it is even possible for the set top terminal 220 to suggest programs for two viewers. By using two sets of viewer profile information, the matching algorithm can find the best match for joint viewing. For example, the set top terminal 220 can suggest programs for a couple watching television simultaneously.

E. 9. Promotions

Figure 33B:
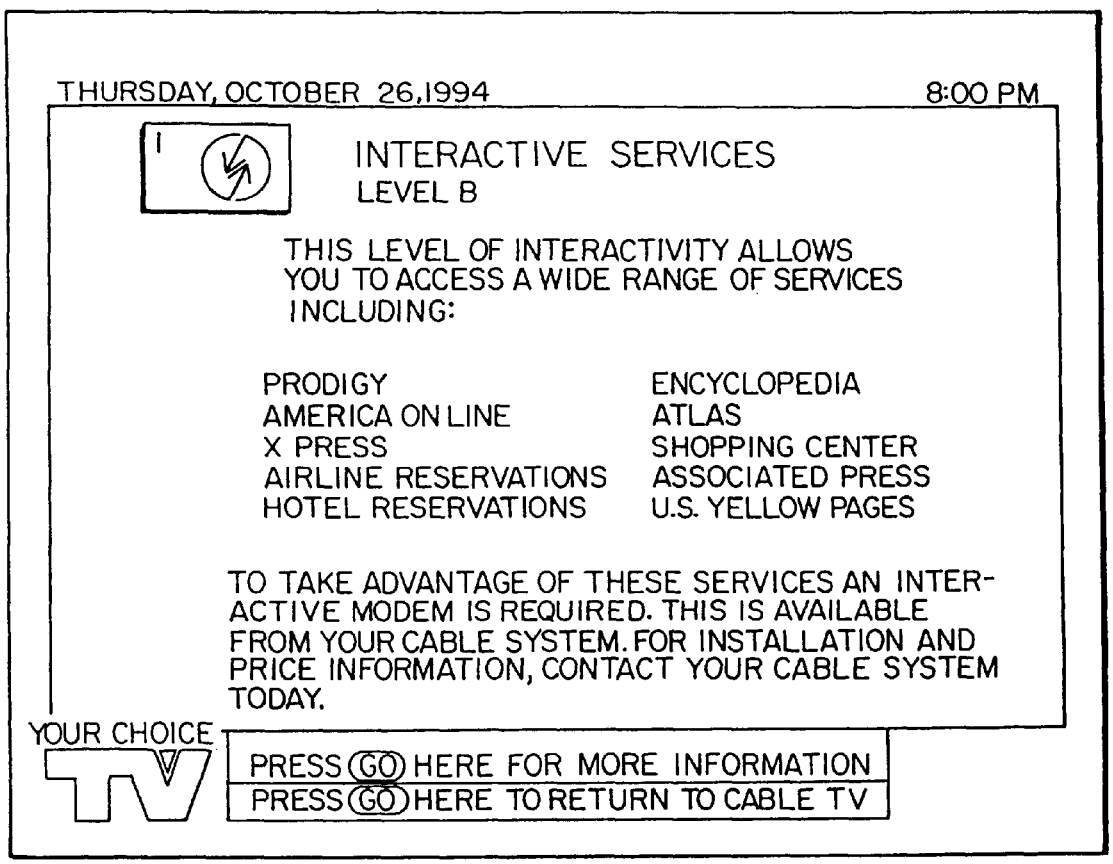
Figure 33C:

FIGS. 33a, 33b, and 33c demonstrate the use of promotional menus to sell subscriptions to services in the system. In particular, FIG. 33a is a promotional menu 1304 for Level A interactive services. Level A interactive services offers subscribers additional information about programs such as quizzes, geographical facts, etc. This information may be received by the set top terminal 220 in several data formats including VBI and in the program control information signal. FIG. 33b is a promotional menu 1306 for Level B interactive services which include a variety of on-line type services such as Prodigy, Yellow Pages, Airline Reservations, etc.

FIG. 33c is a promotion menu 1308 for the Level C interactive services. The Level C interactive services utilize local storage such as CD technology to offer an enormous range of multi-media experiences. The Level C interactive services require a hardware upgrade as described earlier. Specially adopted CD-I and CD-ROM units are needed for this service.

E. 10. Level A Interactive

FIGS. 33d through 33j show menus that are available using the interactive Level A services. When interactive Levels A services are available in a television program, the system will display the interactive logo consisting of the letter "I" and two arrows with semicircular tails. In the preferred embodiment the set top terminal 220 will place the interactive logo on the television screen as an overlay menu 1310. In the preferred embodiment, the set top terminal 220 will detect that there is data or information available about a television program which can be displayed to a subscriber using the interactive service. When the set top terminal 220 senses that there is interactive information available, it will generate the interactive logo overlay menu and place it on the television screen. For example, the set top terminal 220 will detect that information on a television program is being sent in the vertical blanking interval (VBI) and generate an interactive logo overlay menu which will appear on the subscriber's television screen for approximately fifteen seconds during each ten minute interval of programming.

Figure 33D:
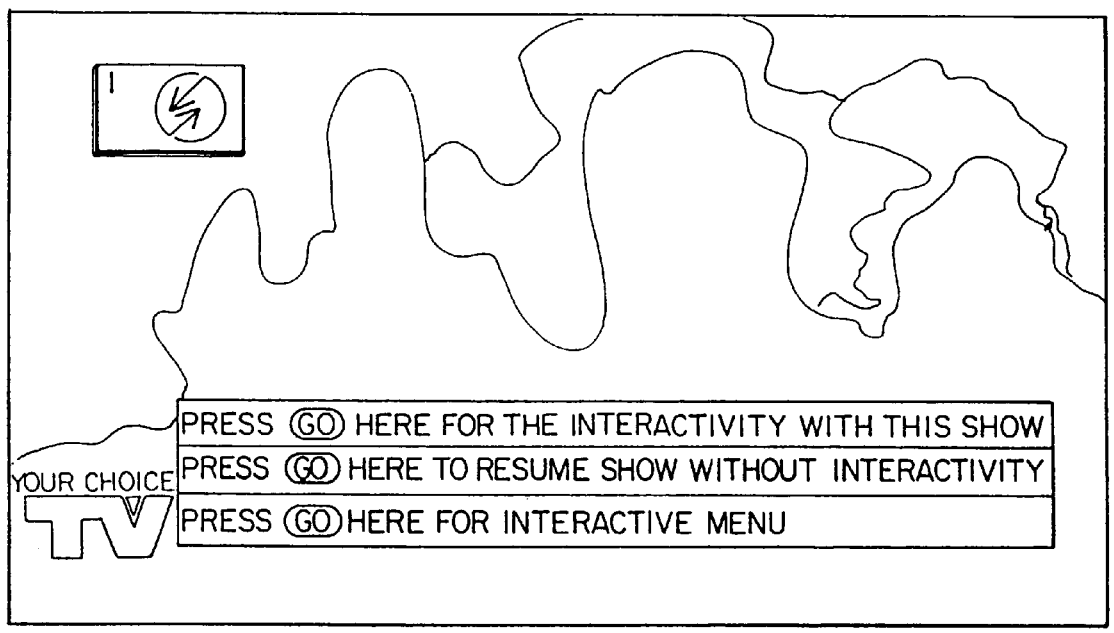
FIGS. 33d, 33e, 33f, 33g, 33h, 33i and 33j are drawings of submenus for interactive television services, Level A.

When the subscriber sees the interactive logo on his television screen, he is made aware of the fact that interactive services are available in conjunction with his television program. If the subscriber presses his interactive remote control button, an additional overlay menu will be generated by the set top terminal 220 and placed on the screen. This menu 1310 is shown in FIG. 33d being overlayed on an interactive television program. From this menu the subscriber may select interactive features or return to the television program without interactive features.

Figure 33E:
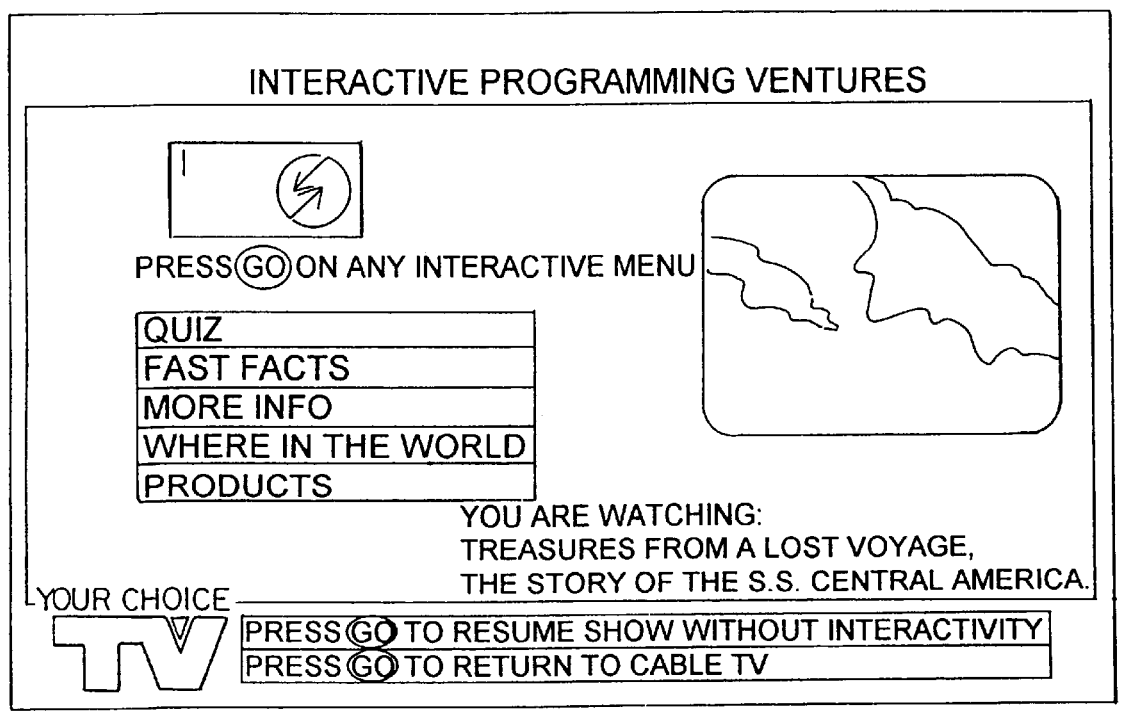

If the subscriber selects interactive features he will be presented with the interactive Level A submenu 1312 in FIG. 33e. From this submenu the subscriber may choose a variety of different types of textual interactivity with the current television program. Some examples are quizzes, fast facts, more info, where in the world, products, etc. At any time during the interactive submenus the user may return to the television program without interactive features.

This interactive submenu has an example of taking a complete television program video, scaling it down to a smaller size and directing the video into a video window of a submenu.

Figure 33F:
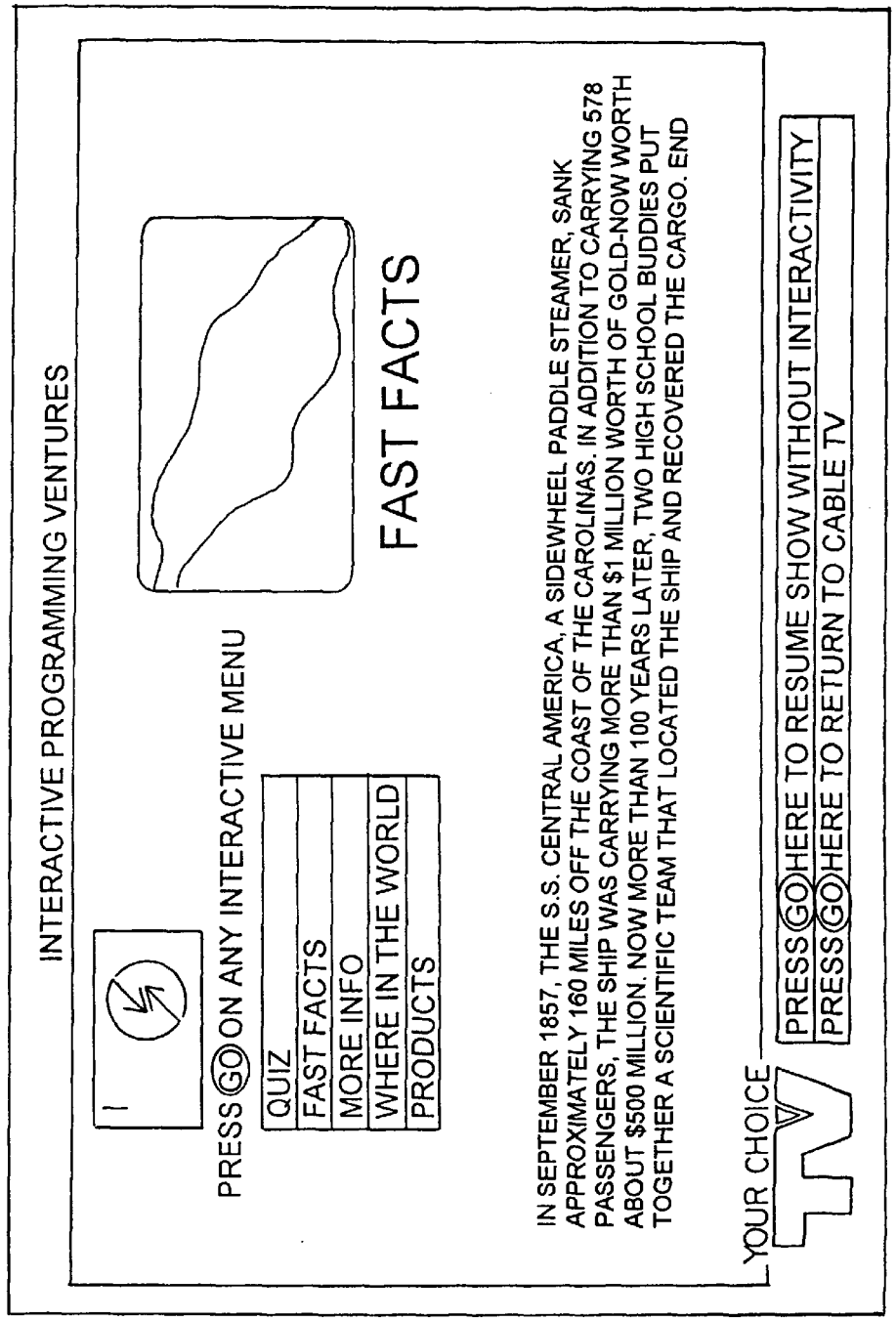

FIG. 33f shows an interactive fast facts submenu 1314. In this submenu textual information is given to the subscriber in the lower half of his screen. This textual information will change as additional data is received by the set top terminal 220 relating to this television program.

Figure 33G:
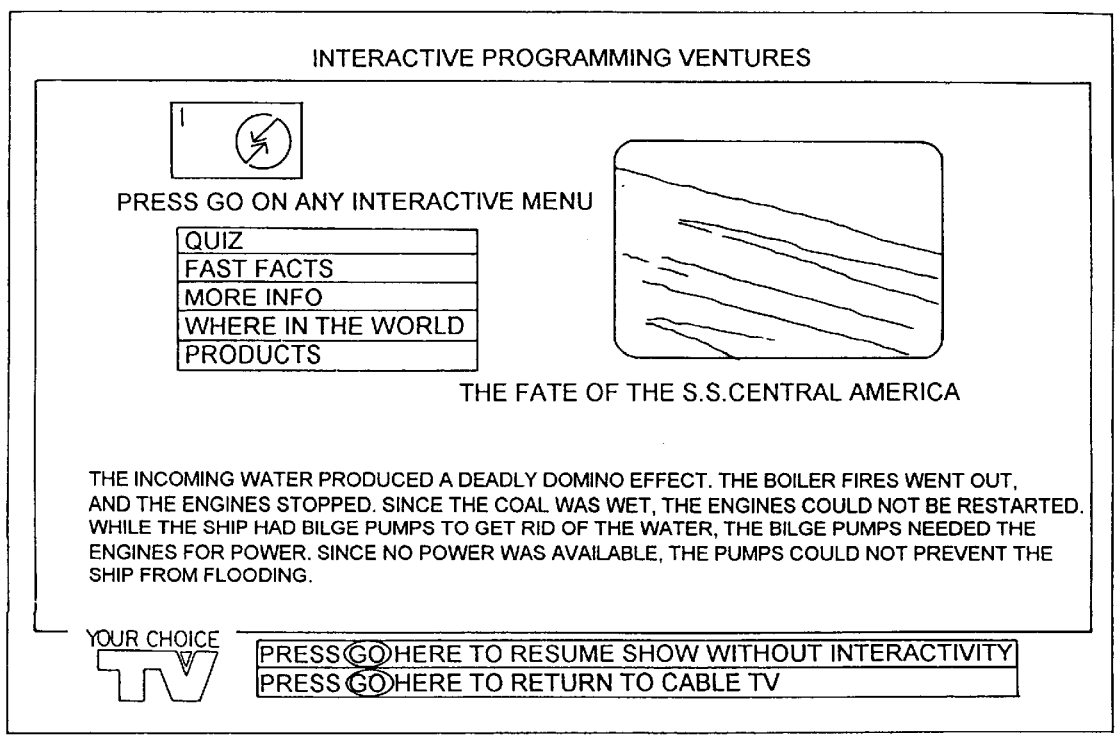

FIG. 33g shows the use of the subcategory "more information" in the interactive service. This submenu 1316 gives additional information related to the television program to the viewer in textual form in the lower half of the screen.

Figure 33H:
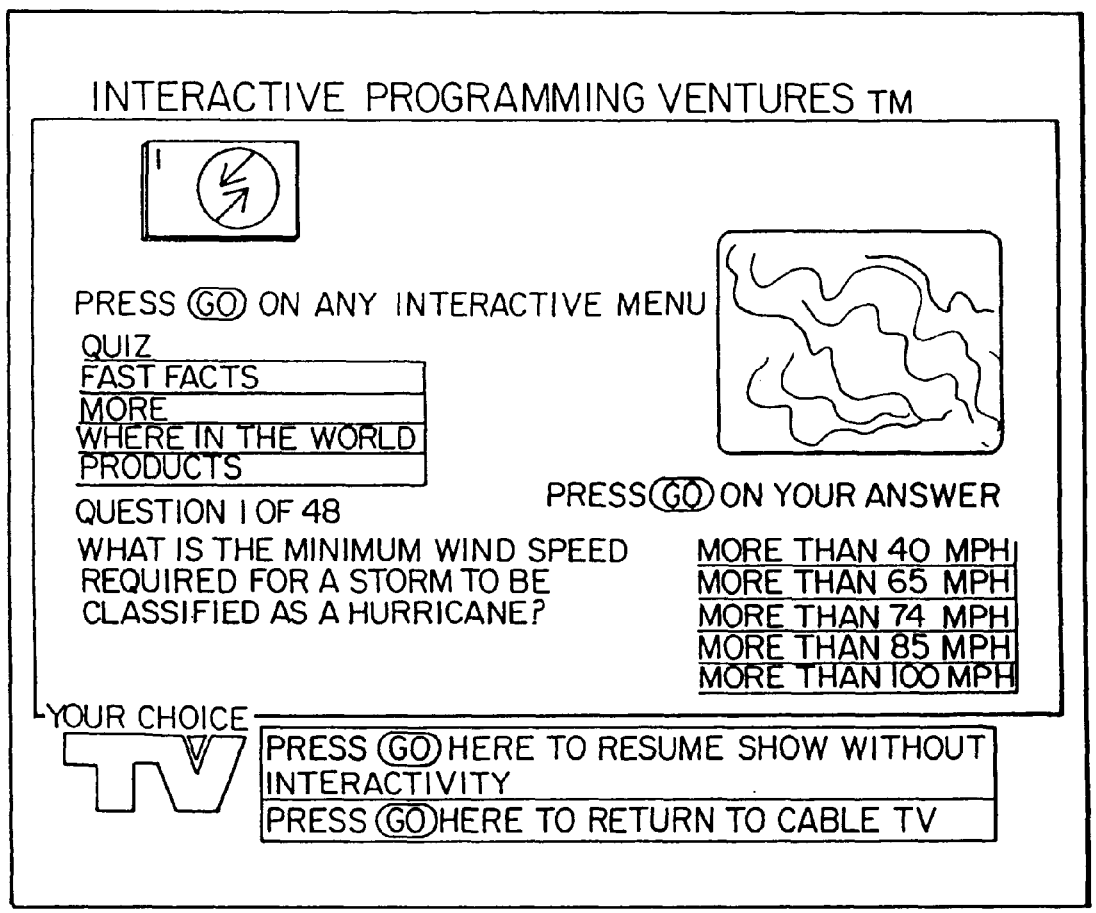
Figure 33I:
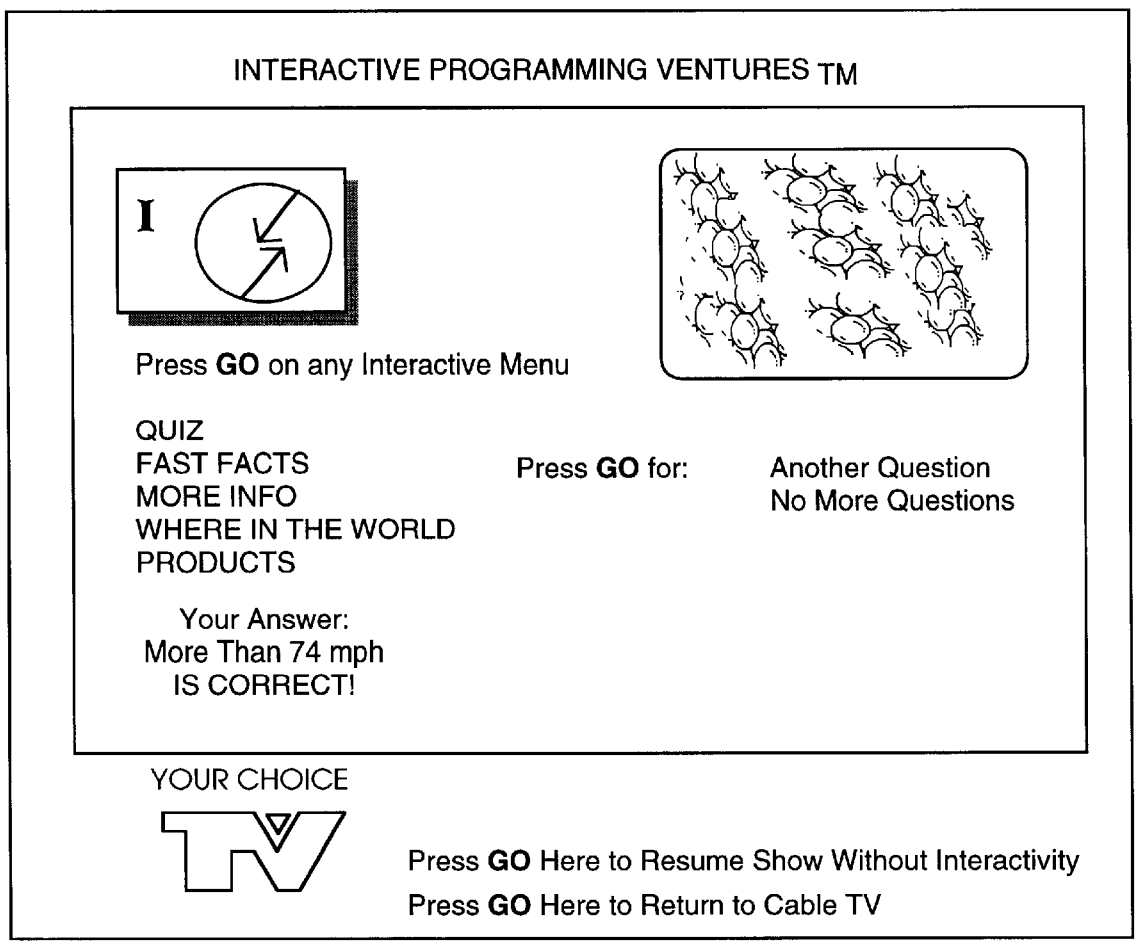
Figure 33J:
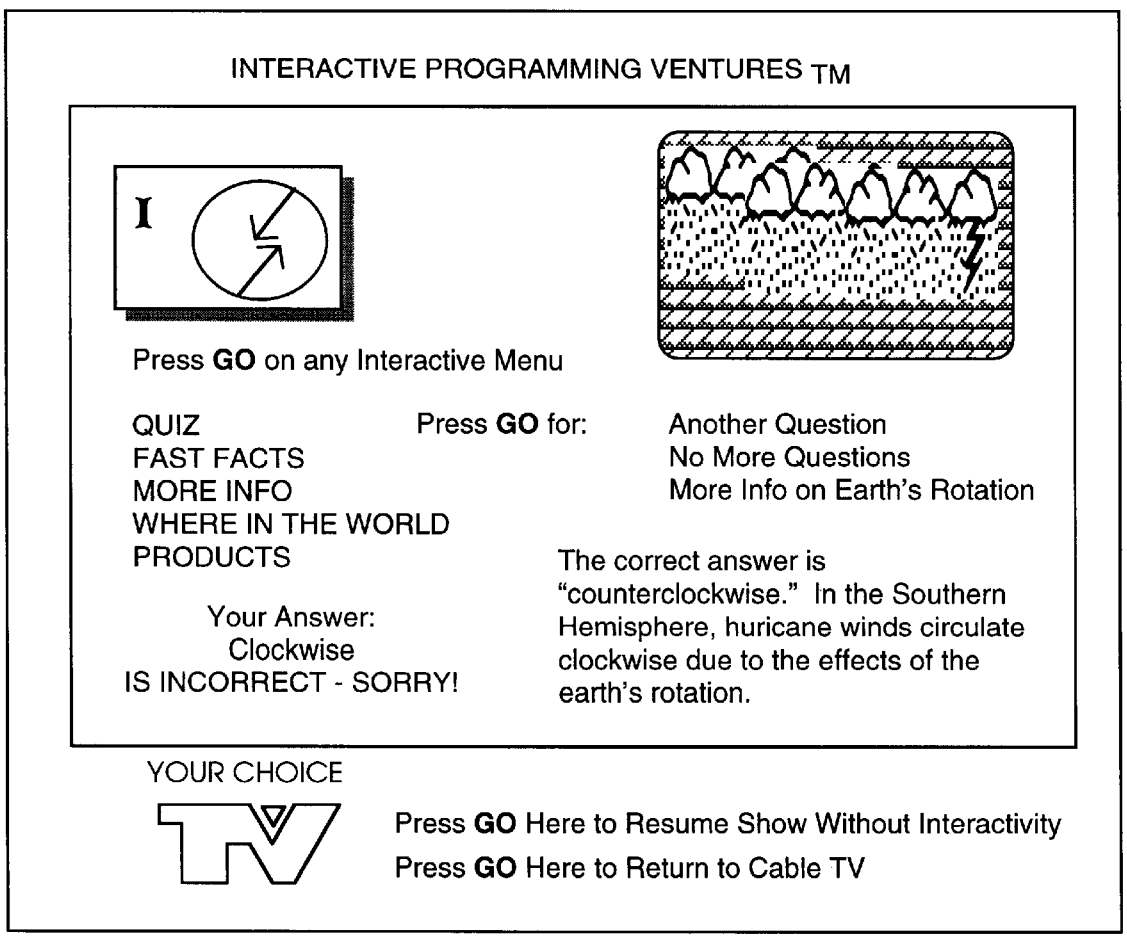

FIG. 33h is an interactive submenu 1318 for the subcategory "quiz." In this interactive subcategory, the user is presented with questions and a series of possible answers. If the subscriber desires, he selects one of the answers to the quiz question. After his selection, the set top terminal 220 sequences to another menu. The set top terminal 220 sequences to the interactive quiz answers submenu which informs the subscriber whether he has chosen the correct answer or not. FIG. 33i shows a correctly answered quiz question 1320 and FIG. 33j shows an incorrectly answered quiz question 1324. In the preferred embodiment, the menu graphics for both of these menus 33i and 33j is the same. The only difference is in the text which can be generated by the text generator of the set top terminal 220.

E. 11. Level B Interactive

Figure 34A:
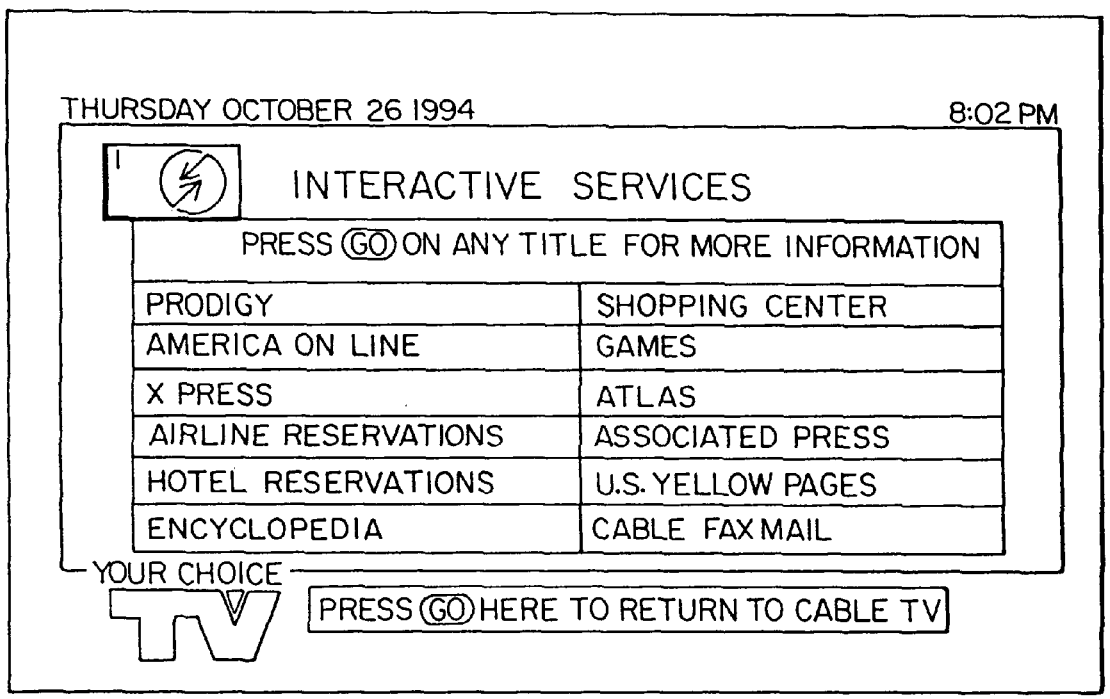

FIG. 34a is an example of a submenu for Level B interactive services. From this menu screen 1330, any of a number of on-line data services could be accessed. In FIG. 34a, the airline reservations selection has been selected by the subscriber.

E. 12. On-Line Data

Figure 34B:
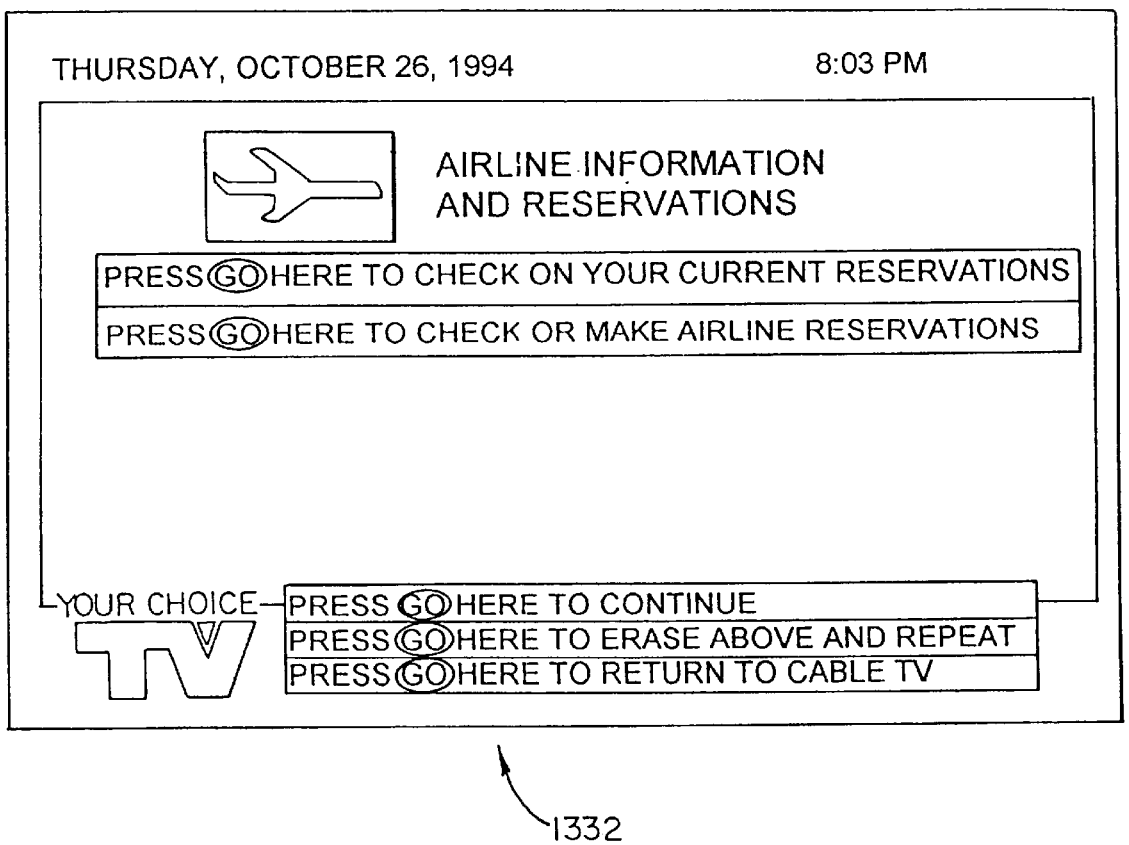
Figure 34C:
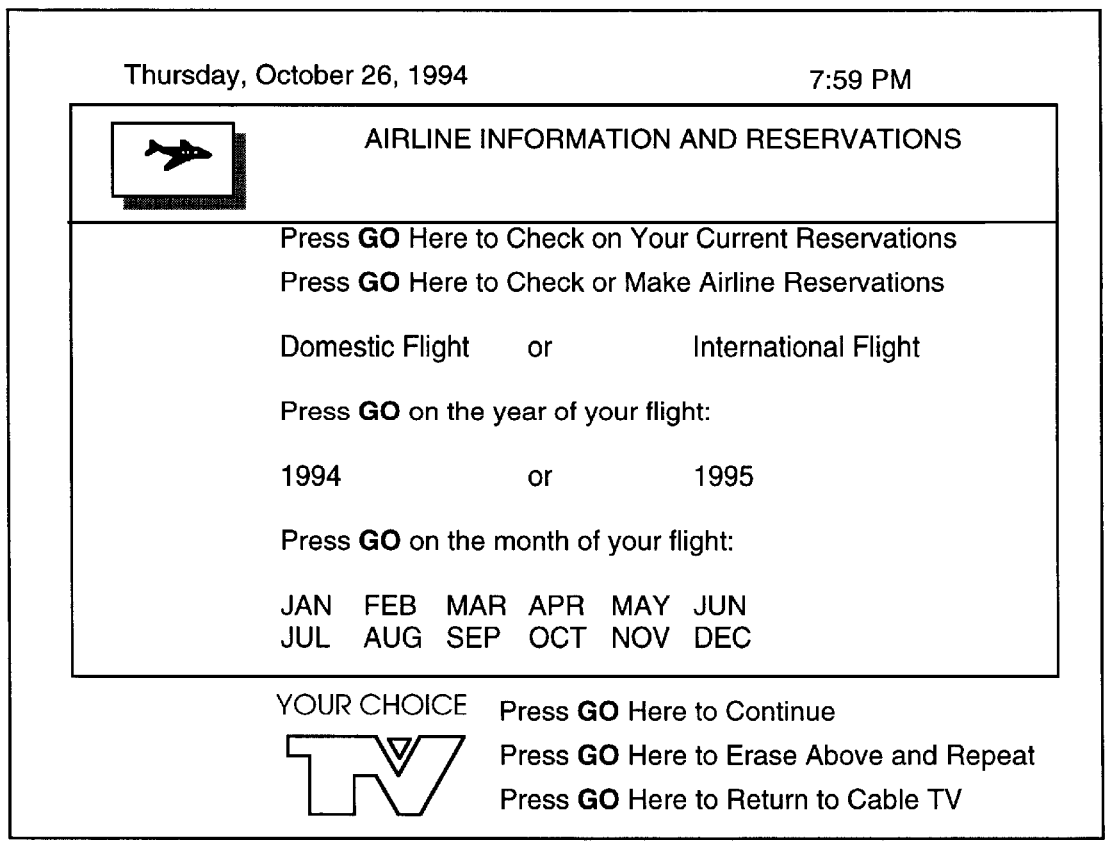

FIGS. 34b through 34l provide an example of a sequence of menus that a subscriber may encounter with an on-line data service. In particular, this example relates to airline information and reservations and the subscriber in this sequence is reserving and purchasing airline tickets. FIG. 34b is an example of the first submenu 1332 for a data service offering various options. In this case, the subscriber has the option of checking current reservations or making new reservations. In each of these submenus related to a data service, the subscriber is able to return to the home menu 1010 or regular cable TV and exit the data service. FIG. 34c requires the subscriber to enter information related to his airline reservation in this submenu 1334, such as: domestic or international flight, year of flight reservation, month of flight reservation.

Figure 34D:
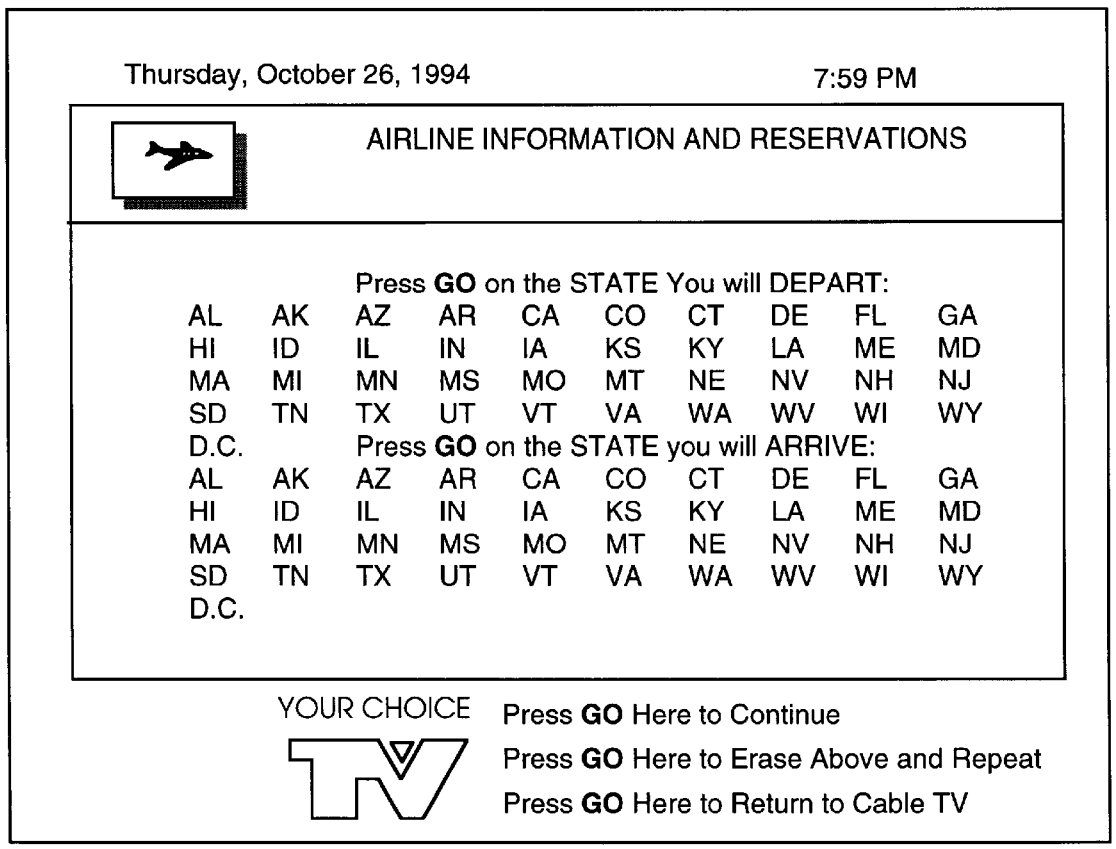

FIG. 34d is another submenu in the airline information and reservation data service. FIG. 34d provides an example of how the subscriber may choose among many options on a single screen 1336. In this manner, the preferred embodiment of the system can avoid the use of a separate keyboard for textual entry. Although a separate keyboard may be provided as an upgrade, it is an added expense which some subscribers may wish to avoid. FIG. 34d shows an "eye off the remote" approach to entering information. FIG. 34d allows the user to chose the State in which he will depart and the state in which he will arrive. The airline information reservation submenu 1338 shown in FIG. 34e allows a subscriber to choose the airports from which he will depart and arrive and also the approximate time period of his departure and his arrival. FIG. 34f, an airline information and reservation submenu 1340, allows a subscriber to view six available flights. A subscriber may select one of the flights to check on its availability.

FIG. 34g, an airline information and reservation submenu 1342, allows a subscriber to enter the month, day and year for the availability date he desires. In this submenu, the subscriber is offered the option of correcting any errors in the entered information. This particular submenu is for a particular flight, including flight number.

Figure 34H:
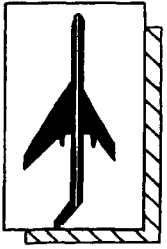

FIG. 34h, an airline information and reservation submenu 1344, allows a subscriber to view remaining seats available on a flight. From the menu, the subscriber may select his seat assignments. This submenu is an example of how information may be graphically shown to a subscriber using a portion of the menu and different coloring schemes. In this menu, the lower half of the screen shows the passenger compartment of an airplane with all the seat locations graphically represented by square blocks. By coloring the available seat locations in blue and the unavailable seat locations in a different color, the menu can present a great deal of information in a limited amount of space. This graphic presentation of information for the interactive on-line data services is an important method of visually displaying large amounts of information to the subscriber.

FIG. 34i, an airline information and reservation submenu 1346, allows the subscriber to choose a one-way or round-trip ticket and to confirm his reservations. If the subscriber desires to proceed, he may charge his airline ticket to his credit card by choosing the appropriate strip menu on the lower part of the screen.

FIG. 34j, an airline information and reservation submenu 1348, is an example of how credit card purchases may be made using the interactive on-line data services. In this particular menu, the subscriber is charging a round-trip plane ticket on his credit card. The subscriber simply needs to enter his credit card number, expiration date, and credit card type to charge his airline ticket.

Figure 34K:
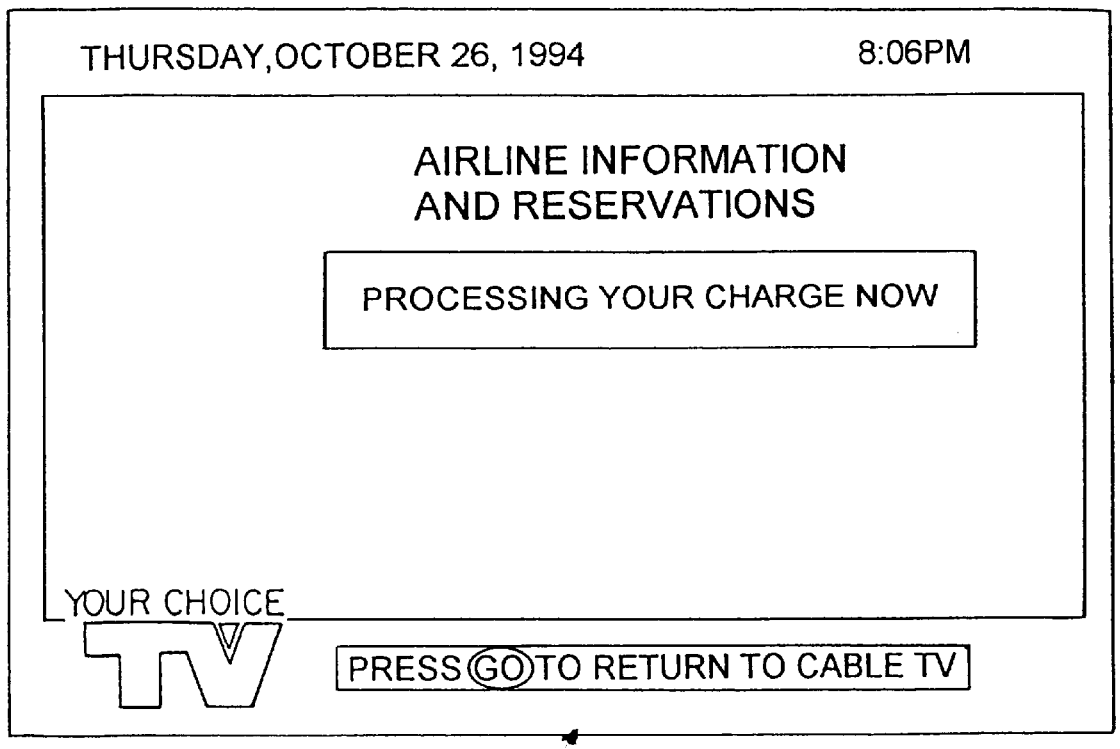

FIG. 34k, an airline information and reservation submenu 1350, is an example of a menu which may be shown whenever an on-line data service is processing a request sent by the subscriber. In this particular menu, the on-line data service is processing the subscriber's credit card charge for his airline ticket.

Figure 34L:
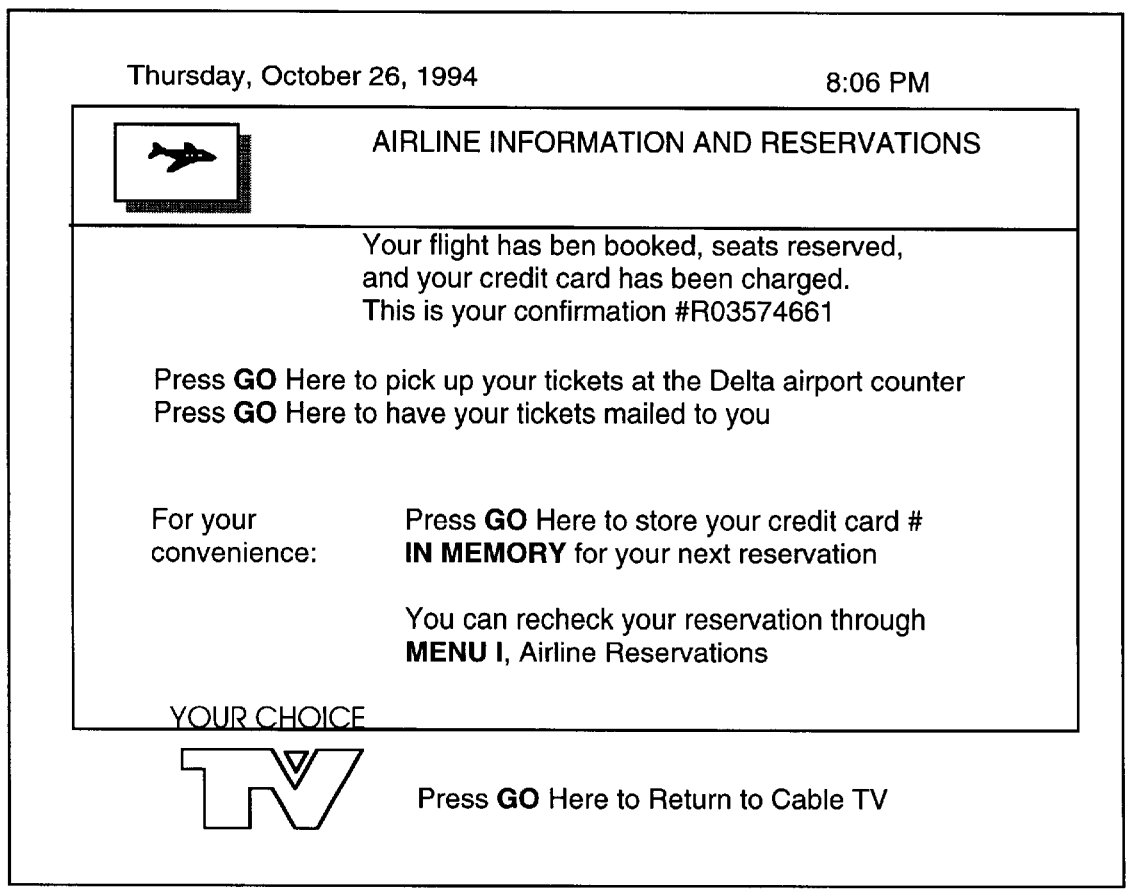

FIG. 34l, an airline information and reservation submenu 1352, confirms a subscriber's airline ticket purchase and passes on information on where the ticket may be picked up.

E. 13. Digital/Audio Program Choices

Figure 35A:
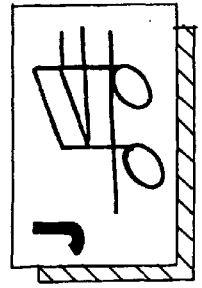

FIG. 35a is a major menu 1038 displaying the digital/audio program choices which are available for subscribers who have paid the monthly fee. In a chart format, the major menu shows the top five, top ten, and top forty songs available in six different categories of music. Below the chart, the system is able to provide a text message describing the particulars of the audio program selected.

The digital/audio feature of the invention allows a subscriber to listen to CD quality audio selections through his stereo. This can be accomplished by running cables directly from the set top terminal 220 to the subscriber's amplifier/stereo system. Alternatively, the user may listen to audio selections through his television system.

FIGS. 35d and 35e are the same major menu 1038 as FIG. 35a but shows a different selection and a different program description in the lower text 1408, 1412. From any of the menu screens for the digital/audio feature, the subscriber may return to regular cable TV with the press of a single button.

Figure 35B:
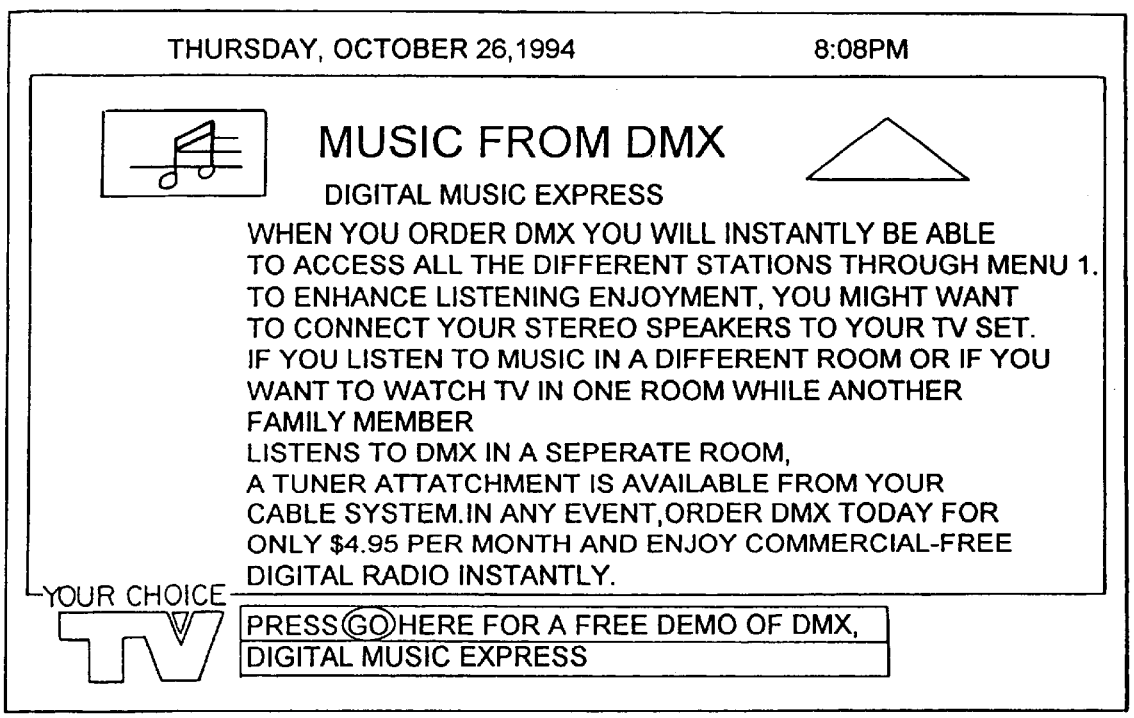
Figure 35C:
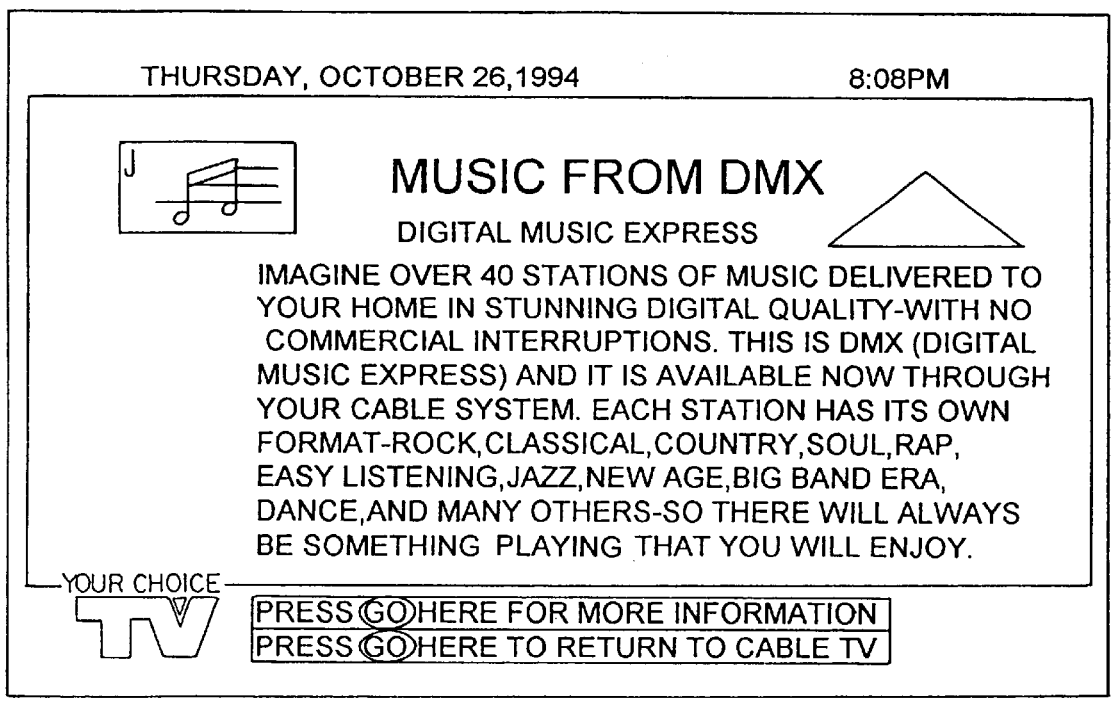

FIGS. 35b and 35c are promotional menus 1400, 1404 for the digital/audio feature. Using the same logos and menu format, the system can provide a text description enticing the subscriber to pay the monthly fee and join the service. In FIG. 35b, the menu allows the user to test the system with a free demonstration. The menu in FIG. 35c allows the subscriber to request additional promotional information about the system. Both FIGS. 35b and 35c are representative of promotional menus that may be used throughout the menued system.

E. 14. Monthly Account Review

Figure 36B:
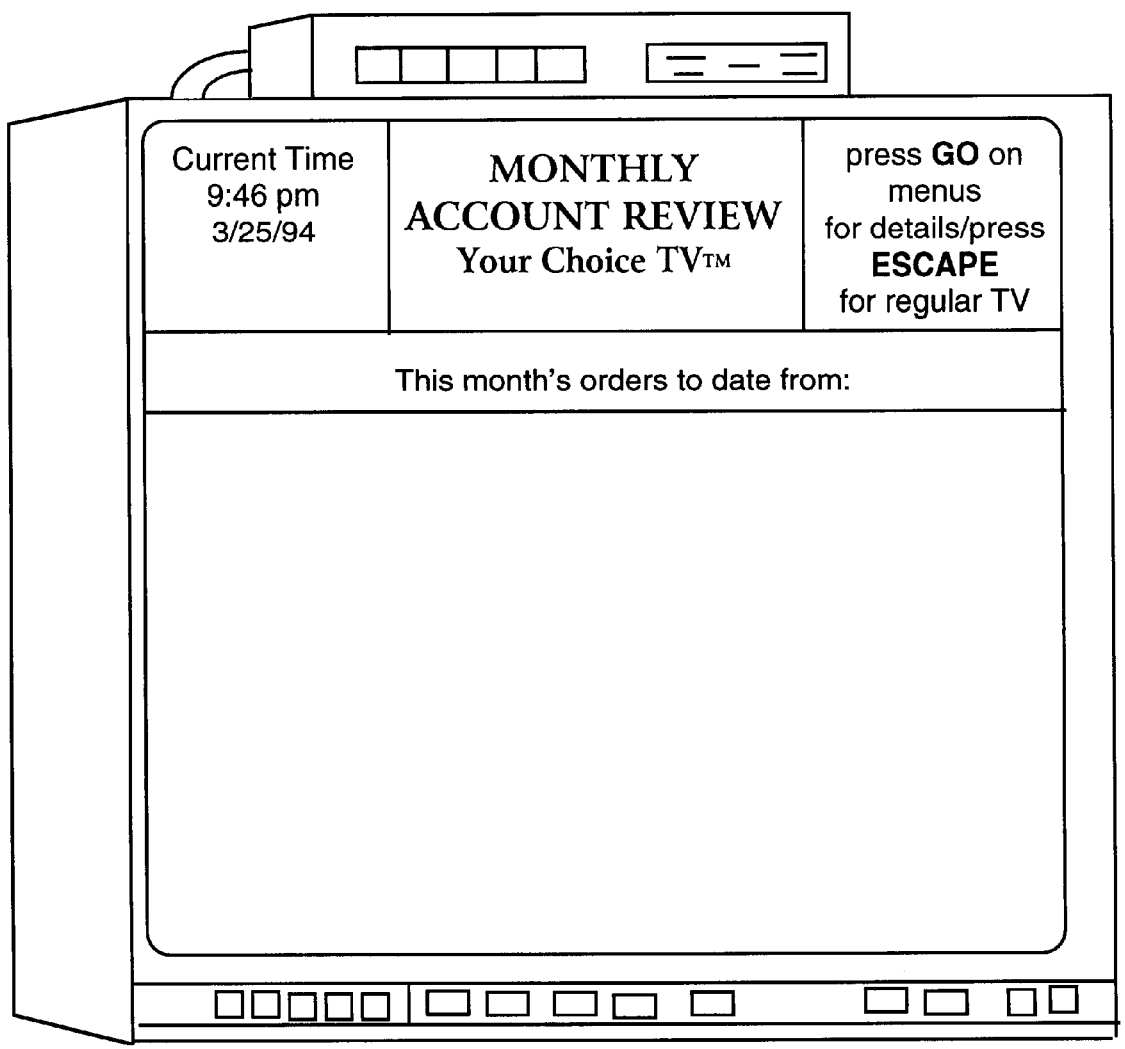

FIGS. 36a, 36b and 37a, 37b relate to the monthly account review capabilities available to the subscriber. In the preferred embodiment, the subscriber may choose to access the monthly account review capability from both the introductory menu 1000 and home menu 1010. The monthly account review screen shows alternative window types that are available to the set top terminal 220. For example, in the upper left-hand corner of the monthly account review, the current time and date are both shown. The upper right-hand corner provides the subscriber with instructions on how to use the monthly account review capability. FIG. 36b also shows that windows may be created in a variety of shapes. For instance, on the lower right-hand part of the screen 1612 two triangularly shaped windows with messages are shown. In addition, on the left lower part of the screen 1612 a window in the shape of a trapezoid is shown with a textual message inside.

The monthly account review provides a list of charges from the first day of the month to the date of viewing for each major menu. Charges are incurred on a pay-per-view basis and on a subscription basis (weekly, monthly, quarterly, etc.). At the lower part of the screen, the total of the charges incurred for the month is listed. The account status can also be calculated on a weekly, quarterly or semi-annual basis.

If the user moves his cursor to highlight one of the eight menus listed and depresses the "go" button, he will obtain further billing information on the menu. FIGS. 36a and 36b show in screens 1610 and 1612, respectively, the subscriber selecting menu A for further information.

Figure 37B:
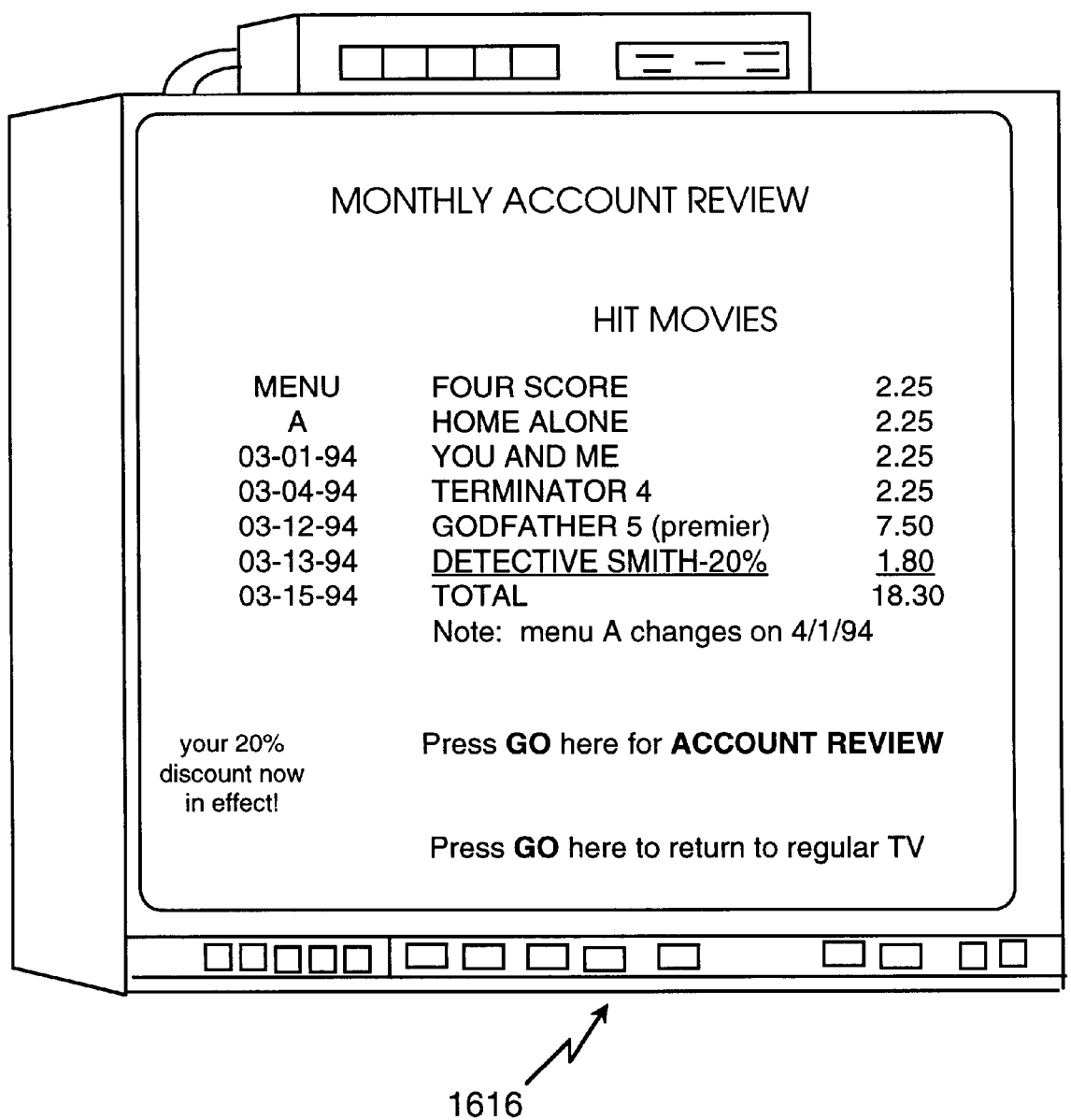

FIGS. 37a and 37b are submenus for the monthly account review and displays detailed billing information about selections made on menu A. The date of each movie selection, title of the movie, and price for each movie is displayed (1614, 1616). Also, any discounts which have been granted are displayed. The total charges on this menu and the day in which the menu will be changed are shown in the lower part of the screen. From this submenu, the subscriber may either return to regular TV or return to the major menu for the monthly account review. If the submenu information does not fit on a single screen, an extended submenu may be utilized with follow on extension screens. Alternatively, a scrolling feature may be used enabling the subscriber to scroll additional information onto the first submenu screen.

The account information necessary to create the monthly account review menus may be stored either in the memory of the set top terminal 220 or at a remote location that communicates with the set top terminal 220. In the simplest embodiment, the set top terminal 220 records a subscriber's selections locally and calculates the monthly account review based upon the subscriber's selections which require the payment of fees. This monthly account information is stored locally and sent to the cable headend 208 at least once a month for back-up and billing purposes.

Alternatively, the subscriber's viewing selections and billing information may be continuously maintained at the cable headend 208 or a remote site connected via communication lines to the cable headend 208. The cable headend 208 or the remote site must regularly transmit the monthly account information to the set top terminal 220. Each embodiment has advantages and disadvantages. If the account information and processing is done locally at the set top terminal 220, each set top terminal 220 must be provided with the memory and necessary processing capability to maintain the account. This greatly increases the cost of a set top terminal 220. If the account information is maintained remotely, the remote site must remain in regular contact with the set top terminal 220 in order to provide the subscriber with billing information.

To accommodate homes with multiple viewers two or more set top terminals 220 may be placed on a single bill or two accounts may be created for one set top terminal 220.

After menu configuration 324, the CAP 260 may begin the process of generating a program control information signal 326 (see also FIG. 8 software description at 442 and 404). In order to generate program control information signals 326 which are specific to a particular cable headend 208 system, the CAP 260 incorporates cable franchise configuration information 328. In the preferred embodiment, unique cable franchise configuration information 328 is stored at the Operations Center 202. The cable franchises upload changes to their specific franchise information 426 from time to time to the Operations Center 202 for storage 328. Preferably, a separate CPU (not shown) handles the management of the cable franchise information 328. From the stored cable franchise information 328, the CAP 260 generates a cable franchise control information signal 330 unique to each franchise.

Using the unique cable franchise control information signals 328 and the menu configuration 324 information, the CAP 260 generates the program control information signal 276, as shown at function block 326. The program control information that is unique to a particular cable franchise may be identified in various ways such as with a header. With the header identification, the cable headend 208 may extract the portions of the program control information signal 276 it needs. Now, the CAP 260 may complete its process by electronically packaging the programs into groupings 280 for the signal transmission and adding the program control information 276 to the packaged programs 334 to form a single signal for transmission. Through manual entries by the packager (PDEI 400) or by comparing against a list of programs, the CAP 260 will determine whether the programs are arriving from external sources 280 or sources internal 286 to the Operations Center 202.

Referring back to FIG. 11, upon completion of the CAP's functions, the Operations Center 202, or the uplink site 204 (FIG. 1), compresses 288 (if necessary), multiplexes 290, modulates 292 and amplifies 294 the signal for satellite transmission 296. In a basic embodiment, the CAP 260 will also allow entry of time slots for local avails where no national programming will occur.

Figure 13:
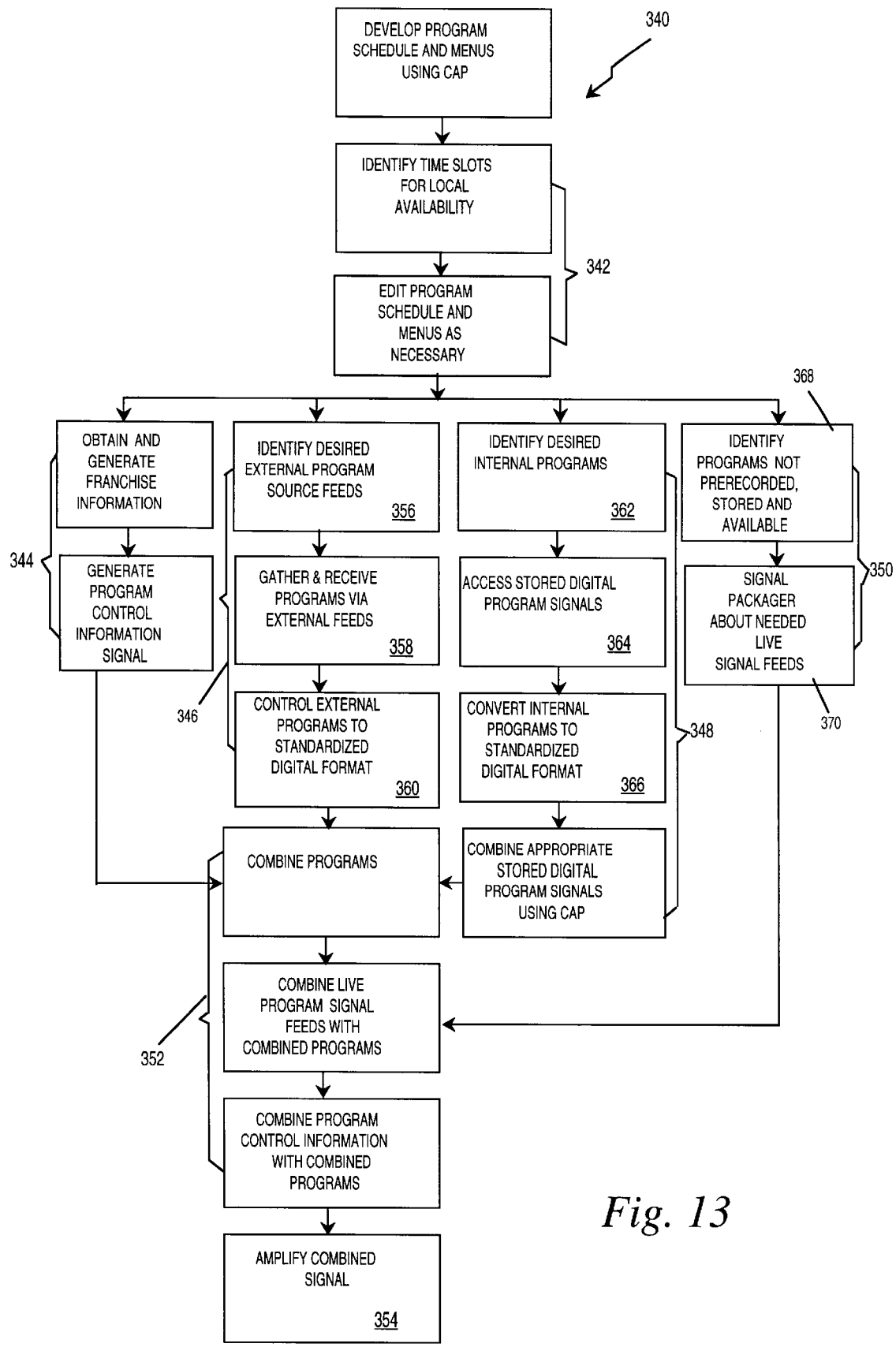
FIG. 13 is a flow chart of the processing occurring at the Operations Center.

FIG. 13 is a more detailed flow chart 340 of some of the functions performed by the CAP 260 after an initial program schedule has been entered and menu configurations generated. This flow chart highlights that some of the functions described earlier in reference to FIGS. 8, 9, 11 and 12 can be performed in parallel. The flow chart 340 shows six basic functions that are performed by the CAP 260: (1) editing program schedule for local availability 342 (only for non-standard services, i.e., those services that are not national cable services); (2) generating program control information signals 344; (3) processing external programs 346; (4) processing internal programs 348; (5) processing live feeds 350; and, (6) packaging of program information 352. In an alternate embodiment, the CAP 260 is capable of incorporating local programs and accommodating local availability for local television stations.

Following completion of the programming scheduling (accounting for local availability if necessary) and menu generation 342, the CAP 260 may perform three tasks simultaneously, generating program information signals 344, processing external programs 346 and processing internal programs 348.

The CAP 260 automatically identifies external programs feeds 356 and identifies which external feed to request the external program 358. The CAP 260 gathers and receives the external programming information 280, 282 (FIG. 11) and converts it to a standard digital format 360 for use. The CAP 260 also identifies internal programs 362 (and defined program services), accesses the internal programs 364 (and program services), and converts them to a standard digital format 366, if necessary. In addition, the CAP 260 identifies live signal feeds 368 that will be necessary to complete the packaged programming signal 370. In its last task depicted in FIG. 13 the CAP 260 completes the packaging of the programs and combines the packaged program signal with the program control information signal 352, amplifies the signal 354 and sends it out for further processing prior to uplink.

F. Allocation of Cable System Bandwidth

One of the primary tasks of the Operations Center 202 is, with assistance from the cable headends 208, effective utilization of available bandwidth from the Operations Center 202 to the subscriber homes. FIG. 14 shows effective allocation of 750 mHz of bandwidth (1 mHz to 750 mHz) for television programming. In FIG. 14, bandwidth is allocated for both analog 226 and digitally compressed 227 signals. In the preferred embodiment, the bandwidth is divided so that each category of programs receives a portion of the bandwidth. These categories correspond with major menus of the set top terminal software. The representative categories shown in FIG. 14 include: (1) high definition TV (HDTV) made possible through the use of compression technology, (2) A La Carte Channel category which provides specialty channels for subscription periods such as monthly, and (3) pay-per-view.

FIG. 15 shows a chart 228 of compressed channel allocation for a variety of programming categories 229 that have been found to be desirable to subscribers. By grouping similar shows or a series of shows into blocks of channels 230, the system 200 is able to more conveniently display similar programming with on-screen television menus. For example, in the movie category, which has the greatest allocation of channels, the same movie may be shown continuously and simultaneously on different channels. Each channel starts the movie at a different time allowing the subscriber to choose a more suitable movie starting time (e.g., every 15 minutes).

In order to accommodate cable TV systems that have different bandwidths and channel capacities, the television programming and television program control information may be divided into parts such as priority one, two and three. The large bandwidth cable TV systems can accommodate all the parts of the television programming and all parts of the television programming control information. Those cable TV systems with a more limited bandwidth are able to use the program delivery system 200 by only accepting the number of parts that the cable system can handle within its bandwidth.

For instance, as is shown in FIG. 16, three cable television systems with different bandwidths may use the program delivery system 200 simultaneously with each system accepting only those parts of the information sent which it is capable of handling. Priority one television programming and menus 240 are accepted by all three systems. Priority two television programming and menus 242 are not accepted by the cable television system whose capacity is the smallest or in this case 330 mHz (40 channels) system. Priority two television programming and menus 242 are accepted and used by the two larger capacity cable television systems shown. Priority three television programming and menus 244 are only used by the largest capacity television system which is capable of handling all three parts—Priority one, two and three programming and menu information.

With this division of television programming and menus, the program delivery system 200 may be utilized simultaneously by a variety of concatenated cable systems 210 (depicted in FIG. 1) with varying system capacities. By placing the heavily watched or more profitable programming and menus in the priority one division 240, both users and owners of the cable TV systems will be accommodated as best as possible within the limited bandwidth.

Figure 17:
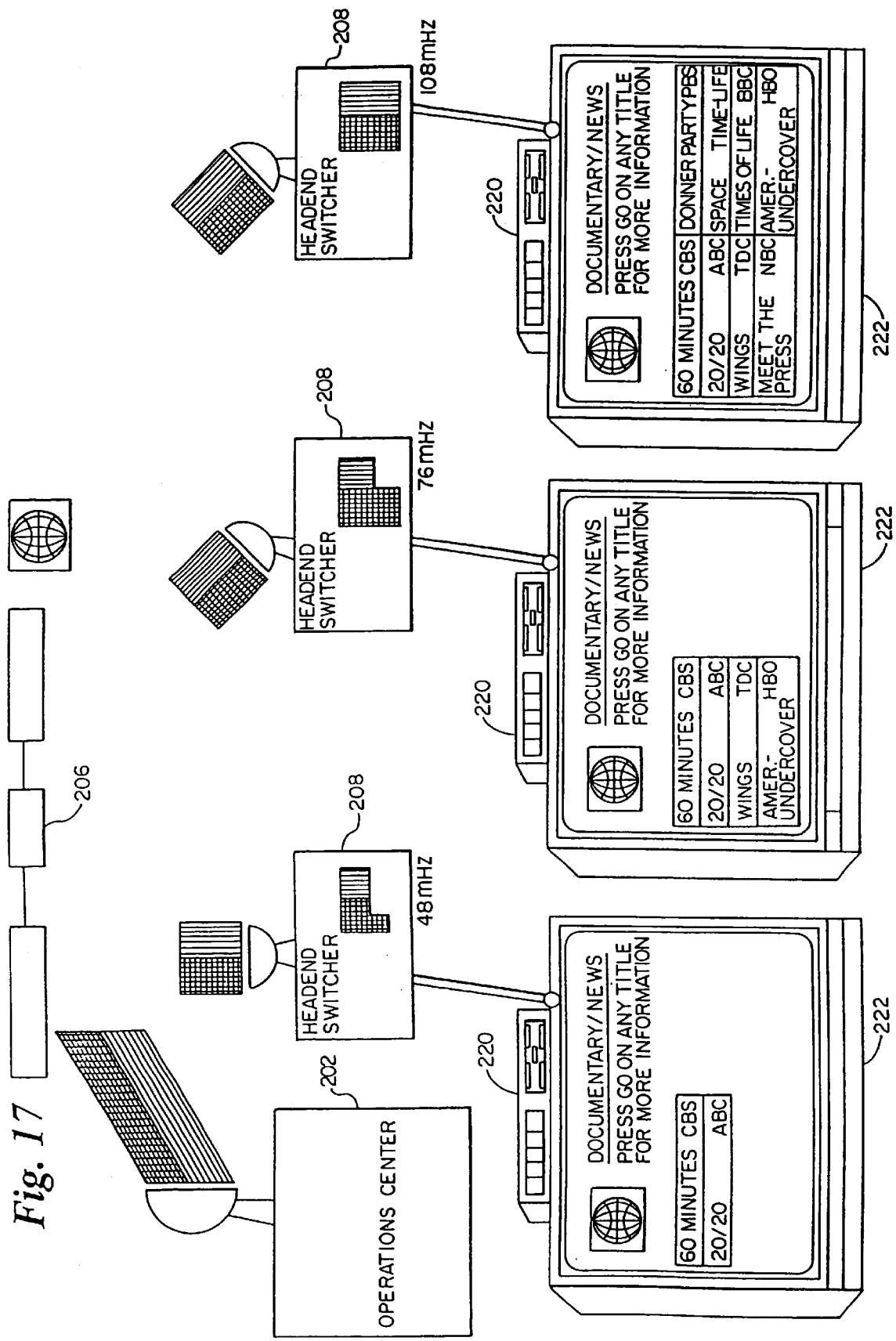
FIG. 17 is a diagram showing three different cable headend systems, each system receiving the entire satellite signal and stripping those parts of the signal which cannot be handled by the local cable system.

FIG. 17 shows three different cable headend 208 systems, each system receiving the entire satellite signal from the Operations Center 202 and stripping those parts of the signal which cannot be handled by the local cable system due to bandwidth limitations. In this particular embodiment, the three local cable television systems shown have bandwidth limitations which correspond with the bandwidth limitations depicted in the previous FIG. 16. As the bandwidth decreases, the programming options available to the viewer in the exemplary on-screen menu decreases. Using this preferred embodiment, the Operations Center 202 is able to send one identical signal to the satellite 206 that is sent to all the cable headends 208. Each cable headend 208 accepts the entire signal and customizes the signal for the local cable system by stripping those portions of the Operations Center signal that are unable to be handled by the local cable system. An alternate embodiment (not shown) requires the Operations Center 202 (and uplink sites 204) to send different signals for reception by different capacity cable headends 208.

There are several ways in which a cable headend 208 may strip the unnecessary signal from the Operations Center 202. A person skilled in the art will derive many methods from the three examples discussed below. The first method is for the signal originating from the Operations Center 202 (and uplink site 204) to be sent in portions with each portion having a separate header. The respective cable headend 208 would then recognize the headers and transmit to the concatenated cable system 210 only those signals in which the proper headers are identified. For example, using three concatenated cable systems shown in FIG. 17, the headers may be "001," "002," and "003." A wide bandwidth concatenated cable system can accept program signals with all three headers, while the narrowest bandwidth concatenated cable system may only be able to accept signals with a "001" header. For this first method, a central Operations Center 202 must divide the program signal into three parts and send a separate leading header before each signal for each part. This method requires has the additional signal overhead of a header on the program signal. The header would be transmitted from time to time as necessary.

A second method requires a set of transponders to be assigned to each priority level and the cable headend 208 to route signals from the transponders corresponding to the proper priority level for the concatenated cable system 210. For example, if there are three priority levels and eighteen transponders, transponders one through nine may be assigned to priority level one, transponders ten through fourteen priority level two, and transponders fifteen through eighteen assigned to priority level three. Thus, a concatenated cable system 210 capable of operating only at priority level two, would only receive signals from transponders one through nine, and ten through fourteen from the respective cable headend 208. The program signal from transponders fifteen through eighteen would not be transmitted to the priority level two concatenated cable system. This method requires the Operations Center 202 to properly assign programs to transponders by priority level. This can be accomplished by the CAP using the software described earlier (e.g., FIG. 8 at 438 and 440).

The third and the preferred method is for the cable headend 208 to pick and choose programming from each transponder and create a customized priority one, two, and three signal with chosen television programming. The cable headend 208 would then route the appropriate customized signal to each part of the concatenated cable system 210 that the cable headend 208 serves. This third method requires that the cable headend 208 have a component, such as the combiner (described in greater detail in a co-pending U.S. Patent Application entitled Digital Cable Headend For A Cable Television Delivery System, Ser. No. 08/160,283, filed Dec. 2, 1993, owned by the assignee of the present application) which can select among programs prior to combining the signal for further transmission on a concatenated cable system 210. The third method requires the least coordination between Operations Center 202 and the cable headend 208.

Figure 18:
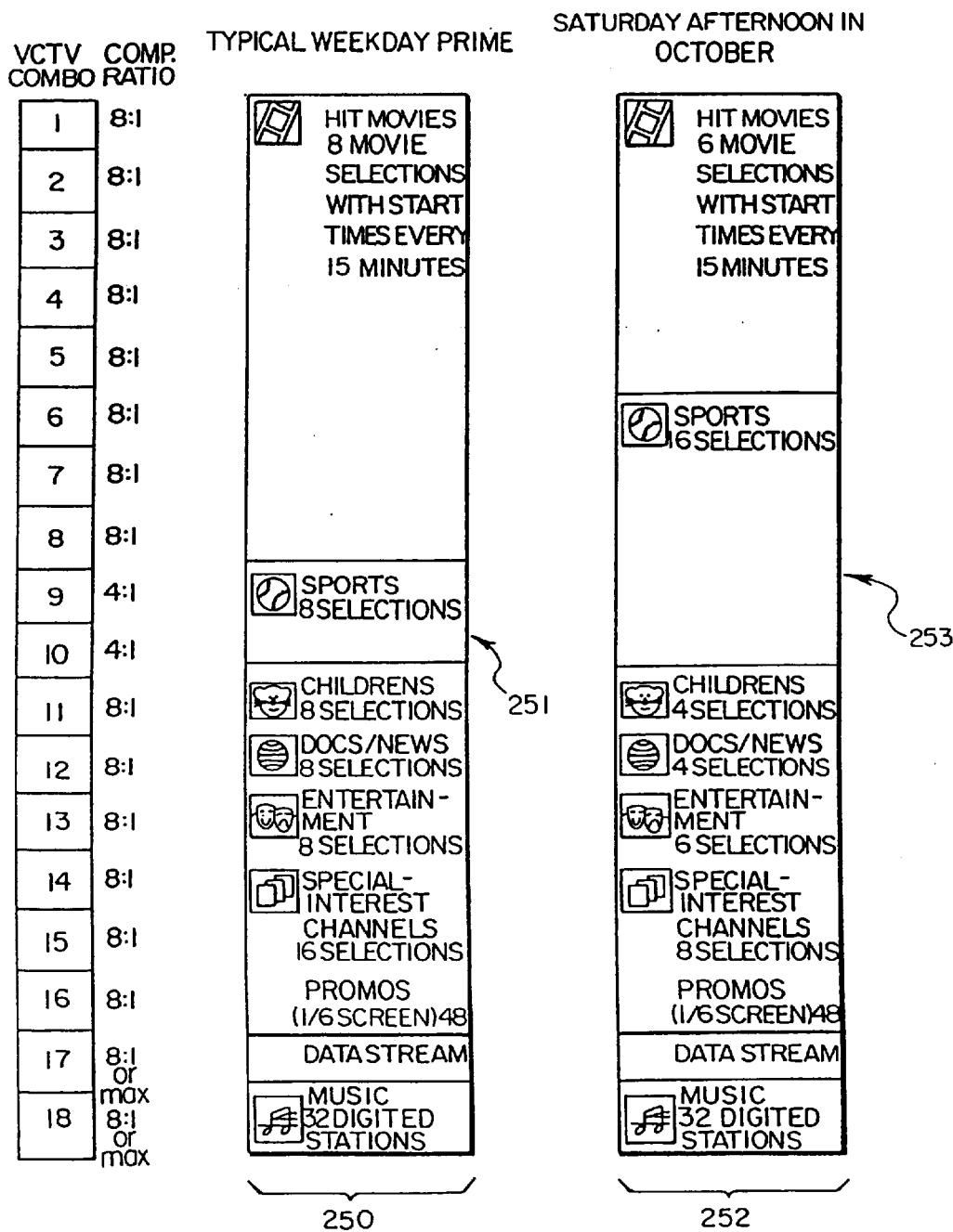
FIG. 18 is a diagram showing dynamic change in bandwidth allocation from a typical week day prime time program signal to a Saturday afternoon program signal.

In addition to dividing the television programming and menus into parts, the Operations Center 202 of the preferred embodiment is also capable of dynamically changing the bandwidth allocation for a particular category of programming. FIG. 18 depicts this dynamic change in bandwidth allocation from a typical week day prime time signal 250 to a Saturday afternoon in October signal 252 (during the college football season). FIG. 18 highlights the fact that the bandwidth allocated to sports is limited to eight selections 251 during week day prime time 250 but is increased to sixteen selections 253 during a Saturday afternoon in October 252. This dynamic increase in bandwidth allocation allows the system to accommodate changes in programming occurring on an hourly, daily, weekly, monthly, seasonal and annual basis.

In addition to dynamically allocating bandwidth for programming categories, the Operations Center 202 can also dynamically change the menu capacities in order to accommodate the change in programming and bandwidth. For example, on a Saturday afternoon in October 252, the major menu for sports may include a separate subcategory for college football. This subcategory would, in turn, have a separate submenu with a listing of four, six, eight, or more college football games available for viewing. In order to accommodate this dynamic menu change, the Operations Center 202 must add a submenu listing to the major sports menu, create a new or temporary submenu for college football, and allocate the necessary menu space on the college football submenu.

Once the television programs have been packaged and a program control information signal is generated to describe the various categories and programs available, the packaged programs are then digitized, compressed, and combined with the program control information signal. Upon the signal's departure from the Operations Center 202 the breakdown into categories is insignificant and the signal is treated like any other digitally compressed signal G. Compressing and Transmitting Program Signals After packaging, the packaged television program signal is prepared for satellite transmission and sent from the Operations Center 202 to the cable headend 208 via satellite 206. Depending on the specific embodiment, the television program signal may need to be compressed, combined/multiplexed, encoded, mapped, modulated, upconverted and amplified. This system, which is intended to be compatible with existing C and Ku Band satellite transmission technologies, accepts video, audio and data signals ranging in signal quality, and input from a number of sources.

As shown in FIG. 3, in the preferred embodiment, the packaged program signal will be treated at a master control uplink site 211 prior to being transmitted to the satellite 206. Following compression the channels must be multiplexed for each transponder carrier and sent to the satellite 206 dish that will provide the uplink. A variety of multiplexing schemes may be used in the system. In some situations, it may be advantageous to use different multiplexing schemes in different parts of the overall system. In other words, one multiplexing scheme may be used for satellite transmission 206 and a second remultiplexing scheme for the land transmission. Various satellite multi-accessing schemes and architectures can be used with the system, including both single channel per carrier (SCPC) frequency division multiplex (FDM) and multiple channel per carrier (MCPC) time division multiplexing (TDM). Time division multiplexing is the more desirable scheme. Once the signal has arrived at the uplink or master control site 211, it must be modulated, upconverted, and amplified. Various types of satellites and transponders capable of handling digital signals may be used in this cable television packaging and delivery system. One of the achievements of the present invention is effective utilization of digital compression technology by packaging television programs into categories that allow easy access to television programs by consumers. With current digital compression techniques for video, the typical 50-channel capacity cable satellite receiving system can be increased to 300 channels.

Presently, one transponder is used for each satellite delivered channel. The preferred embodiment uses 18 satellite transponders and compression ratios of 4:1 to 8:1 to achieve a capacity of 136 satellite delivered channels. More transponders or higher compression ratios can be used to deliver up to the channel capacity of any existing cable system.

An example of a satellite that may be used is the AT&T Telstar 303. The signal is transmitted from the satellite 206 to the cable headend 208 where a computer system including a digital switch treats the signal and delivers it through cables to a subscriber's home. In alternate embodiments, multiple Operations Center 202 and multiple uplink sites 211 can be simultaneously utilized.

H. Cable System Use of Control Signal

Figure 19:
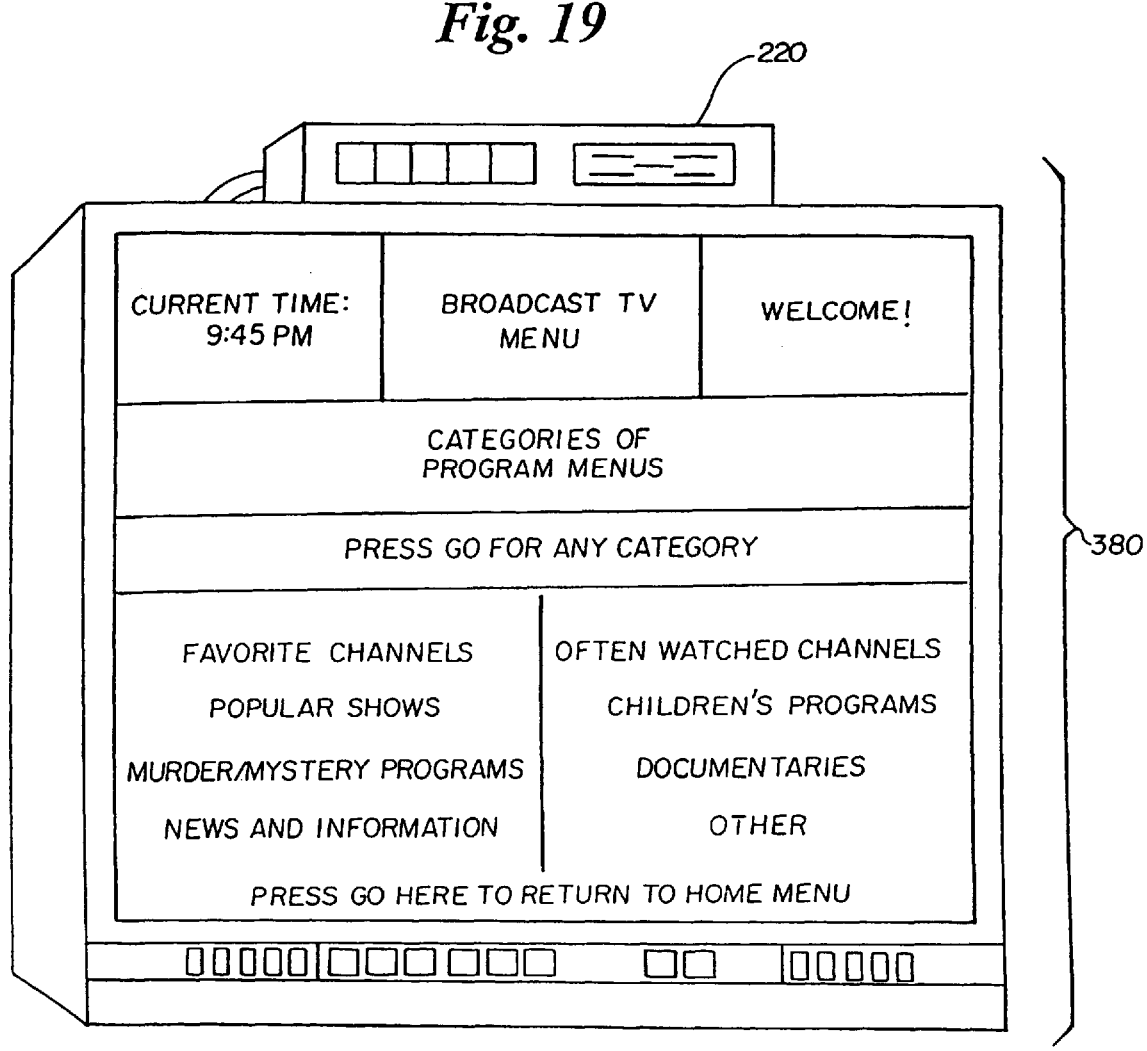
FIG. 19 is a drawing of a broadcast television menu screen to be displayed on a set top terminal.
Figure 20:
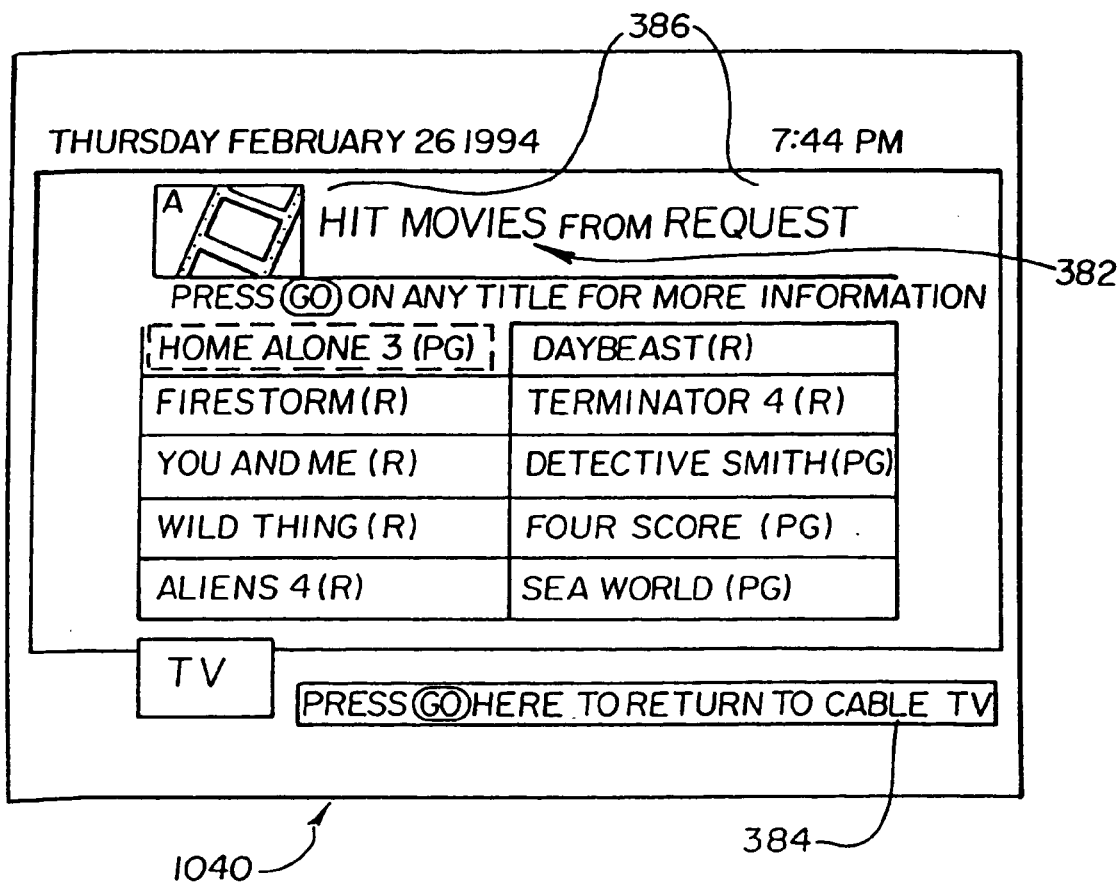
FIG. 20 is a drawing of a hit movie menu screen to be displayed on a set top terminal.
Figure 21:
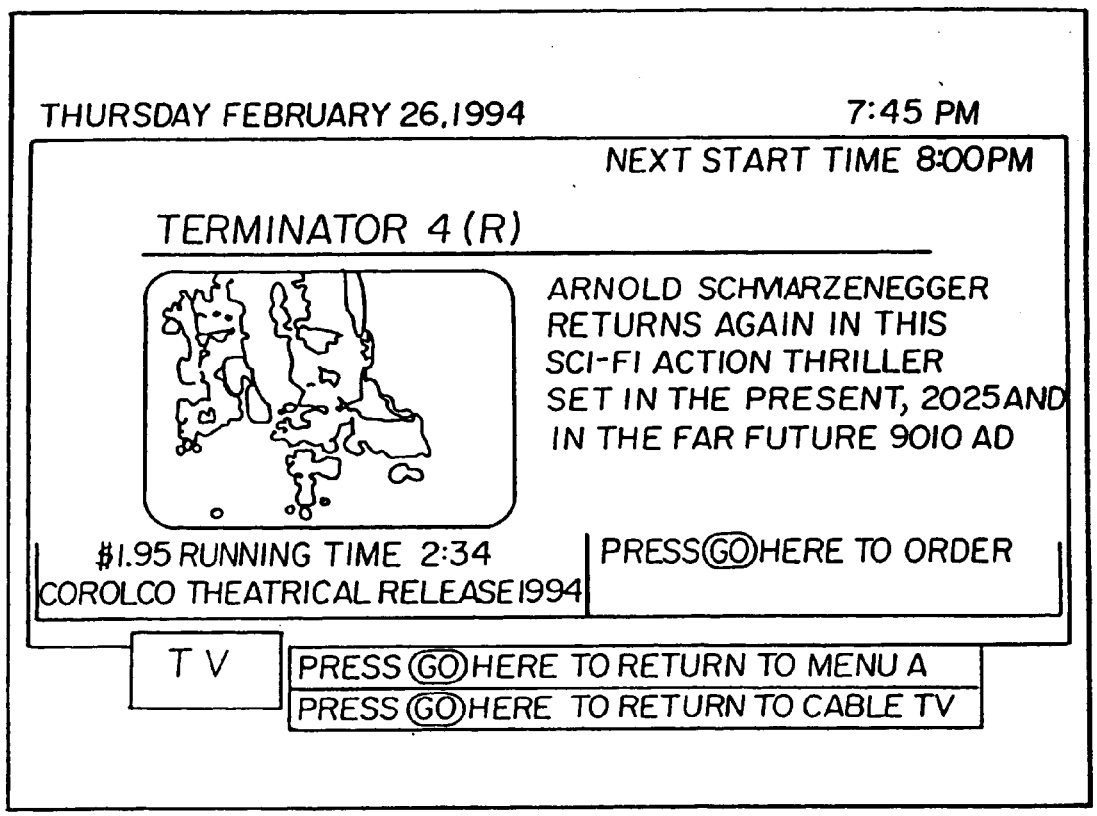
FIG. 21 is a drawing of a hit movie description menu screen to be displayed on a set top terminal.

FIGS. 19 through 21 depict sample menu screens produced by the set top terminal 220 using the program control information signal 276. FIG. 19 shows a menu which enables the viewer to select a program category or program service from among a choice of eight program categories. FIG. 20 shows a menu for the viewer to select a hit movie from among ten hit movies. FIG. 21 provides information about a movie (or event) and enables a viewer to order the movie for viewing.

FIGS. 19 through 21 show text generation by the set top terminal 220. This text is generated using information received via the program control information signal. FIG. 20 shows the text 380 generated for the hit movies major menu. In the preferred embodiment, text 380 such as that shown in FIGS. 19 through 21 is generated separately by a text generator (not shown) in the set top terminal unit 220. Those portions of the text that generally remain unchanged for a period of weeks or months may be stored in EEPROM or other local storage. For example, the text "HIT MOVIES from" 382 will consistently appear on each hit movies' major menu. This text may be stored on EEPROM or other local storage. Further, text such as that which appears at the lower center part of the screen "PRESS HERE TO RETURN TO CABLE TV" 384 appears many times throughout the menu sequence. This text may also be stored locally at the set top terminal 220. Text which changes on a regular basis, such as the movie titles (or other program selections), will be transmitted to the set top terminal 220 by either the operations center 202 or the cable headend 208. In this manner, the cable headend 208 may change the program selections available on any major menu modifying the program control information signal sent by the operations center 202 and transmitting the change. The network controller 214 of the cable headend 208 generally modifies the program control information signal and transmits the set top terminal control information signal (STTCIS). It is preferred that the text 380 is generated by the set top terminal 220 separately from the graphics because the text can be stored locally in a more compact manner requiring less storage space at the set top terminal 220. In addition, it allows for easy communication of text changes from the operations center 202 or cable headend 208 to the set top terminal 220.

FIGS. 19 through 21 show the use of day, date and time 386 information on menus. This information may be obtained in a variety of ways. The day, date, and time information 386 may be sent from the operations center 202, the cable headend 208 (signal processor or network controller 214), the uplink site, or generated by the set top terminal unit 220 internally. Each manner of generating the day, date, and time information 386 has advantages and disadvantages which may change given the particular embodiment and costs. In the preferred embodiment, the day, date, and time 386 are generated at a central location such as the operations center 202 and are adjusted for regional changes in time at the cable headend 208.

In order for the set top terminal 220 to generate submenus for subcategories of categories shown in FIG. 19 (which relate to the content of the programs), and to generate menus for movies such as FIG. 21, the terminal must receive information on the content of the programs from the Operations Center 202 (via the cable headend 208). Normally the set top terminal 220 would receive this information in the form of the program control information signal (or STTCIS). As shown FIG. 21, in addition to the text needed for these program menus, video or program scenes are also necessary.

Live video signals may be used in windows of certain menus such as FIG. 21. These video signals can be sent via the program control information signal, STTCIS, or can be taken off channels being transmitted simultaneously with the menu display. If the video signal is taken off a channel, less information needs to be sent via the program control information signal. However, this technique requires that separate decompression hardware be used for the program control information and the channel carrying the video. Separate decompressors for the video signals and program information signal allows for the greatest flexibility in the system and is therefore the preferred embodiment. A separate decompressor also assists in assuring that the switch from menus to television programming is smooth and without any significant time delay.

Live video for menus, promos or demos may be sent to the set top terminal 220 in several ways: a) on a dedicated channel, b) on a regular program channel and scaled to size, c) sent along with the program control information signal, etc. However, in the preferred embodiment, a great deal of short promos or demo video are sent using a split screen technique on a dedicated channel.

Using a split screen technique, any number of different video clips may be sent (e.g., 2, 4, 6, or 8 video clips). To show the video clip on a menu, the video must either be scaled and redirected to a video window on a menu screen or a masking methodology can be used. Masking involves playing the entire channel of video (all 2, 4, 6, or 8 split screens) in background and masking the unwanted video clip portions of the split screen by playing the menu in foreground and overlaying the unwanted background video.

Masking is the least expensive method because it does not require any special hardware and it increases video throughput to the set top terminal 220. However, using the masking technique without any video redirecting causes each video clip to be located in a different position on the screen. It also requires the masking to be different for each video clip and makes consistent format difficult. On the other hand, scaling and redirecting video is generally difficult, expensive and requires additional hardware.

In order for the Operations Center 202 to prepare the promo video signal to be sent to the set top terminal 220, the Operations Center 202 must first identify the duration and actual video cut to be used for each promo and its position within the promo video signal. This information is maintained within the Operations Center 202 database. When it is time to produce the promo video signal (either to tape or to broadcast), each promo cut is scaled, positioned and combined with the other promos to form the single promo video signal. This is performed by readily available commercial equipment. Each promo is run repeatedly while the promo video signal is being generated. The audio signals of the individual promo cuts may be combined into the promo video signal audio tracks based upon the number of audio tracks available. The mapping of the audio tracks to the promos is also stored in the Operations Center database. Additionally, the mapping of promos to the programs that they are previewing is also stored in the Operations Center database. All promo database data is made available to the set top terminal 220 through the STTCIS.

In the preferred embodiment, the Operations Center 202 transmits six video/graphic promos for advertising purposes all on one channel. The throughput of the video/graphics on a single channel can be increased through the use of digital compression techniques. The set top terminal 220 uses either video scaling and redirecting techniques or masking to utilize the six video scenes. Although the set top terminal 220 actually performs the manipulation of video as necessary to generate the "live" menus for the subscriber, the appropriately prepared video signals must be formed and sent by the Operations Center 202 to the set top terminal 220.

If a promo for a given program is available at the set top terminal 220, the viewer may command the set top terminal 220 to display the promo. Generally, this is done through program selection from a menu screen by the subscriber. The selected program is referenced to information about available promos and allows the set top terminal 220 to tune to the proper channel, select the appropriate menu overlay mask based on the promos position and switch on the audio track(s) if they are available. The promos position on the screen dictates the displaying of the "live" text (refer to the video window of FIG. 21). The program associated with the currently selected promo may be purchased from this menu screen. Events, services and slices of time may be purchased from promotional menus.

Management of promo video signals at the Operations Center 202 is similar to that of other programs except that more information is needed in order to specify the details of the promo video signal. The broadcasting of the promo video signal is identical to the broadcasting of a video program.

In order to limit the amount of bandwidth needed to transmit the program control information signal, various compression techniques employed for non-video may be used such as block coding, contour coding, blob encoding, and run-length encoding. Further, the program control information signal may be divided into text and graphics, or video, text and graphics and then recombined at the set top terminal 220 using a text generator, graphics decompression, and video decompression as necessary.

As shown in FIG. 2, an analog cable TV system 205 can continue to exist alongside and within the digitally compressed system of the present invention. The digital transmissions do not effect the analog system. In fact, the analog cable signal may be transmitted simultaneously on the same cable as the digital signal. Cable headends 208 may continue to supply subscribers with local channels in an analog signal format.

In the preferred embodiment, the Operations Center 202 and uplink 204 (FIG. 1) or master control site 211 (FIG. 3) are collocated. However, the Operations Center 202 and uplink site 204 may be located in different geographical places. Also, functions and equipment within the Operations Center 202 may be remotely located. For instance, the program storage may be at a different site and the programs may be sent to the CAP 260 via landline.

Alternate embodiments of the system 200 of the present invention may use multiple Operations Centers described above. In such an embodiment, it is preferred that one Operations Center be designated the Master Operations Center and all other Operations Centers be Slave Operations Centers. The Master Operations Center performs the functions of managing and coordinating the Slave Operations Centers. Depending on the method in which the Slave Operations Centers share functions, the Master Operations Center coordination function may involve synchronization of simultaneous transmissions from multiple Slave Operations Centers. To perform its functions, the Master Operations Center may include a system clock for synchronization.

An efficient method of dividing tasks among multiple Operations Centers is to assign specific satellite transponders to each Operations Center 202 and to assign external program sources to the nearest Operations Center 202. Of course, this division of resources may not always be possible. Since programming will be grouped into priority levels with each priority level likely to be assigned specific satellite transponders, it is also possible to assign each Operations Center 202 to a priority level. For example, in a three priority level system with two Slave Operations Centers A and B and 18 transponders, the Master Operations Center may be assigned priority level 1 and assigned 9 transponders. Slave Operations Center A may be assigned priority level 2 and 5 transponders, while Slave Operations Center B is assigned priority level 3 and 4 transponders. In a multiple Operations Center configuration dynamic bandwidth allocation and dynamic menu capacity allocation becomes more complex and will be coordinated by the Master Operations Center.

Just as in the alternate embodiment wherein multiple Operations Centers 202 are used, a delivery system may have multiple satellite uplinks. Preferably, each Operations Center 202 has one or more uplink sites. Each Operations Center 202 controls the functions of its assigned uplink sites and may assign one site as a master uplink site.

In another alternative configuration, in regions or areas without cable services, where subscribers might use backyard satellite systems (TV RO) to receive packaged television services, the set top terminal 220 will include the appropriate hardware to allow connection to the backyard satellite reception equipment, i.e., a typical communication port. In this configuration, the backyard satellite system will receive programming signals originating from the Operations Center 202 directly from the satellite transponders. No cable headend 208 is utilized with a backyard satellite system. The menu system within the set top terminal 220 will be programmed directly from the Operations Center 202. The Operations Center program signals and control signals arrive at the set top terminal 220 essentially unchanged. Additionally, in this configuration, an upstream communication mechanism must be in place at the subscriber's home (e.g., modem) to communicate information to the Operations Center 202 such as program ordering information. The set top terminals 220 can be equipped with a modem port for this upstream communication to the Operations Center 202. The two alternative embodiments described in the preceding four paragraphs, and other such embodiments not specifically referred to herein but within the understanding of those skilled in the art, incorporate or combine one or more of the components of the system 200 of the present invention.

Although the present invention has been shown and described with respect to preferred embodiments, various changes and modification that are obvious to a person skilled in the art to which the invention pertains are deemed to lie within the spirit and scope of the invention as defined by the following claims.

What is claimed is:

1. An operations center for generating menus and a digital data signal to be used in television program delivery, comprising:
   a receiver, wherein information, including information on television programs, is received;
   a memory for storing the received information;
   a first processor for generating menus using the information stored in memory, wherein the menus are generated automatically by the operations center by analyzing the information using a heuristic;
   a display, operably connected to the first processor, for displaying the generated menus;
   an input device, operably connected to the first processor, for entering changes to the displayed menus;
   a second processor, operably connected to the first processor, for generating a digital data signal containing data from the changed or displayed menus; and
   a transmitter, operably connected to the second processor, for transmitting the generated digital data signal, whereby menus may be generated using the contained data on the transmitted digital data signal.

2. The operations center of claim 1 wherein the first processor comprises a means for generating program selection menus.

3. The operations center of claim 2 wherein the program selection menus include an introductory menu, a home menu, at least one major menu, and at least one submenu.

4. The operations center of claim 3 wherein the introductory menu welcomes a user and offers the user at least one option.

5. The operations center of claim 4 wherein the introductory menu offers the user regular cable television, programs on demand, and instructions on the use of a remote control.

6. The operations center of claim 1 wherein the first processor comprises a means for generating menu windows which may be customized by a user.

7. The operations center of claim 1 wherein the first processor comprises a means for generating a home menu with multiple windows which make the home menu user-friendly.

8. The operations center of claim 7 wherein the home menu includes major menu categories and the home menu displays a channel line-up and the major menu categories.

9. The operations center of claim 8 wherein the channel line-up comprises standard channels and programming on demand icons.

10. The operations center of claim 8 wherein the channel line-up comprises Basic cable and Basic Plus packages.

11. The operations center of claim 8 wherein the channel line-up comprises one or more of the most popularly watched channels.

12. The operations center of claim 8 wherein the home menu comprises at least one additional accessible screen.

13. The operations center of claim 1, wherein the first processor comprises a means for generating a mood question menu.

14. The operations center of claim 13 wherein the mood question menu includes one or more of mood question screens, each of which prompt a viewer for information concerning the viewer's mood.

15. The operations center of claim 3 wherein at least one of the major menus is for a category of programming.

16. The operations center of claim 15 wherein the different categories of programming include at least one of the following: sporting events, children's programming, entertainment choices, documentaries, news, magazines, broadcast TV, cable TV, high-definition television (HDTV), interactive television choices, program available services, digital audio, programs on demand, and hit movies.

17. The operations center of claim 16 wherein the hit movies major menu includes options of available popular movies which may be selected.

18. The operations center of claim 16 wherein the HDTV major menu includes a description of HDTV and a suggestion to order.

19. The operations center of claim 16 wherein the HDTV major menu includes options of the currently available HDTV programming.

20. The operations center of claim 16 wherein the program available services major menu includes options on programs available on network schedules and offers a plurality of program schedule submenus.

21. The operations center of claim 20 wherein the plurality of program schedule submenus include seven-day network schedule, current-day network schedule, and TV guide picks sub-menus.

22. The operations center of claim 16 wherein the digital audio major menu displays digital audio program options.

23. The operations center of claim 22 wherein the digital audio major menu shows top songs available in one or more different categories of songs.

24. The operations center of claim 1 wherein the first processor comprises a means for generating a confirmation menu.

25. The operations center of claim 3 wherein the major menus include submenu options relating to one or more subcategories of programming.

26. The operations center of claim 25 wherein the submenus includes listings corresponding to other submenus.

27. The operations center of claim 25 wherein the submenus include program identities.

28. The operations center of claim 27 wherein the program identities are from a particular category or subcategory of programming.

29. The operations center of claim 28 wherein one particular subcategory of program identities is defined by the time of viewing.

30. The operations center of claim 3 wherein the submenus comprise a notification submenu notifying a user that a program selection is about to begin.

31. The operations center of claim 30 wherein the notification submenu displays a countdown timer which indicates remaining time to the beginning of the program selection.

32. The operations center of claim 30 wherein the notification submenu allows the user to cancel the program selection.

33. The operations center of claim 30 wherein the notification submenu comprises:
   a window showing the program selection and the amount of time before the program selection begins;
   a video window that displays a scene from the program selection; and
   a second window that presents the user with an option on escaping the program selection without charge.

34. The operations center of claim 3 wherein the submenus comprise a rejoin submenu that includes reentry menu selections for rejoining an exited program, the reentry menu selections including one or more identified start times.

35. The operations center of claim 3 wherein the submenus comprise a program order submenu and a program confirmation submenu.

36. The operations center of claim 3 wherein the submenus comprise a program description submenu from which a user may choose to record a selected program on a VCR.

37. The operations center of claim 3 wherein the submenus comprise an interactive Level A submenu offering a variety of interactivity with a television program being viewed.

38. The operations center of claim 37 wherein the variety of interactivity includes one or more of the following: quizzes, fast facts, more info, geographical facts, and products.

39. The operations center of claim 37 wherein the submenus comprise one or more of: a quiz submenu, a fast fact submenu, a more info submenu, a geographical facts submenu, and a products submenu.

40. The operations center of claim 3 wherein the submenus comprise an interactive Level B submenu offering on-line services.

41. The operations center of claim 40 wherein the on-line services include one or more of: Yellow Pages and airline reservations.

42. The operations center of claim 40 wherein the submenus comprise a plurality of airline information and reservation submenus.

43. The operations center of claim 3 wherein the submenus comprise an interactive Level C submenu offering multi-media experiences.

44. The operations center of claim 1 wherein the first processor comprises a means for generating at least one during program menu.

45. The operations center of claim 44 wherein the during program menus comprise one or more of: a one hidden menu and an overlay menu.

46. The operations center of claim 45 wherein a user has a specific time to escape from a program selection and the overlay menu informs a user when the specific time to escape from a program selection will expire.

47. The operations center of claim 45 wherein the overlay menu informs a user that the user is escaping from a program selection after being charged for the program selection.

48. The operations center of claim 45, wherein the hidden menu remains unseen by a user during program viewing, but is generated when the user presses one or more key strokes on a remote control.

49. The operations center of claim 48 wherein the key strokes include one or more of: escape, cancel selection, or icon selection.

50. The operations center of claim 49 wherein the hidden menu triggers the display of an overlay menu in response to the user's key stroke.

51. The operations center of claim 1 wherein the first processor comprises a means for generating at least one promotional menu for selling subscriptions to services.

52. The operations center of claim 51 wherein the promotional menu is for HDTV services and describes the HDTV services and its availability.

53. The operations center of claim 51 wherein the promotional menu is for interactive services and provides additional information about the interactive services.

54. The operations center of claim 51 wherein the promotional menu is an interactive logo overlay menu that allows a user to select interactive features or return to a television program being viewed.

55. The operations center of claim 51 wherein the promotional menu is for digital audio services and provides a text description enticing a user to pay a monthly fee and join the service.

56. The operations center of claim 1 wherein the first processor comprises a means for generating an account review menu which displays information concerning a user's account.

57. The operations center of claim 56 wherein the account review menu provides a list of charges from the first day of a month to the date of viewing.

58. The operations center of claim 3 wherein the submenus comprise account review submenus which provide detailed billing information about one or more specific charges.

59. The operations center of claim 1 wherein the received information includes one or more of: viewer data, ratings data, demographics data, program importance data, times-purchased data, cost data, menu placement data, category data and lifespan data, and wherein the first processor includes a means for analyzing the received information.

60. The operations center of claim 1 wherein the first processor automatically generates menus based on the received information.

61. A method of generating menus and a digital data signal for use at television program viewer locations, comprising:
   storing menu format data;
   receiving input data about television programs;
   storing the received input data;
   generating a draft menu through the use of the stored input data and the menu format data, wherein the draft menu is generated automatically by an operations center by analyzing the input data using a heuristic;
   displaying the draft menu;
   editing the displayed draft menu, wherein the edited menu includes a program line-up;
   repeating the steps of generating, displaying, and editing to generate additional edited menus;
   processing the edited menus to generate a digital data signal; and
   transmitting the digital data signal for use at viewer locations, whereby at least one of the edited menus may be viewed by a viewer.

62. The method of claim 61 wherein the draft menu is one of the following: a draft introduction menu, a draft home menu, a draft major menu, a draft submenu, a draft hidden menu, or a draft overlay menu.

63. The method of claim 61 wherein input data used to generate a draft menu includes one or more of: viewer data, ratings data, demographics data, program importance data, times-purchased data, cost data, menu placement data, category data, and lifespan data, and wherein the step of generating a draft menu includes the step of analyzing the input data.

64. The method of claim 61 wherein the heuristic causes a program to move closer to or further from the top of the menu based on the input data about the program.

65. The method of claim 61 wherein the step of editing the draft menu includes the step of entering information by a packager.

66. The method of claim 61 wherein the step of generating a draft menu is automatically performed by an operations center and the step of editing the draft menu includes the step of entering information by a packager.

67. The method of claim 61 wherein the step of receiving comprises the step of entering input data by a packager.

68. The method of claim 61 further comprising the step of:

selecting programs from a pool of available programs.

69. The method of claim 68 further comprising the step of:

inputting requisite information about the selected programs; and choosing the price for the selected programs.

70. The method of claim 68 further comprising the step of:

allocating transponder space for the selected programs.

71. The method of claim 61 wherein the edited menus are one of the following: an introductory menu, a home menu, at least one major menu, and at least one submenu.

72. The method of claim 61 wherein the draft menus are one of the following: a draft program selection menu, a draft during program menu, or a draft program confirmation menu.

* * * * *